(12) United States Patent
Kondo et al.

(10) Patent No.: US 7,991,054 B2
(45) Date of Patent: Aug. 2, 2011

(54) INFORMATION SIGNAL PROCESSING DEVICE, INFORMATION SIGNAL PROCESSING METHOD, IMAGE SIGNAL PROCESSING DEVICE, IMAGE DISPLAYING DEVICE, DEVICE AND METHOD FOR PRODUCING CORRECTION DATA USED IN THEM, DEVICE AND METHOD FOR PRODUCING COEFFICIENT DATA, PROGRAMS FOR EXECUTING THESE METHODS, AND COMPUTER-READABLE MEDIUM FOR STORING THE PROGRAM

(75) Inventors: Tetsujiro Kondo, Tokyo (JP); Tsutomu Watanabe, Kanagawa (JP); Masaaki Hattori, Chiba (JP)

(73) Assignee: Sony Corporation, Tokyo (JP)

( * ) Notice: Subject to any disclaimer, the term of this patent is extended or adjusted under 35 U.S.C. 154(b) by 1902 days.

(21) Appl. No.: 10/521,331

(22) PCT Filed: Jul. 18, 2003

(86) PCT No.: PCT/JP03/09191
§ 371 (c)(1),
(2), (4) Date: Jan. 18, 2005

(87) PCT Pub. No.: WO2004/010706
PCT Pub. Date: Jan. 29, 2004

(65) Prior Publication Data
US 2006/0126126 A1 Jun. 15, 2006

(30) Foreign Application Priority Data

Jul. 19, 2002 (JP) ................................. 2002-210995
Jul. 19, 2002 (JP) ................................. 2002-210996

(51) Int. Cl.
*H04N 7/18* (2006.01)
(52) U.S. Cl. ............................. 375/240.27; 375/240.26
(58) Field of Classification Search . 375/240.01–240.29
See application file for complete search history.

(56) References Cited

U.S. PATENT DOCUMENTS
7,289,673 B2 * 10/2007 Lin et al. ....................... 382/236

FOREIGN PATENT DOCUMENTS

| JP | 10-93963 | 4/1998 |
|----|----------|--------|
| JP | 2002 10256 | 1/2002 |
| JP | 2002-10256 | 1/2002 |
| JP | 2002-58035 | 2/2002 |
| JP | 2003-219429 | 7/2003 |
| JP | 2003-264832 | 9/2003 |
| JP | 2003-299098 | 10/2003 |

* cited by examiner

*Primary Examiner* — Andy S Rao
(74) *Attorney, Agent, or Firm* — Frommer Lawrence & Haug LLP; William S. Frommer

(57) ABSTRACT

The present invention relates to an apparatus for processing informational signal etc. that are preferably applied to a digital broadcast receiver etc. A class classification portion (130) generates a class code CL for indicating a class to which pixel data y of a target position in an image signal Vb belongs. From an accumulation table (131), based on this class code CL, difference data DF (correction data of encoding noise) that corresponds to the target position is read. Pixel data (pixel value or DCT coefficient) x that corresponds to the target position in the image signal Vb is supplied to an addition portion (134). The addition portion 134 adds the difference data DF read out of the accumulation table (131) to this pixel data x, to obtain pixel data y of the target position in the image signal Vb. Encoding noise (encoding distortion) of this pixel data y is reduced.

48 Claims, 31 Drawing Sheets

F I G. 13
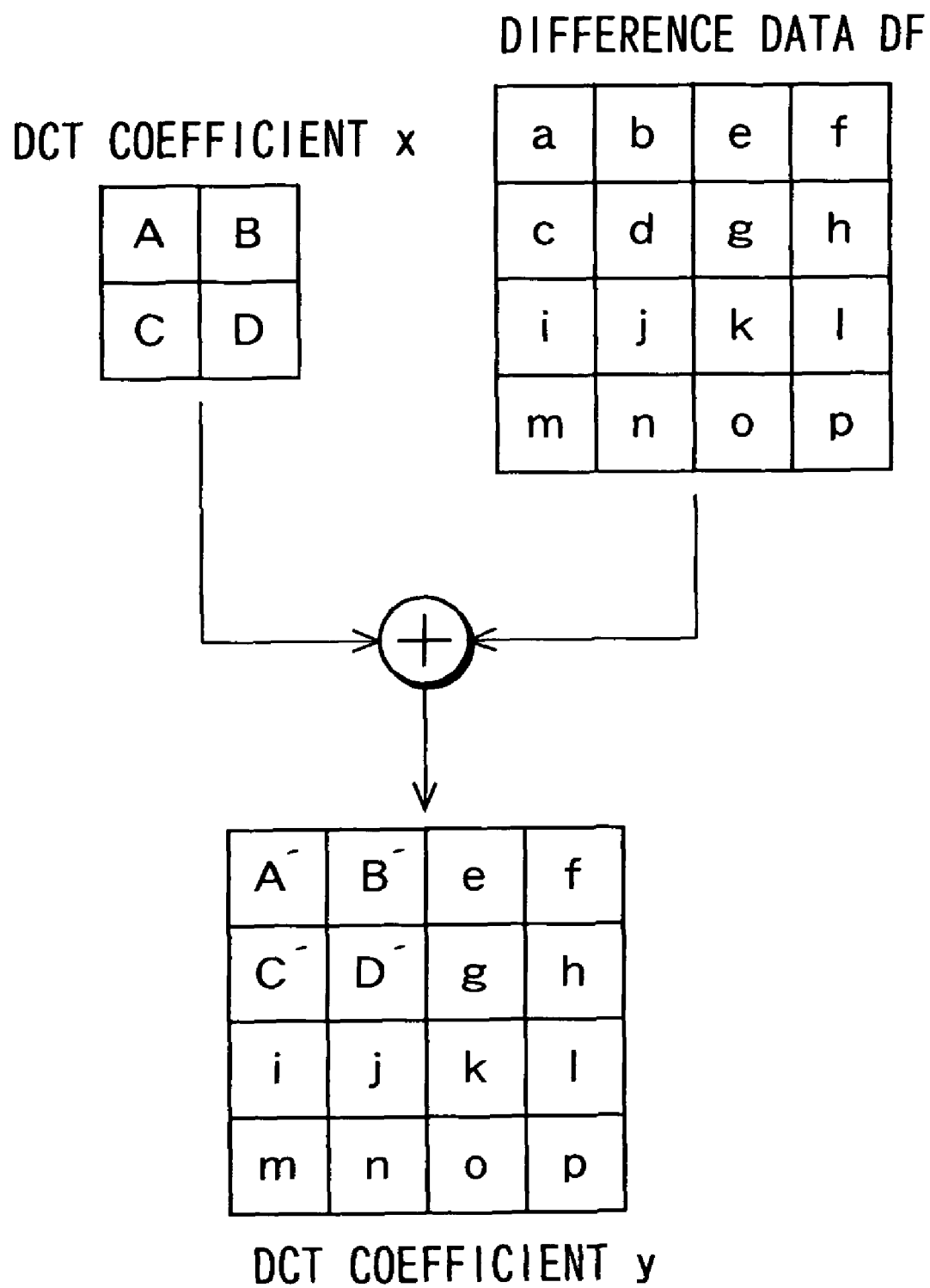

INFORMATION SIGNAL PROCESSING DEVICE, INFORMATION SIGNAL PROCESSING METHOD, IMAGE SIGNAL PROCESSING DEVICE, IMAGE DISPLAYING DEVICE, DEVICE AND METHOD FOR PRODUCING CORRECTION DATA USED IN THEM, DEVICE AND METHOD FOR PRODUCING COEFFICIENT DATA, PROGRAMS FOR EXECUTING THESE METHODS, AND COMPUTER-READABLE MEDIUM FOR STORING THE PROGRAM

TECHNICAL FIELD

The present invention relates to an apparatus for processing informational signal and the like to which it is preferably applied when reducing an encoding noise of an informational signal obtained by decoding an encoded informational digital signal.

More specifically, the present invention relates to an apparatus for processing informational signal and the like in which a class to which informational data of a target position in an output informational signal belongs is detected based on an input informational signal and informational data corresponding to the target position in the output informational signal among items of the informational data constituting the input informational signal is corrected by using correction data that corresponds to the detected class to obtain informational data of the target position in this output informational signal, thereby enabling an encoding noise of the informational signal occurred in decoding the encoded informational digital signal to be well reduced.

The present invention also relates to an apparatus for processing informational signal and the like in which informational data, which corresponds to a target position in an output informational signal, among items of informational data constituting an input informational signal is corrected by using correction data that corresponds to a first class to which the target position in this output informational signal belongs and informational data of the target position in this output informational signal is generated based on an estimate equation by using multiple items of informational data, which are selected on the basis of the corrected informational data, positioned in a periphery of the target position in the output informational signal and coefficient data that corresponds to a second class to which the target position in this output informational signal belongs, thereby enabling an encoding noise of the informational signal occurred in decoding the encoded informational digital signal to be well reduced.

BACKGROUND ART

Encoding scheme according to a moving picture expert group (MPEG) phase using a discrete cosine transform (DCT) has been known as a compressive encoding scheme of image signal. DCT process is done such that the discrete cosine transform is executed on pixels within each block to obtain coefficient data and then, the coefficient data thus obtained by the discrete cosine transform is re-quantized and the re-quantized coefficient data is encoded in variable length. With respect to such the variable length encoding, entropy coding such as Huffman coding has been often used. Orthogonal transform coding is executed on image data so that it is divided into many items of frequency data from low frequency to high frequency.

It has such an characteristic that a high quality image can be maintained and also a high efficient compression can be implemented, according to the way that, when re-quantizing the divided frequency data, low-frequency-component data, which is more significant, is fine quantized with taking eyesight of human being into consideration while high-frequency-component data, which is less significant, is coarsely quantized with taking eyesight of human being into consideration.

In conventional DCT decoding, the quantized data for each frequency component is transformed to its central value and it performs inverse DCT (IDCT) on those components, thereby acquiring reproduced data. A quantization step width in encoding is used when transforming it to the central value.

As described in the above, the encoding scheme according to MPEG using DCT has such a characteristic that a high-quality image can be maintained and also a high efficient compression can be implemented by encoding with taking eyesight of human being into consideration.

However, the DCT encoding is an encoding process based on a unit of block and thus, it exhibits that, when the compression rate is higher, a block-like noise, a known block noise (block distortion) may occur. A blotchy noise, a known mosquito noise, due to a coarse quantization on the high-frequency component also occurs in a part of image such as an edge having sharp luminance transition.

Such the encoding noises (encoding distortion) may occur in not only the encoding scheme according to MPEG but also another encoding scheme.

DISCLOSURE OF THE INVENTION

An object of the present invention is to excellently reduce an encoding noise (encoding distortion) of informational signal occurred in decoding an encoded informational digital signal.

An apparatus relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising data selection means for selecting multiple items of first informational data positioned in a periphery of a target position in the second informational signal, based on the first informational signal, class detection means for detecting a class to which informational data of the target position belongs, based on the multiple items of first informational data selected by the data selection means, correction data generation means for generating correction data for correcting an encoding noise, the correction data corresponding to the class detected by the class detection means, and correction means for performing correction processing by use of the correction data generated by the correction data generation means on second informational data among the multiple items of informational data that constitute the first informational signal, the second informational data corresponding to the target position in the second informational signal, to obtain informational data of the target position in the second informational signal.

A method relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of selecting multiple items of first informational data positioned in a periphery of a target position in the second informational signal, based on the first informational signal, a second step of detecting a class to which informational data of the target position belongs, based on the multiple items of first informational data selected by the first step, a third step of generating correction data for correcting an encoding noise, the correction data corresponding to the class detected by the second step, and a fourth step of performing correction processing by use of the correction data generated by the third step on second informational data among the multiple items of informational data that constitute the first informational signal, the second informational data corresponding to the target position in the second informational signal, to obtain informational data of the target position in the second informational signal.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising data selection means for selecting multiple items of first pixel data positioned in a periphery of a target position in the second image signal, based on the first image signal, class detection means for detecting a class to which pixel data of the target position belongs, based on the multiple items of first pixel data selected by the data selection means, correction data generation means for generating correction data for correcting an encoding noise, the correction data corresponding to the class detected by the class detection means, and correction means for performing correction processing by use of the correction data generated by the correction data generation means on second pixel data among the multiple items of pixel data that constitute the first image signal, the second pixel data corresponding to the target position in the second image signal, to obtain pixel data of the target position in the second image signal.

An image display device relative to the invention comprises image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means, wherein the image-signal-processing means includes data selection means for selecting multiple items of first pixel data positioned in a periphery of a target position in the second image signal, based on the first image signal, class detection means for detecting a class to which pixel data of the target position belongs, based on the multiple items of first pixel data selected by the data selection means, correction data generation means for generating correction data for correcting an encoding noise, the correction data corresponding to the class detected by the class detection means, and correction means for performing correction processing by use of the correction data generated by the correction data generation means on second pixel data among the multiple items of pixel data that constitute the first image signal, the second pixel data corresponding to the target position in the second image signal, to obtain pixel data of the target position in the second image signal.

In the invention, the first informational signal comprised of multiple items of informational data is generated by decoding an encoded informational digital signal. Based on this first informational signal, multiple items of first informational data positioned in a periphery of the target position in the second informational signal are selected and, based on the multiple items of first informational data, a class to which informational data of the target position belongs is detected. As the informational signal, an image signal or an audio signal is considered, for example.

As described above, correction data for correcting an encoding noise that corresponds to the detected class is generated. For example, the correction data for each of the classes is stored in storage means, so that from this storage means, the correction data that corresponds to the detected class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Of multiple items of informational data that constitute the first informational signal, second informational data that corresponds to the target position in the second informational signal is subjected to correction processing by use of the above-mentioned generated correction data to generate informational data of the target position.

For example, the correction data includes difference data of number corresponding to the number of item(s) of the informational data of the target position in the second informational signal. In this case, if the number of item(s) of the informational data of the target position in the second informational signal is equal to that of the second informational data of the second informational data that corresponds to this target position, adding the corresponding correction data to each of the items of second informational data allows the corrected informational data to be obtained.

Further, in this case, if the number of items of the informational data of the target position in the second informational signal is N times (N is 2 or a larger integer) the number of item(s) of the second informational data corresponding to this target position, adding the corresponding second informational data to each of the items of correction data contained in each divided region obtained by dividing the correction data by N allows the corrected informational data to be obtained.

In such a manner, a class to which pixel data of a target position in the second informational signal belongs is detected on the basis of the first informational signal, and informational data corresponding to the target position in an informational output signal among items of the informational data that constitute the first informational signal is corrected using correction data that corresponds to the detected class to obtain informational data of the target position in the second informational signal, thereby well reducing an encoding noise (encoding distortion) in the informational signal obtained by decoding the encoded digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising data selection means for selecting multiple items of first informational data positioned in a periphery of a target position in the second informational signal, based on the first informational signal, class detection means for detecting a class to which informational data of the target position belongs, based on the multiple items of first informational data selected by the data selection means, correction data generation means for generating correction data for correcting an encoding noise relative to a frequency coefficient obtained by orthogonal transformation, the correction data corresponding to the class detected by the class detection means, orthogonal transformation means for performing orthogonal transformation on second informational data among the multiple items of informational data that constitute the first informational signal, the second informational data corresponding to the target position in the second informational signal, correction means for performing correction processing by use of the correction data generated by the correction data generation means on the frequency coefficient obtained by the orthogonal transformation means, and inverse orthogonal transformation means for performing inverse orthogonal transformation on the frequency coefficient corrected by the correction means to obtain the informational data of the target position in the second informational signal.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of selecting multiple items of first informational data positioned in a periphery of a target position in the second informational signal, based on the first informational signal, a second step of detecting a class to which informational data of the target position belongs, based on the multiple items of first informational data selected by the first step, a third step of generating correction data for correcting an encoding noise relative to a frequency coefficient obtained by orthogonal transformation, the correction data corresponding to the class detected by the second step, a fourth step of performing orthogonal transformation on second informational data among the multiple items of informational data that constitute the first informational signal, the second informational data corresponding to the target position in the second informational signal, a fifth step of performing correction processing by use of the correction data generated by the third step on the frequency coefficient obtained by the fourth step, and a sixth step of performing inverse orthogonal transformation on the frequency coefficient corrected by the fifth step to obtain the informational data of the target position in the second informational signal.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising data selection means for selecting multiple items of first pixel data positioned in a periphery of a target position in the second image signal, based on the first image signal, class detection means for detecting a class to which pixel data of the target position belongs, based on the multiple items of first pixel data selected by the data selection means, correction data generation means for generating correction data for correcting an encoding noise relative to a frequency coefficient obtained by orthogonal transformation, the correction data corresponding to the class detected by the class detection means, orthogonal transformation means for performing orthogonal transformation on second pixel data among the multiple items of pixel data that constitute the first image signal, the second pixel data corresponding to the target position in the second image signal, correction means for performing correction processing by use of the correction data generated by the correction data generation means on the frequency coefficient output from the orthogonal transformation means, and inverse orthogonal transformation means for performing inverse orthogonal transformation on the frequency coefficient output from the correction means to obtain the pixel data of the target position in the second image signal.

An image display device relative to the invention comprises image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. This image-signal-processing means has the same configuration as that of the above image-signal-processing means.

In the present invention, the first informational signal comprised of multiple items of informational data is generated by decoding the encoded information digital signal. Based on this first informational signal, multiple items of the first informational data positioned in the periphery of the target position in the second informational signal are selected and, based on the multiple items of first informational data, a class is detected to which informational data of the target position belongs. As the informational signal, an image signal or an audio signal is considered, for example.

As described above, the correction data for correcting an encoding noise that corresponds to the detected class is generated. For example, the correction data for each of the classes is stored in storage means, so that from this storage means, the correction data that corresponds to the detected class is read. This correction data is generated beforehand by using the student signal that corresponds to the first informational signal and a teacher signal that corresponds to the second informational signal. This student signal, for example, has been obtained by decoding the information digital signal obtained by encoding the teacher signal. In this case, the student signal contains an encoding noise (encoding distortion).

Of the multiple items of informational data that constitute the first informational signal, second informational data corresponding to the target position in the second informational signal is subjected to orthogonal transformation (discrete cosine transformation, wavelet transformation, discrete sine transformation, etc.). On the frequency coefficient obtained by this orthogonal transformation, correction processing which uses the correction data generated as described above is performed. On the corrected frequency coefficient, inverse orthogonal transformation is performed to obtain informational data of the target position.

For example, the correction data includes difference data of the number corresponding to the number of item(s) of the informational data of the target position in the second informational signal. In this case, if the number(s) of the informational data of the target position in the second informational signal is (are) equal to that of item(s) of the second informational data that corresponds to the target position, adding to each of the frequency coefficients obtained by performing orthogonal transformation on the second informational data the corresponding correction data allows a post-correction frequency coefficient to be obtained.

Further, in this case, if the number of items of the informational data of the target position in the second informational signal is N times (N is 2 or a larger integer) the number of item(s) of the second informational data corresponding to the target position, adding to the low-frequency component part of the correction data that corresponds to the frequency coefficient obtained by performing orthogonal transformation on the second informational data, the frequency coefficient obtained by performing orthogonal transformation on this second informational data allows a post-correction frequency coefficient to be obtained.

Further, for example, the correction data includes frequency coefficient of the number corresponding to the number of item(s) of the informational data of the target position in the second informational signal. In this case, if the number of items of the informational data of the target position in the second informational signal is N times (N is 2 or a larger integer) the number of item(s) of the second informational data corresponding to the target position, at least a low-frequency component part of the above-mentioned correction data that corresponds to the frequency coefficient obtained by performing orthogonal transformation on the second informational data is replaced by the frequency coefficient obtained by performing orthogonal transformation on the second informational data, to obtain a post-correction frequency coefficient.

In such a manner, the class to which pixel data of the target position in the second informational signal belongs is detected on the basis of the first informational signal, the frequency coefficient obtained by performing orthogonal transformation on informational data, which corresponds to the target position in an output informational signal, among items of informational data constituting the first informational signal is corrected using correction data that corresponds to the detected class, and inverse orthogonal transformation is performed on the corrected frequency coefficient to obtain informational data of the target position in the second informational signal, thereby well reducing the encoding noise (encoding distortion) of the informational signal obtained by decoding the encoded informational digital signal.

A unit for generating correction data relative to the invention is a unit for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the unit comprising decoding means for decoding informational digital signal obtained by encoding a teacher signal corresponding to the second informational signal, to obtain a student signal that corresponds to the first informational signal, class detection means for detecting a class to which informational data of a target position in the teacher signal belongs, based on at least the student signal output from the decoding means, subtraction means for performing subtraction processing by use of informational data among the multiple items of informational data that constitute the student signal, the informational data corresponding to the target position, on the informational data of the target position in the teacher signal, and operation means for averaging, for each class, output data of the subtraction means based on the class detected by the class detection means, to obtain correction data for each class.

A method for generating correction data relative to the invention is a method for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the method comprising a first step of decoding informational digital signal obtained by encoding a teacher signal corresponding to the second informational signal, to obtain a student signal that corresponds to the first informational signal, a second step of detecting a class to which informational data of a target position in the teacher signal belongs, based on at least the student signal obtained at the first step, a third step of performing subtraction processing by use of informational data among the multiple items of informational data that constitute the student signal, the informational data corresponding to the target position, on the informational data of the target position in the teacher signal, and a fourth step of averaging, for each class, data obtained at the third step based on the class detected at the second step, to obtain correction data for each class.

A program relative to the invention allows a computer to execute the above method for generating correction data. A computer-readable medium relative to the invention records the above program.

In the present invention, the first informational signal comprised of multiple items of informational data is an encoded informational digital signal. The present invention provides a unit for generating correction data for correcting an encoding noise, which is used when converting the first informational signal into a second informational signal comprised of multiple items of informational data.

The informational digital signal, which is obtained by encoding the teacher signal that corresponds to the second informational signal, is decoded, to obtain the student signal that corresponds to the first informational signal. Based on at least this student signal, the class to which informational data of a target position in the teacher signal belongs is detected.

The informational data of the target position in the teacher signal is subjected to subtraction processing by use of informational data corresponding to the target position among multiple items of informational data which constitute the student signal. Data obtained by this subtraction processing is averaged for each class based on the class detected as described above, thereby obtaining correction data for each class.

According to the above, correction data, which is used when converting the first informational signal into the second informational signal, is generated, but the correction data corresponding to the class to which informational data of the target position in the second informational signal belongs is selectively used at the time of the conversion of the first informational signal into the second information, thereby calculating the informational data of the target position. It is thus possible to well reduce the encoding noise of an informational signal obtained by decoding an encoded informational digital signal.

A unit for generating correction data relative to the invention is a unit for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the unit comprising decoding means for decoding informational digital signal obtained by encoding a teacher signal corresponding to the second informational signal, to obtain a student signal that corresponds to the first informational signal, class detection means for detecting a class to which informational data of a target position in the teacher signal belongs, based on at least the student signal output from the decoding means, first orthogonal transformation means for performing orthogonal transformation on informational data of the target position in the teacher signal to obtain a first frequency coefficient, second orthogonal transformation means for performing orthogonal transformation on informational data among multiple items of informational data that constitute the student signal, the informational data corresponding to the target position, to obtain a second frequency coefficient, subtraction means for performing subtraction processing by use of the second frequency coefficient obtained by the second orthogonal transformation means, on the first frequency coefficient obtained by the first orthogonal transformation means, and operation means for averaging, for each class, output data of the subtraction means based on the class detected by the class detection means, to obtain correction data for each class.

A method for generating correction data relative to the invention is a method for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the method comprising a first step of decoding informational digital signal obtained by encoding a teacher signal corresponding to the second informational signal, to obtain a student signal that corresponds to the first informational signal, a second step of detecting a class to which informational data of a target position in the teacher signal belongs, based on at least the student signal obtained at the first step, a third step of performing orthogonal transformation on informational data of the target position in the teacher signal to obtain a first frequency coefficient, a fourth step of performing orthogonal transformation on informational data among multiple items of informational data that constitute the student signal, the informational data corresponding to the target position, to obtain a second frequency coefficient, a fifth step of performing subtraction processing by use of the second frequency coefficient obtained by the fourth step, on the first frequency coefficient obtained by the third step, and a sixth step of averaging, for each class, data obtained at the fifth step based on the class detected by the second step, to obtain correction data for each class.

A program relative to the invention allows a computer to execute the above method for generating correction data. A computer-readable medium relative to the invention records the above program.

In the present invention, the first informational signal comprised of multiple items of informational data is an encoded informational digital signal. The present invention provides a unit for generating correction data for correcting an encoding noise, which is used when converting the first informational signal into a second informational signal comprised of multiple items of informational data.

The informational digital signal, which is obtained by encoding the teacher signal that corresponds to the second informational signal, is decoded, to obtain the student signal that corresponds to the first informational signal. Based on at least this student signal, the class to which informational data of a target position in the teacher signal belongs is detected.

The informational data of the target position in the teacher signal is subjected to orthogonal transformation to obtain the first frequency coefficient. Similarly, informational data corresponding to the target position among multiple items of informational data which constitute the student signal is subjected to orthogonal transformation to obtain the second frequency coefficient.

The first frequency coefficient is subjected to subtraction processing by use of the second frequency coefficient. Data obtained by this subtraction processing is averaged for each class based on the class detected as described above, thereby obtaining correction data for each class.

According to the above, correction data, which is used when converting the first informational signal into the second informational signal, is generated, but the correction data corresponding to the class to which informational data of the target position in the second informational signal belongs is selectively used at the time of the conversion of the first informational signal into the second information, thereby calculating the informational data of the target position. It is thus possible to well reduce the encoding noise of an informational signal obtained by decoding an encoded informational digital signal.

A unit for generating correction data relative to the invention is a unit for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the unit comprising decoding means for decoding informational digital signal obtained by encoding a teacher signal corresponding to the second informational signal, to obtain a student signal that corresponds to the first informational signal, class detection means for detecting a class to which informational data of a target position in the teacher signal belongs, based on at least the student signal output from the decoding means, and operation means for averaging, for each class, informational data of the target position in the teacher signal based on the class detected by the class detection means, to obtain correction data for each class.

A method for generating correction data relative to the invention is a method for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the method comprising a first step of decoding informational digital signal obtained by encoding a teacher signal corresponding to the second informational signal, to obtain a student signal that corresponds to the first informational signal, a second step of detecting a class to which informational data of a target position in the teacher signal belongs, based on at least the student signal obtained at the first step, and a third step of averaging, for each class, informational data of the target position in the teacher signal based on the class detected at the second step, to obtain correction data for each class.

A program relative to the invention allows a computer to execute the above method for generating correction data. A computer-readable medium relative to the invention records the above program.

In the present invention, the first informational signal comprised of multiple items of informational data is an encoded informational digital signal. The present invention provides a unit for generating correction data for correcting an encoding noise, which is used when converting the first informational signal into a second informational signal comprised of multiple items of informational data.

The informational digital signal, which is obtained by encoding the teacher signal that corresponds to the second informational signal, is decoded, to obtain the student signal that corresponds to the first informational signal. Based on at least this student signal, the class to which informational data of a target position in the teacher signal belongs is detected.

The informational data of the target position in the teacher signal is averaged for each class based on the class detected as described above, thereby obtaining correction data for each class.

According to the above, correction data, which is used when converting the first informational signal into the second informational signal, is generated, but the correction data corresponding to the class to which informational data of the target position in the second informational signal belongs is selectively used at the time of the conversion of the first informational signal into the second information, thereby calculating the informational data of the target position. It is thus possible to well reduce the encoding noise of an informational signal obtained by decoding an encoded informational digital signal.

A unit for generating correction data relative to the invention is a unit for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the unit comprising decoding means for decoding informational digital signal obtained by encoding a teacher signal corresponding to the second informational signal, to obtain a student signal that corresponds to the first informational signal, class detection means for detecting a class to which informational data of a target position in the teacher signal belongs, based on at least the student signal output from the decoding means, orthogonal transformation means for performing orthogonal transformation on informational data of the target position in the teacher signal to obtain a frequency coefficient, and operation means for averaging, for each class, the frequency coefficient obtained by the orthogonal transformation means based on the class detected by the class detection means, to obtain correction data for each class.

A method for generating correction data relative to the invention is a method for generating correction data for correcting an encoding noise, the correction data being used when converting a first informational signal comprised of multiple items of informational data, the first informational signal being obtained by decoding an encoded informational digital signal, into a second informational signal comprised of multiple items of informational data, the method comprising a first step of decoding informational digital signal obtained by encoding a teacher signal corresponding to the second informational signal, to obtain a student signal that corresponds to the first informational signal, a second step of detecting a class to which informational data of a target position in the teacher signal belongs, based on at least the student signal obtained at the first step, a third step of performing orthogonal transformation on informational data of the target position in the teacher signal to obtain a frequency coefficient, and a fourth step of averaging, for each class, the frequency coefficient obtained by the third step based on the class detected at the second step, to obtain correction data for each class.

A program relative to the invention allows a computer to execute the above method for generating correction data. A computer-readable medium relative to the invention records the above program.

In the present invention, the first informational signal comprised of multiple items of informational data is an encoded informational digital signal. The present invention provides a unit for generating correction data for correcting an encoding noise, which is used when converting the first informational signal into a second informational signal comprised of multiple items of informational data.

The informational digital signal, which is obtained by encoding the teacher signal that corresponds to the second informational signal, is decoded, to obtain the student signal that corresponds to the first informational signal. Based on at least this student signal, the class to which informational data of a target position in the teacher signal belongs is detected.

The informational data of the target position in the teacher signal is subjected to orthogonal transformation to obtain the frequency coefficient. The frequency coefficient is averaged for each class based on the class detected as described above, thereby obtaining correction data for each class.

According to the above, correction data, which is used when converting the first informational signal into the second informational signal, is generated, but the correction data corresponding to the class to which informational data of the target position in the second informational signal belongs is selectively used at the time of the conversion of the first informational signal into the second information, thereby calculating the informational data of the target position. It is thus possible to well reduce the encoding noise of an informational signal obtained by decoding an encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, correction means for performing correction processing by use of the correction data generated by the correction data generation means on informational data among the multiple items of informational data that constitute the first informational signal, the informational data corresponding to the target position in the second informational signal, coefficient data generation means for generating coefficient data used in an estimate equation, the coefficient data corresponding to a second class to which the informational data of the target position in the second informational signal belongs, data selection means for selecting multiple items of informational data positioned in a periphery of the target position in the second informational signal, based on the informational data corrected by the correction means, and informational data generation means for generating the informational data of the target position in the second informational signal based on the estimate equation by using the coefficient data generated by the coefficient data generation means and the multiple items of informational data selected by the data selection means.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of performing correction processing by use of the correction data generated at the first step on informational data among the multiple items of informational data that constitute the first informational signal, the informational data corresponding to the target position in the second informational signal, a third step of generating coefficient data used in an estimate equation, the coefficient data corresponding to a second class to which the informational data of the target position in the second informational signal belongs, a fourth step of selecting multiple items of informational data positioned in a periphery of the target position in the second informational signal, based on the informational data corrected at the second step, and a fifth step of generating the informational data of the target position in the second informational signal based on the estimate equation by using the coefficient data generated at the third step and the multiple items of informational data selected at the fourth step.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal obtained by decoding an encoded digital image signal, is converted into a second image signal comprised of multiple items of pixel data, the apparatus comprising correction data generation means for generating correction data for correcting an encoding noise, the correction data corresponding to a first class to which pixel data of a target position in the second image signal belongs, correction means for performing correction processing by use of the correction data generated by the correction data generation means on pixel data among the multiple items of pixel data that constitute the first image signal, the pixel data corresponding to the target position in the second image signal, coefficient data generation means for generating coefficient data used in an estimate equation, the coefficient data corresponding to a second class to which the pixel data of the target position in the second image signal belongs, data selection means for selecting multiple items of pixel data positioned in a periphery of the target position in the second image signal, based on the pixel data corrected by the correction means, and pixel data generation means for generating the pixel data of the target position in the second image signal based on the estimate equation by using the coefficient data generated by the coefficient data generation means and the multiple items of pixel data selected by the data selection means.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means, wherein the image-signal-processing means comprises correction data generation means for generating correction data for correcting an encoding noise, the correction data corresponding to a first class to which pixel data of a target position in the second image signal belongs, correction means for performing correction processing by use of the correction data generated by the correction data generation means on pixel data among the multiple items of pixel data that constitute the first image signal, the pixel data corresponding to the target position in the second image signal, coefficient data generation means for generating coefficient data used in an estimate equation, the coefficient data corresponding to a second class to which the pixel data of the target position in the second image signal belongs, data selection means for selecting multiple items of pixel data positioned in a periphery of the target position in the second image signal, based on the pixel data corrected by the correction means, and pixel data generation means for generating the pixel data of the target position in the second image signal based on the estimate equation by using the coefficient data generated by the coefficient data generation means and the multiple items of pixel data selected by the data selection means.

In the invention, the first informational signal comprised of multiple items of informational data is generated by decoding an encoded informational digital signal. As the informational signal, an image signal or an audio signal is considered, for example.

The correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Of multiple items of informational data that constitute the first informational signal, informational data that corresponds to the target position in the second informational signal is subjected to correction processing by use of the above-mentioned generated correction data. Multiple items of the informational data positioned at a periphery of the target position in the second informational signal are selected based on the corrected informational data.

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer.

The informational data of the target position in the second informational signal is generated based on the estimate equation by using the multiple items of the informational data positioned at the periphery of the target position in the second informational signal and the coefficient data corresponding to the second class to which the informational data of the target position belongs.

In such a manner, the informational data, which corresponds to the target position of the second informational signal, among items of the informational data that constitute the first informational signal is corrected using the correction data corresponding to the first class to which the target position in the second informational signal belongs, and informational data of the target position in the second informational signal is generated based on the estimate equation using multiple items of informational data positioned at a periphery of the target position in the second informational signal, which are selected on the basis of the corrected informational data, and the coefficient data that corresponds to the second class to which the target position in the second informational signal belongs, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, orthogonal transformation means for performing orthogonal transformation on informational data among the multiple items of informational data that constitute the first informational signal, the informational data corresponding to a periphery of the target position in the second informational signal, correction means for performing correction processing on a frequency coefficient obtained by the orthogonal transformation means by use of the correction data generated by the correction data generation means, coefficient data generation means for generating coefficient data used in an estimate equation, the coefficient data corresponding to a second class to which informational data of the target position in the second informational signal belongs, frequency coefficient selection means for selecting plural frequency coefficients each corresponding to the periphery of the target position in the second informational signal based on the frequency coefficient corrected by the correction means, frequency coefficient generation means for generating a frequency coefficient corresponding to the informational data of the target position in the second informational signal based on the estimate equation by using the coefficient data generated by the coefficient data generation means and the plural frequency coefficients selected by the frequency coefficient selection means, and inverse orthogonal transformation means for obtaining the informational data of the target position in the second informational signal by performing inverse orthogonal transformation on the frequency coefficient generated by the frequency coefficient generation means.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of performing orthogonal transformation on informational data among the multiple items of informational data that constitute the first informational signal, the informational data corresponding to a periphery of the target position in the second informational signal, a third step of performing correction processing on a frequency coefficient obtained at the second step by use of the correction data generated at the first step, a fourth step of generating coefficient data used in an estimate equation, the coefficient data corresponding to a second class to which informational data of the target position in the second informational signal belongs, a fifth step of selecting plural frequency coefficients each corresponding to the periphery of the target position in the second informational signal based on the frequency coefficient corrected at the third step, a sixth step of generating a frequency coefficient corresponding to the informational data of the target position in the second informational signal based on the estimate equation by using the coefficient data generated at the fourth step and the plural frequency coefficients selected at the fifth step, and a seventh step of obtaining the informational data of the target position in the second informational signal by performing inverse orthogonal transformation on the frequency coefficient generated at the sixth step.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, orthogonal transformation means for performing orthogonal transformation on pixel data among the multiple items of pixel data that constitute the first image signal, the pixel data corresponding to a periphery of the target position in the second image signal, correction means for performing correction processing on a frequency coefficient obtained by the orthogonal transformation means by use of the correction data generated by the correction data generation means, coefficient data generation means for generating coefficient data used in an estimate equation, the coefficient data corresponding to a second class to which pixel data of the target position in the second image signal belongs, frequency coefficient selection means for selecting plural frequency coefficients each corresponding to the periphery of the target position in the second image signal based on the frequency coefficient corrected by the correction means, frequency coefficient generation means for generating a frequency coefficient corresponding to the pixel data of the target position in the second image signal based on the estimate equation by using the coefficient data generated by the coefficient data generation means and the plural frequency coefficients selected by the frequency coefficient selection means, and inverse orthogonal transformation means for obtaining the pixel data of the target position in the second image signal by performing inverse orthogonal transformation on the frequency coefficient generated by the frequency coefficient generation means.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Of the multiple items of informational data that constitute the first informational signal, informational data corresponding to a periphery of the target position in the second informational signal is subjected to orthogonal transformation (discrete cosine transformation, wavelet transformation, discrete sine transformation, etc.). On the frequency coefficient obtained by this orthogonal transformation, correction processing which uses the correction data generated as described above is performed.

Based on the corrected frequency coefficient, the plural frequency coefficients each corresponding to the periphery of the target position in the second informational signal are selected. Further, the coefficient data used in an estimate equation, which corresponds to a second class to which the pixel data of the target position in the second image signal belongs, is generated. For example, the second class is the same as the first class. Alternatively, class classification relating to the second class is the one obtained by making class classification relating to said first class finer.

A frequency coefficient corresponding to the pixel data of the target position in the second image signal is generated based on the estimate equation by using the plural frequency coefficients corresponding to the periphery of the target position in the second informational signal and the coefficient data corresponding to the second class to which informational data of the target position belongs. The inverse orthogonal transformation is then performed on the generated frequency coefficient, thereby obtaining informational data of the target position.

In such a manner, frequency coefficient obtained by performing the orthogonal transformation on informational data, which corresponds to the target position in the output signal, among items of informational data that constitute the first informational signal is corrected using the correction data corresponding to the first class to which the target position in the second informational signal belongs, and frequency coefficient corresponding to informational data of the target position in the second informational signal is generated based on the estimate equation using plural frequency coefficients, which are selected based on the corrected frequency coefficient, each frequency coefficient corresponding to the periphery of the target position in the second informational signal and coefficient data corresponding to the second class to which the target position in the second informational signal belongs, so that informational data of the target position in the second informational signal is obtained by performing orthogonal transformation on the frequency coefficient, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, first data selection means for selecting multiple items of informational data positioned in a periphery of the target position in the second informational signal, based on the first informational signal, second data selection means for selecting multiple items of correction data that corresponds to the multiple items of informational data selected by the first data selection means, based on the correction data generated by the correction data generation means, coefficient data generation means for generating coefficient data used in an estimate equation, the coefficient data corresponding to a second class to which informational data of the target position in the second informational signal belongs, and informational data generation means for generating the informational data of the target position in the second informational signal based on the estimate equation by using the coefficient data generated by the coefficient data generation means, the multiple items of informational data selected by the first data selection means, and the multiple items of correction data selected by the second data selection means.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of selecting multiple items of informational data positioned in a periphery of a target position in the second informational signal, based on the first informational signal, a third step of selecting multiple items of correction data that corresponds to the multiple items of informational data selected at the second step, based on the correction data generated at the first step, a fourth step of generating coefficient data used in an estimate equation, the coefficient data corresponding to a second class to which informational data of the target position in the second informational signal belongs, and a fifth step of generating the informational data of the target position in the second informational signal based on the estimate equation by using the coefficient data generated at the fourth step, the multiple items of informational data selected at the second step, and the multiple items of correction data selected at the third step.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, first data selection means for selecting multiple items of pixel data positioned in a periphery of the target position in the second image signal, based on the first image signal, second data selection means for selecting multiple items of correction data that corresponds to the multiple items of pixel data selected by the first data selection means, based on the correction data generated by the correction data generation means, coefficient data generation means for generating coefficient data used in an estimate equation, the coefficient data corresponding to a second class to which pixel data of the target position in the second image signal belongs, and pixel data generation means for generating the pixel data of the target position in the second image signal based on the estimate equation by using the coefficient data generated by the coefficient data generation means, the multiple items of pixel data selected by the first data selection means, and the multiple items of correction data selected by the second data selection means.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Based on the first informational signal, the multiple items of informational data positioned in a periphery of the target position in the second informational signal are selected and, based on the above generated correction data, multiple items of the correction data corresponding to the selected items of informational data are selected.

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer.

Informational data of the target position in the second informational signal is generated based on the estimate equation by using the multiple items of informational data positioned at the periphery of the target position in the second informational signal, the multiple items of correction data corresponding to the multiple items of informational data, and the coefficient data corresponding to the second class to which informational data of the target position belongs.

In such a manner, the informational data of the target position in the second informational signal is generated based on the estimate equation by using the multiple items of informational data, which are selected based on the first informational signal, positioned at the periphery of the target position in the second informational signal, the multiple items of correction data corresponding to the multiple items of informational data that are selected based on the correction data of the first class to which the target position in the second informational signal belongs, and the coefficient data corresponding to the second class to which informational data of the target position in the second informational signal belongs, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, orthogonal transformation means for performing orthogonal transformation on informational data among the multiple items of informational data that constitute the first informational signal, the informational data corresponding to a periphery of the target position in the second informational signal, frequency coefficient selection means for selecting plural frequency coefficients each corresponding to the periphery of the target position in the second informational signal based on a frequency coefficient obtained by the orthogonal transformation means, correction data selection means for selecting multiple items of correction data corresponding to the plural frequency coefficients selected by the frequency coefficient selection means, based on the correction data generated by the correction data generation means, coefficient data generation means for generating coefficient data used in an estimate equation, the coefficient data corresponding to a second class to which informational data of the target position in the second informational signal belongs, frequency coefficient generation means for generating a frequency coefficient corresponding to the informational data of the target position in the second informational signal based on the estimate equation by using the coefficient data generated by the coefficient data generation means, the plural frequency coefficients selected by the frequency coefficient selection means, and the multiple items of correction data selected by the correction data selection means, and inverse orthogonal transformation means for performing inverse orthogonal transformation on the frequency coefficient generated by the frequency coefficient generation means to obtain the informational data of the target position in the informational signal.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of performing orthogonal transformation on informational data among the multiple items of informational data that constitute the first informational signal, the informational data corresponding to a periphery of the target position in the second informational signal, a third step of selecting plural frequency coefficients each corresponding to the periphery of the target position in the second informational signal based on the frequency coefficient obtained at the second step, a fourth step of selecting multiple items of correction data corresponding to the plural frequency coefficients selected at the third step, based on the correction data generated at the first step, a fifth step of generating coefficient data used in an estimate equation, the coefficient data corresponding to a second class to which informational data of the target position in the second informational signal belongs, a sixth step of generating a frequency coefficient corresponding to the informational data of the target position in the second informational signal based on the estimate equation by using the coefficient data generated at the fifth step, the plural frequency coefficients selected at the third step, and the multiple items of correction data selected at the fourth step, and a seventh step of performing inverse orthogonal transformation on the frequency coefficient generated at the sixth step to obtain the informational data of the target position in the second informational signal.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, orthogonal transformation means for performing orthogonal transformation on pixel data among the multiple items of pixel data that constitute the first image signal, the pixel data corresponding to a periphery of the target position in the second image signal, frequency coefficient selection means for selecting plural frequency coefficients each corresponding to the periphery of the target position in the second image signal based on a frequency coefficient obtained by the orthogonal transformation means, correction data selection means for selecting multiple items of correction data corresponding to the plural frequency coefficients selected by the frequency coefficient selection means, based on the correction data generated by the correction data generation means, coefficient data generation means for generating coefficient data used in an estimate equation, the coefficient data corresponding to a second class to which pixel data of the target position in the second image signal belongs, frequency coefficient generation means for generating a frequency coefficient corresponding to the pixel data of the target position in the second image signal based on the estimate equation by using the coefficient data generated by the coefficient data generation means, the plural frequency coefficients selected by the frequency coefficient selection means, and the multiple items of correction data selected by the correction data selection means, and inverse orthogonal transformation means for performing inverse orthogonal transformation on the frequency coefficient generated by the frequency coefficient generation means to obtain the pixel data of the target position in the second image signal.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Of the multiple items of informational data that constitute the first informational signal, informational data corresponding to a periphery of the target position in the second informational signal is subjected to orthogonal transformation (discrete cosine transformation, wavelet transformation, discrete sine transformation, etc.). Based on the frequency coefficient obtained by this orthogonal transformation, the plural frequency coefficients corresponding to the target position in the second informational signal are selected and based on the generated correction data, as describe the above, the multiple items of correction data corresponding to the plural frequency coefficients are selected.

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer.

Frequency coefficient corresponding to the informational data of the target position in the second informational signal is generated based on the estimate equation by using the plural frequency coefficients corresponding to the periphery of the target position in the second informational signal, the multiple items of correction data corresponding to the plural frequency coefficients, and the coefficient data corresponding to the second class to which informational data of the target position belongs. The generated frequency coefficient is subject to inverse orthogonal transformation, thereby obtaining the informational data of the target position.

In such a manner, the frequency coefficient corresponding to the informational data of the target position in the second informational signal is generated based on the estimate equation by using the multiple items of informational data, positioned at the periphery of the target position in the second informational signal, which are selected based on the frequency coefficient obtained by performing orthogonal transformation on the informational data, which corresponds to the target position in the output informational signal, among the items of informational data that constitute the first informational signal, the multiple items of correction data corresponding to the multiple items of informational data that are selected based on the correction data of the first class to which the target position in the second informational signal belongs, and the coefficient data corresponding to the second class to which informational data of the target position in the second informational signal belongs, so that the frequency coefficient is subject to the inverse orthogonal transformation to obtain the informational data of the target position in the second informational signal, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, data selection means for selecting multiple items of correction data corresponding to a periphery of the target position in the second informational signal based on the correction data generated by the correction data generation means, coefficient data generation means for generating coefficient data used in an estimate equation, the coefficient data corresponding to a second class to which the informational data of the target position in the second informational signal belongs, correction data generation means for generating correction data corresponding to the informational data of the target position in the second informational signal based on the estimate equation by using the coefficient data generated by the coefficient data generation means and the multiple items of correction data selected by the data selection means, and informational data generation means for performing correction processing by use of the correction data generated by the correction data generation means on the informational data, which corresponds to the target position in the second informational signal, among the multiple items of informational data that constitute the first informational signal to generate the informational data of the target position in the second informational signal.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of selecting multiple items of correction data corresponding to a periphery of the target position in the second informational signal based on the correction data generated at the first step, a third step of generating coefficient data used in an estimate equation, the coefficient data corresponding to a second class to which the informational data of the target position in the second informational signal belongs, a fourth step of generating correction data corresponding to the informational data of the target position in the second informational signal based on the estimate equation by using the coefficient data generated at the step third step and the multiple items of correction data selected at the second step, and a fifth step of performing correction processing by use of the correction data generated at the fourth step on informational data, which corresponds to the target position in the second informational signal, among the multiple items of informational data that constitute the first informational signal to generate informational data of the target position in the second informational signal.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, data selection means for selecting multiple items of correction data corresponding to a periphery of the target position in the second image signal based on the correction data generated by the correction data generation means, coefficient data generation means for generating coefficient data used in an estimate equation, the coefficient data corresponding to a second class to which the pixel data of the target position in the second image signal belongs, correction data generation means for generating correction data corresponding to the pixel data of the target position in the second image signal based on the estimate equation by using the coefficient data generated by the coefficient data generation means and the multiple items of correction data selected by the data selection means, and pixel data generation means for performing correction processing by use of the correction data generated by the correction data generation means on the pixel data, which corresponds to the target position in the second image signal, among the multiple items of pixel data that constitute the first image signal to generate the pixel data of the target position in the second image signal.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer. As described above, based on the generated correction data, the multiple items of correction data corresponding to the periphery of the target position in the second informational signal are generated.

Correction data corresponding to the informational data of the target position in the second informational signal is generated based on the estimate equation by using the multiple items of correction data corresponding to the periphery of the target position in the second informational signal and the coefficient data corresponding to the second class to which informational data of the target position belongs.

The second informational data, which corresponds to the target position in the second image signal, among the multiple items of informational data that constitute the first image signal is subject to correction processing by use of the generated correction data as described above to generate the informational data of the target position in the second image signal.

In such a manner, the correction data corresponding to the informational data of the target position in the second informational signal is generated based on the estimate equation by using the correction data of the first class to which the target position in the second informational signal belongs, and coefficient data corresponding to the second class to which the target position in the second image signal belongs so that the informational data, which corresponds to the target position in the second informational signal, among items of informational data that constitute the first informational signal is corrected using the generated correction data, as described above, to generate the informational data of the target position in the second informational signal, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, orthogonal transformation means for performing orthogonal transformation on informational data among the multiple items of informational data that constitute the first informational signal, the informational data corresponding to a periphery of the target position in the second informational signal, data selection means for selecting multiple items of correction data corresponding to the periphery of the target position in the second informational signal, based on the correction data generated by the correction data generation means, coefficient data generation means for generating coefficient data used in an estimate equation, the coefficient data corresponding to a second class to which informational data of the target position in the second informational signal belongs, correction data generation means for generating correction data corresponding to the informational data of the target position in the second informational signal based on the estimate equation by using the coefficient data generated by the coefficient data generation means, and the multiple items of correction data selected by the data selection means, frequency coefficient generation means for generating a frequency coefficient corresponding to the informational data of the target position in the second informational signal by performing correction processing by use of the correction data generated by the correction data generation means on the frequency coefficient obtained by the orthogonal transformation means, and inverse orthogonal transformation means for performing inverse orthogonal transformation on the frequency coefficient generated by the frequency coefficient generation means to obtain the informational data of the target position in the informational signal.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of performing orthogonal transformation on informational data among the multiple items of informational data that constitute the first informational signal, the informational data corresponding to the periphery of the target position in the second informational signal, a third step of selecting multiple items of correction data corresponding to the periphery of the target position in the second informational signal, based on the correction data generated at the first step, a fourth step of generating such coefficient data used in an estimate equation, the coefficient data corresponding to a second class to which informational data of the target position in the second informational signal belongs, a fifth step of generating correction data corresponding to the informational data of the target position in the second informational signal based on the estimate equation by using the coefficient data generated at the fourth step and the multiple items of correction data selected at the third step, a sixth step of generating a frequency coefficient corresponding to the informational data of the target position in the second informational signal by performing correction processing by use of the correction data generated at the fifth step on the frequency coefficient obtained at the second step, and a seventh step of performing inverse orthogonal transformation on the frequency coefficient generated at the sixth step to obtain the informational data of the target position in the second informational signal.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, orthogonal transformation means for performing orthogonal transformation on pixel data among the multiple items of pixel data that constitute the first image signal, the pixel data corresponding to a periphery of the target position in the second image signal, data selection means for selecting multiple items of correction data corresponding to the periphery of the target position in the second image signal, based on the correction data generated by the correction data generation means, coefficient data generation means for generating coefficient data used in an estimate equation, the coefficient data corresponding to a second class to which pixel data of the target position in the second image signal belongs, correction data generation means for generating correction data corresponding to the pixel data of the target position in the second image signal based on the estimate equation by using the coefficient data generated by the coefficient data generation means and the multiple items of correction data selected by the data selection means, frequency coefficient generation means for generating a frequency coefficient corresponding to the pixel data of the target position in the second image signal by performing correction processing by use of the correction data generated by the correction data generation means on the frequency coefficient obtained by the orthogonal transformation means, and inverse orthogonal transformation means for performing inverse orthogonal transformation on the frequency coefficient generated by the frequency coefficient generation means to obtain the pixel data of the target position in the second image signal.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer. As described above, based on the generated correction data, the multiple items of correction data corresponding to the periphery of the target position in the second informational signal are generated.

Correction data corresponding to the informational data of the target position in the second informational signal is generated based on the estimate equation by using the multiple items of correction data corresponding to the periphery of the target position in the second informational signal and the coefficient data corresponding to the second class to which informational data of the target position belongs.

Of the multiple items of informational data that constitute the first informational signal, pixel data corresponding to a periphery of the target position in the second informational signal is subjected to orthogonal transformation (discrete cosine transformation, wavelet transformation, discrete sine transformation, etc.). On the frequency coefficient obtained by this orthogonal transformation, the correction processing using the generated correction data, as described above, is performed to generate frequency coefficient corresponding to the informational data of the target position in the second informational signal. The generated frequency coefficient is then subject to inverse orthogonal transformation, thereby obtaining the informational data of the target position.

In such a manner, the correction data corresponding to the informational data of the target position in the second informational signal is generated based on the estimate equation by using the correction data of the first class to which the target position in the second informational signal belongs, and coefficient data corresponding to the second class to which the target position in the second image signal belongs so that the frequency coefficient obtained by performing orthogonal transformation on the informational data, which corresponds to the target position in the output informational signal, among items of informational data that constitute the first informational signal is corrected using the generated correction data, as described above, to generate the frequency coefficient corresponding to the informational data of the target position in the second informational signal, and to perform inverse orthogonal transformation on the frequency coefficient thus generated and obtain the informational data of the target position in the second informational signal, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, data selection means for selecting multiple items of informational data positioned in a periphery of the target position in the second informational signal, based on the first informational signal, coefficient data generation means for generating coefficient data used in an estimate equation, the coefficient data corresponding to a second class to which informational data of the target position in the second informational signal belongs, data generation means for generating data corresponding to the informational data of the target position in the second informational signal based on the estimate equation by using the coefficient data generated by the coefficient data generation means, and the multiple items of informational data selected by the data selection means, informational data generation means for generating the informational data of the target position in the second informational signal by performing correction processing by use of the correction data generated by the correction data generation means on the data generated by the data generation means.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of selecting multiple items of informational data positioned in a periphery of the target position in the second informational signal, based on the first informational signal, a third step of generating coefficient data used in an estimate equation, the coefficient data corresponding to a second class to which informational data of the target position in the second informational signal belongs, a fourth step of generating data corresponding to the informational data of the target position in the second informational signal based on the estimate equation by using the coefficient data generated at the third step and the multiple items of informational data selected at the second step, and a fifth step of generating the informational data of the target position in the second informational signal by performing correction processing by use of the correction data generated at the first step on the data generated at the fourth step.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, data selection means for selecting multiple items of pixel data positioned in a periphery of the target position in the second image signal, based on the first image signal, coefficient data generation means for generating coefficient data used in an estimate equation, the coefficient data corresponding to a second class to which pixel data of the target position in the second image signal belongs, data generation means for generating data corresponding to the pixel data of the target position in the second image signal based on the estimate equation by using the coefficient data generated by the coefficient data generation means and the multiple items of pixel data selected by the data selection means, and pixel data generation means for generating the pixel data of the target position in the second image signal by performing correction processing by use of the correction data generated by the correction data generation means on the data generated by the data generation means.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer.

Correction data corresponding to the informational data of the target position in the second informational signal is generated based on the estimate equation by using the multiple items of correction data corresponding to the periphery of the target position in the second informational signal and the coefficient data corresponding to the second class to which informational data of the target position belongs.

Based on the first informational signal, multiple items of informational data positioned in a periphery of the target position in the second informational signal are selected. The data corresponding to the informational data of the target position in the second informational signal is generated based on the estimate equation by using the multiple items of informational data positioned in a periphery of the target position in the second informational signal and the coefficient data corresponding to the second class to which informational data of the target position belongs. Correction processing using the correction data generated as described above is performed on the data, thereby obtaining the informational data of the target position in the second informational signal.

In such a manner, the data corresponding to the informational data of the target position in the second informational signal is generated based on the estimate equation by using the multiple items of informational data, which are selected based on the first informational signal, positioned in a periphery of the target position in the second informational signal, and coefficient data corresponding to the second class to which the target position in the second image signal belongs so that the data is corrected using the correction data of the first class to which the target position in the second informational signal belongs to generate the informational data of the target position in the second informational signal, thereby well reducing an encoding noise in the informational signal obtained by decoding the encoded informational digital signal.

An apparatus for processing informational signal relative to the invention is an apparatus for processing informational signal in which a first informational signal comprised of multiple items of informational data, the first informational signal being obtained by decoding an encoded informational digital signal, is converted into a second informational signal comprised of multiple items of informational data, the apparatus comprising correction data generation means for generating correction data for correcting an encoding noise, the correction data corresponding to a first class to which informational data of a target position in the second informational signal belongs, orthogonal transformation means for performing orthogonal transformation on informational data among the multiple items of informational data that constitute the first informational signal, the informational data corresponding to a periphery of the target position in the second informational signal, frequency coefficient selection means for selecting plural frequency coefficients each corresponding to the periphery of the target position in the second informational signal based on a frequency coefficient obtained by the orthogonal transformation means, coefficient data generation means for generating coefficient data used in an estimate equation, the coefficient data corresponding to a second class to which informational data of the target position in the second informational signal belongs, data generation means for generating data corresponding to the informational data of the target position in the second informational signal based on the estimate equation by using the coefficient data generated by the coefficient data generation means and the plural frequency coefficients selected by the frequency coefficient selection means, frequency coefficient generation means for generating a frequency coefficient corresponding to the informational data of the target position in the second informational signal by performing correction processing by use of the correction data generated by the correction data generation means on the data generated by the data generation means, and inverse orthogonal transformation means for performing inverse orthogonal transformation on the frequency coefficient generated by the frequency coefficient generation means to obtain the informational data of the target position in the second informational signal.

A method for processing informational signal relative to the invention is a method for processing informational signal in which a first informational signal comprised of multiple items of informational data, the first informational signal being obtained by decoding an encoded informational digital signal, is converted into a second informational signal comprised of multiple items of informational data, the method comprising a first step of generating correction data for correcting an encoding noise, the correction data corresponding to a first class to which informational data of a target position in the second informational signal belongs, a second step of performing orthogonal transformation on informational data among the multiple items of informational data that constitute the first informational signal, the informational data corresponding to a periphery of the target position in the second informational signal, a third step of selecting plural frequency coefficients each corresponding to the periphery of the target position in the second informational signal based on a frequency coefficient obtained by the orthogonal transformation means, a fourth step of generating coefficient data used in an estimate equation, the coefficient data corresponding to a second class to which the informational data of the target position in the second informational signal belongs, a fifth step of generating data corresponding to the informational data of the target position in the second informational signal based on the estimate equation by using the coefficient data generated at the fourth step and the plural frequency coefficients selected at the third step, a sixth step of generating a frequency coefficient corresponding to the informational data of the target position in the second informational signal by performing correction processing by use of the correction data produced at the first step on the data generated at the fifth step, and a seventh step of performing inverse orthogonal transformation on the frequency coefficient generated at the sixth step to obtain the informational data of the target position in the second informational signal.

A program relative to the invention allows a computer to execute the above method for processing informational signal. A computer-readable medium relative to the invention records the above program.

A device for processing image signal relative to the invention is a device for processing image signal in which a first image signal comprised of multiple items of pixel data, the first image signal being obtained by decoding an encoded digital image signal, is converted into a second image signal comprised of multiple items of pixel data, the device comprising correction data generation means for generating correction data for correcting an encoding noise, the correction data corresponding to a first class to which pixel data of a target position in the second image signal belongs, orthogonal transformation means for performing orthogonal transformation on pixel data among the multiple items of pixel data that constitute the first image signal, the pixel data corresponding to a periphery of the target position in the second image signal, frequency coefficient selection means for selecting plural frequency coefficients each corresponding to the periphery of the target position in the second image signal based on a frequency coefficient obtained by the orthogonal transformation means, coefficient data generation means for generating coefficient data used in an estimate equation, the coefficient data corresponding to a second class to which pixel data of the target position in the second image signal belongs, data generation means for generating data corresponding to the pixel data of the target position in the second image signal based on the estimate equation by using the coefficient data generated by the coefficient data generation means and the plural frequency coefficients selected by the frequency coefficient selection means, frequency coefficient generation means for generating a frequency coefficient corresponding to the pixel data of the target position in the second image signal by performing correction processing by use of the correction data generated by the correction data generation means on the data generated by the data generation means, and inverse orthogonal transformation means for performing inverse orthogonal transformation on the frequency coefficient generated by the frequency coefficient generation means to obtain the pixel data of the target position in the second image signal.

An image display device relative to the invention is an image display device comprising image signal input means for allowing a first image signal comprised of multiple items of pixel data to be input, the first image signal being obtained by decoding an encoded digital image signal, image-signal-processing means for converting the first image signal input through the image signal input means into a second image signal comprised of multiple items of pixel data and outputting it, and image display means for displaying an image on an image display element thereof, the image being due to the second image signal output from the image-signal-processing means. The image-signal-processing means has same configuration as that of the above apparatus for processing image signal.

In the invention, the first informational signal comprised of multiple items of informational data is generated by decoding an encoded informational digital signal. As the informational signal, an image signal or an audio signal is considered, for example.

Correction data for correcting an encoding noise that corresponds to the first class to which the informational data of the target position in the second informational signal belongs is generated. For example, the correction data for each of the classes is stored in storage means, so that from this storage means, the correction data that corresponds to the first class is read. This correction data is generated beforehand by using a student signal that corresponds to the first informational signal and a teacher signal that corresponds to the second informational signal. This student signal, for example, has been obtained by decoding an informational digital signal obtained by encoding the teacher signal. In such the case, the student signal contains an encoding noise (encoding distortion).

Coefficient data, which is used in the estimate equation, corresponding to the second class to which informational data of the target position in the second informational signal belongs is generated. For example, the second class is the same as the first class. Alternatively, class classification relating to the second class is the one obtained by making class classification relating to said first class finer. As described above, based on the generated correction data, the multiple items of correction data corresponding to the periphery of the target position in the second informational signal are generated.

Of the multiple items of informational data that constitute the first informational signal, pixel data corresponding to a periphery of the target position in the second informational signal is subjected to orthogonal transformation (discrete cosine transformation, wavelet transformation, discrete sine transformation, etc.). Based on the frequency coefficient obtained by this orthogonal transformation, the plural frequency coefficients corresponding to the periphery of the target position in the second informational signal are selected.

The data corresponding to the informational data of the target position in the second informational signal is generated based on the estimate equation by using the plural frequency coefficients corresponding to the periphery of the target position in the second informational signal and the coefficient data corresponding to the second class to which informational data of the target position belongs. The generated data is then subject to correction processing using the correction data generated as described above, thereby generating the frequency coefficient corresponding to the informational data of the target position in the second informational signal. The generated frequency coefficient is then subject to inverse orthogonal transformation, thereby obtaining the informational data of the target position.

In such a manner, the data corresponding to the informational data of the target position in the second informational signal is generated based on the estimate equation by using the plural frequency coefficients, which positioned in the periphery of the target position in the second informational signal, selected based on the frequency coefficient obtained by performing orthogonal transformation on informational data, which corresponds to the target position in the output informational signal, among the items of informational data that constitute the first informational signal and the coefficient data corresponding to the second class to which the target position belongs, so that the data is subject to the correction by use of the correction data of the first class to which the target position in the second informational signal belongs to generate frequency coefficient corresponding to the informational data of the target position in the second informational signal and to perform inverse orthogonal transformation on the frequency coefficient and obtain the informational data of the target position in the second informational signal, thereby well reducing an encoding noise in the informational signal obtained by decoding the encoded informational digital signal.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, correction data generation means for generating correction data for correcting an encoding noise, the correction data corresponding to a first class to which informational data of a target position in the teacher signal belongs, correction means for performing correction processing by use of the correction data generated by the correction data generation means on informational data among multiple items of informational data that constitute the student signal output from the decoding means, the informational data corresponding to the target position in the teacher signal, data selection means for selecting multiple items of informational data positioned in a periphery of the target position in the teacher signal, based on the informational data corrected by the correction means, and coefficient data generation means for generating the coefficient data for each class by using a second class to which the informational data of the target position in the teacher signal belongs, the multiple items of informational data selected by the data selection means, and the informational data of the target position in the teacher signal.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of generating correction data for correcting an encoding noise, the correction data corresponding to a first class to which informational data of a target position in the teacher signal belongs, a third step of performing correction processing by use of the correction data generated at the second step on informational data among multiple items of informational data that constitute the student signal obtained at the first step, the informational data corresponding to the target position in the teacher signal, a fourth step of selecting multiple items of informational data positioned in a periphery of the target position in the teacher signal, based on the informational data corrected at the third step, and a fifth step of generating the coefficient data for each class by using a second class to which the informational data of the target position in the teacher signal belongs, the multiple items of informational data selected at the fourth step, and the informational data of the target position in the teacher signal.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Of the multiple items of informational data that constitute the student signal, informational data corresponding to a target position in the teacher signal is subjected to correction processing by use of the correction data generated as described above. Based on the corrected informational data, the multiple items of informational data positioned in the periphery of the target position in the teacher signal are selected.

The coefficient data is generated for each class by using a second class to which the informational data of the target position in the teacher signal belongs, the selected multiple items of informational data, and the informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, correction data generation means for generating correction data for correcting an encoding noise, the correction data corresponding to a first class to which informational data of a target position in the teacher signal belongs, first orthogonal transformation means for performing orthogonal transformation on informational data among the multiple items of informational data that constitute the student signal output from the decoding means, the informational data corresponding to the target position in the teacher signal, to obtain a first frequency coefficient, correction means for performing correction processing by use of the correction data generated by the correction data generation means on the frequency coefficient obtained by the first orthogonal transformation means, frequency coefficient selection means for selecting plural frequency coefficients each corresponding to a periphery of the target position in the teacher signal based on the frequency coefficient corrected by the correction means, second orthogonal transformation means for performing orthogonal transformation on the informational data of the target position in the teacher signal, to obtain a second frequency coefficient, and coefficient data generation means for generating the coefficient data for each class by using a second class to which the informational data of the target position in the teacher signal belongs, the plural frequency coefficients selected by the frequency selection means, and the second frequency coefficient obtained by the second orthogonal transformation means.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of generating correction data for correcting an encoding noise, the correction data corresponding to a first class to which informational data of a target position in the teacher signal belongs, a third step of performing orthogonal transformation on informational data among the multiple items of informational data that constitute the student signal, the multiple items of informational data being generated at the first step, the informational data corresponding to the target position in the teacher signal, to obtain a first frequency coefficient, a fourth step of performing correction processing by use of the correction data generated at the second step on the frequency coefficient obtained at the third step, a fifth step of selecting plural frequency coefficients each corresponding to a periphery of the target position in the teacher signal based on the frequency coefficient corrected at the fourth step, a sixth step of performing orthogonal transformation on the informational data of the target position in the teacher signal, to obtain a second frequency coefficient, and a seventh step of generating the coefficient data for each class by using a second class to which the informational data of the target position in the teacher signal belongs, the plural frequency coefficients selected at the fifth step, and the second frequency coefficient obtained at the sixth step.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Of the multiple items of informational data that constitute the student signal, informational data corresponding to a periphery of the target position in the teacher signal is subjected to orthogonal transformation. On the frequency coefficient obtained by the orthogonal transformation, correction processing by use of the correction data generated as described above is performed. Based on the corrected frequency coefficient, the plural frequency coefficients corresponding to the periphery of the target position in the teacher signal are selected.

The coefficient data is generated for each class by using a second class to which the informational data of the target position in the teacher signal belongs, the selected plural frequency coefficients, and the frequency coefficient obtained by performing orthogonal transformation on informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, correction data generation means for generating correction data for correcting an encoding noise, the correction data corresponding to a first class to which informational data of a target position in the teacher signal belongs, first data selection means for selecting multiple items of informational data positioned in a periphery of the target position in the teacher signal based on the student signal output from the decoding means, second data selection means for selecting multiple items of correction data that correspond to the multiple items of informational data selected by the first data selection means based on the correction data generated by the correction data generated means, and coefficient data generation means for generating the coefficient data for each class by using a second class to which the informational data of the target position in the teacher signal belongs, the multiple items of informational data selected by the first data selection means, the multiple items of correction data selected by the second data selection means, and the informational data of the target position in the teacher signal.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of generating correction data for correcting an encoding noise, the correction data corresponding to a first class to which informational data of a target position in the teacher signal belongs, a third step of selecting multiple items of informational data positioned in a periphery of the target position in the teacher signal based on the student signal obtained at the first step, a fourth step of selecting multiple items of correction data that correspond to the multiple items of informational data selected at the third step based on the correction data generated at the second step, and a fifth step of generating the coefficient data for each class by using a second class to which the informational data of the target position in the teacher signal belongs, the multiple items of informational data selected at the third step, the multiple items of correction data selected at the fourth step, and the informational data of the target position in the teacher signal.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Based on the student signal, the multiple items of informational data positioned in a periphery of the target position in the teacher signal are selected and based on the correction data generated as described above, the multiple items of the correction data corresponding to the selected multiple items of informational data are selected.

The coefficient data is generated for each class by using a second class to which the informational data of the target position in the teacher signal belongs, the selected multiple items of informational data, the selected multiple items of correction data, and the informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, correction data generation means for generating correction data for correcting an encoding noise, the correction data corresponding to a first class to which informational data of a target position in the teacher signal belongs, first orthogonal transformation means for performing orthogonal transformation on informational data among the multiple items of informational data that constitute the student signal output from the decoding means, the informational data corresponding to the target position in the teacher signal, to obtain a first frequency coefficient, frequency coefficient selection means for selecting plural frequency coefficients that correspond to a periphery of the target position in the teacher signal based on the frequency coefficient obtained by the first orthogonal transformation means, correction data selection means for selecting multiple items of correction data that correspond to the plural frequency coefficients selected by the frequency coefficient selection means, based on the correction data generated by the correction data generation means, second orthogonal transformation means for performing orthogonal transformation on informational data of the target position in the teacher signal, to obtain a second frequency coefficient, and coefficient data generation means for generating the coefficient data for each class by using a second class to which the informational data of the target position in the teacher signal belongs, the plural frequency coefficients selected by the frequency selection means, the multiple items of correction data selected by the correction data selection means, and the second frequency coefficient obtained by the second orthogonal transformation means.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of generating correction data for correcting an encoding noise, the correction data corresponding to a first class to which informational data of a target position in the teacher signal belongs, a third step of performing orthogonal transformation on informational data among the multiple items of informational data that constitute the student signal, the multiple items of informational data being obtained at the first step, the informational data corresponding to the target position in the teacher signal, to obtain a first frequency coefficient, a fourth step of selecting plural frequency coefficients that correspond to a periphery of the target position in the teacher signal based on the frequency coefficient obtained at the third step, a fifth step of selecting multiple items of correction data that correspond to the plural frequency coefficients selected at the fourth step based on the correction data generated at the second step, a sixth step of performing orthogonal transformation on-informational data of the target position in the teacher signal, to obtain a second frequency coefficient, and a seventh step of generating the coefficient data for each class by using a second class to which the informational data of the target position in the teacher signal belongs, the plural frequency coefficients selected at the fourth step, the multiple items of correction data selected at the fifth step, and the second frequency coefficient obtained at the sixth step.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Of the multiple items of informational data that constitute the student signal, informational data corresponding to a periphery of the target position in the teacher signal is subjected to orthogonal transformation. Based on the frequency coefficient obtained by the orthogonal transformation, the plural frequency coefficients corresponding to the periphery of the target position in the teacher signal are selected, and based on the correction data generated as described above, the multiple items of correction data corresponding to the selected plural frequency coefficients are selected.

The coefficient data is generated for each class by using a second class to which the informational data of the target position in the teacher signal belongs, the selected multiple items of correction data, and the frequency coefficient obtained by performing orthogonal transformation on informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, subtraction means for performing subtraction processing by use of informational data among multiple items of informational data that constitute the student signal, the informational data corresponding to a target position, on informational data of the target position in the teacher signal, correction data generation means for generating correction data for correcting an encoding noise, the correction data corresponding to a first class to which the informational data of the target position in the teacher signal belongs, data selection means for selecting multiple items of correction data corresponding to a periphery of the target position in the teacher signal, based on the correction data generated by the correction data generation means, and coefficient data generation means for generating the coefficient data for each class by using a second class to which the informational data of the target position in the teacher signal belongs, the multiple items of correction data selected by the data selection means, and output data of the subtraction means corresponding to the informational data of the target position in the teacher signal.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of performing subtraction processing by use of informational data among multiple items of informational data that constitute the student signal, the informational data corresponding to a target position, on informational data of the target position in the teacher signal, a third step of generating correction data for correcting a encoding noise, the correction data corresponding to a first class to which the informational data of the target position in the teacher signal belongs, a fourth step of selecting multiple items of correction data corresponding to a periphery of the target position in the teacher signal, based on the correction data generated at the third step, and a fifth step of generating the coefficient data for each class by using a second class to which the informational data of the target position in the teacher signal belongs, the multiple items of correction data selected at the fourth step, and data obtained at the second step corresponding to the informational data of the target position in the teacher signal.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Subtraction processing by use of informational data among multiple items of informational data that constitute the student signal, the informational data corresponding to the target position, is performed on informational data of the target position in the teacher signal. Based on the correction data generated as described above, the multiple items of correction data corresponding to a periphery of the target position in the teacher signal are selected.

The coefficient data is generated for each class by using a second class to which the informational data of the target position in the teacher signal belongs, the selected multiple items of correction data, and the subtraction data corresponding to the informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, first orthogonal transformation means for performing orthogonal transformation on informational data of the target position in the teacher signal, to obtain a first frequency coefficient, second orthogonal transformation means for performing orthogonal transformation on informational data among multiple items of informational data that constitute the student signal, the informational data corresponding to the target position, to obtain a second frequency coefficient, subtraction means for performing subtraction processing by use of the second frequency coefficient obtained by the second orthogonal transformation means on the first frequency coefficient obtained by the first orthogonal transformation means, correction data generation means for generating correction data for correcting an encoding noise, the correction data corresponding to a first class to which the informational data of the target position in the teacher signal belongs, data selection means for selecting multiple items of correction data corresponding to a periphery of the target position in the teacher signal, based on the correction data generated by the correction data generation means, and coefficient data generation means for generating the coefficient data for each class by using a second class to which the informational data of the target position in the teacher signal belongs, the multiple items of correction data selected by the data selection means, and output data of the subtraction means corresponding to the informational data of the target position in the teacher signal.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of performing orthogonal transformation on informational data of a target position in the teacher signal, to obtain a first frequency coefficient, a third step of performing orthogonal transformation on informational data among multiple items of informational data that constitute the student signal, the informational data corresponding to the target position, to obtain a second frequency coefficient, a fourth step of performing subtraction processing by use of the second frequency coefficient obtained at the third step, on the first frequency coefficient obtained at the second step, a fifth step of generating correction data for correcting an encoding noise, the correction data corresponding to a first class to which the informational data of the target position in the teacher signal belongs, a sixth step of selecting multiple items of correction data corresponding to a periphery of the target position in the teacher signal, based on the correction data generated at the fifth step, and a seventh step of generating the coefficient data for each class by using a second class to which the informational data of the target position in the teacher signal belongs, the multiple items of correction data selected at the sixth step, and data obtained at the fourth step corresponding to the informational data of the target position in the teacher signal.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Subtraction processing by use of frequency coefficient obtained by performing orthogonal transformation on informational data among multiple items of informational data that constitute the student signal, the informational data corresponding to the target position, is performed on frequency coefficient obtained by performing orthogonal transformation on the informational data of the target position in the teacher signal. Based on the correction data generated as described above, the multiple items of correction data corresponding to a periphery of the target position in the teacher signal are selected.

The coefficient data is generated for each class by using a second class to which the informational data of the target position in the teacher signal belongs, the selected multiple items of correction data, and the subtraction data corresponding to the informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, correction data generation means for generating correction data for correcting an encoding noise, the correction data corresponding to a first class to which informational data of the target position in the teacher signal belongs, subtraction means for performing subtraction processing by use of correction data generated by the correction data generation means on informational data of the target position in the teacher signal, data selection means for selecting multiple items of informational data positioned in a periphery of the target position in the teacher signal, based on the student signal output from the decoding means, and coefficient data generation means for generating the coefficient data for each class by using a second class to which the informational data of the target position in the teacher signal belongs, the multiple items of information data selected by the data selection means, and output data of the subtraction means corresponding to the informational data of the target position in the teacher signal.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of generating correction data for correcting an encoding noise, the correction data corresponding to a first class to which informational data of a target position in the teacher signal belongs, a third step of performing subtraction processing by use of the correction data generated at the second step, on the informational data of the target position in the teacher signal, a fourth step of selecting multiple items of informational data positioned in a periphery of the target position in the teacher signal, based on the student signal obtained at the first step, and a fifth step of generating the coefficient data for each class by using a second class to which the informational data of the target position in the teacher signal belongs, the multiple items of informational data selected at the fourth step, and data obtained at the third step corresponding to the informational data of the target position in the teacher signal.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Subtraction processing by use of the correction data generated as described above is performed on the informational data of the target position in the teacher signal. Based on the student signal, the multiple items of informational data positioned in a periphery of the target position in the teacher signal are selected.

The coefficient data is generated for each class by using a second class to which the informational data of the target position in the teacher signal belongs, the selected multiple items of informational data, and the subtraction data corresponding to the informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

A unit for generating coefficient data relative to the invention is a unit for generating coefficient data for an estimate equation used when converting a first informational signal comprised of multiple items of informational data, the first informational signal being obtained by decoding an encoded informational digital signal, into a second informational signal comprised of multiple items of informational data, the unit comprising decoding means for decoding the informational digital signal obtained by encoding a teacher signal corresponding to the second informational signal, to obtain a student signal that corresponds to the first informational signal, first orthogonal transformation means for performing orthogonal transformation on informational data of a target position in the teacher signal, to obtain a first frequency coefficient, correction data generation means for generating correction data for correcting an encoding noise, the correction data corresponding to a first class to which informational data of the target position in the teacher signal belongs, subtraction means for performing subtraction processing by use of the correction data generated by the correction data generation means on frequency coefficient obtained by the first orthogonal transformation means, second orthogonal transformation means for performing orthogonal transformation on informational data among the multiple items of informational data that constitute the student signal output from the decoding means, the informational data corresponding to the target position in the teacher signal, to obtain a second frequency coefficient, frequency coefficient selection means for selecting plural frequency coefficients that correspond to a periphery of the target position in the teacher signal based on the frequency coefficient obtained by the second orthogonal transformation means, and coefficient data generation means for generating the coefficient data for each class by using a second class to which the informational data of the target position in the teacher signal belongs, the plural frequency coefficients selected by the frequency selection means, output data of the subtraction means corresponding to the informational data of the target position in the teacher signal.

A method for generating coefficient data relative to the invention is a method for generating coefficient data for an estimate equation used when converting a first informational signal comprised of multiple items of informational data, the first informational signal being obtained by decoding an encoded informational digital signal, into a second informational signal comprised of multiple items of informational data, the method comprising a first step of decoding the informational digital signal obtained by encoding a teacher signal corresponding to the second informational signal, to obtain a student signal that corresponds to the first informational signal, a second step of performing orthogonal transformation on informational data of a target position in the teacher signal, to obtain a first frequency coefficient, a third step of generating correction data for correcting an encoding noise, the correction data corresponding to a first class to which informational data of the target position in the teacher signal belongs, a fourth step of performing subtraction processing by use of the correction data obtained at the third step, on the frequency coefficient obtained at the second step, a fifth step of performing orthogonal transformation on informational data among multiple items of informational data that constitute the student signal obtained at the first step, the informational data corresponding to the target position in the teacher signal, to obtain a second frequency coefficient, a sixth step of selecting plural frequency coefficients that correspond to a periphery of the target position in the teacher signal based on the frequency coefficient obtained at the fifth step, and a seventh step of generating the coefficient data for each class by using a second class to which the informational data of the target position in the teacher signal belongs, the plural frequency coefficients selected at the sixth step, and the data obtained at the fourth step corresponding to the informational data of the target position in the teacher signal.

A program relative to the invention allows a computer to execute the above method for generating coefficient data. A computer-readable medium relative to the invention records the above program.

In the invention, the first informational signal comprised of multiple items of informational data is generated by decoding an encoded informational digital signal. This invention relates to a generation of coefficient data for an estimate equation used when converting the first informational signal into the second informational signal comprised of multiple items of informational data.

The student signal corresponding to the first informational signal is generated by further decoding an encoded informational digital signal that is generated by encoding the teacher signal that corresponds to the second informational signal. Correction data for correcting an encoding noise that corresponds to the first class to which the informational data of the target position in the teacher signal belongs is generated. For example, the correction data for each of the classes is stored in storage means, so that from this storage means, the correction data that corresponds to the first class is read. This correction data is generated beforehand by using the student signal and the teacher signal.

Subtraction processing by use of the correction data generated as described above is performed on frequency coefficient obtained by performing orthogonal transformation on informational data of a target position in the teacher signal. Of the multiple items of informational data that constitute the student signal, the informational data corresponding to the periphery of the target in the teacher signal is subject to orthogonal transformation. Based on frequency coefficient obtained the orthogonal transformation, the plural frequency coefficients corresponding to the periphery of the target position in the teacher signal are selected.

The coefficient data is generated for each class by using a second class to which the informational data of the target position in the teacher signal belongs, the selected plural frequency coefficients, and the subtraction data corresponding to the informational data of the target position in the teacher signal. For example, the second class is the same as the first class. Alternatively, class classification relating to the second class is the one obtained by making class classification relating to said first class finer.

Although, in such a manner, the coefficient data for the estimate equation used when converting the first informational signal into the second informational signal is generated, the items of coefficient data corresponding to the second class to which the informational data of the target position in the second informational signal belongs are selectively used when converting the first informational signal into the second informational signal so that based on the estimate equation, the informational data of the target position in the second informational signal is generated.

Thus, in a case where the first informational signal is converted into the second informational signal using the estimate equation, of an encoding noise in the informational signal obtained by decoding the encoded informational digital signal, the one yet remained by the correction processing by use of the correction data is well reduced.

BRIEF DESCRIPTION OF THE DRAWINGS

FIG. 13 is a further explanatory diagram for showing operations of the addition portion;

BEST MODE FOR CARRYING OUT THE INVENTION

Figure 1:
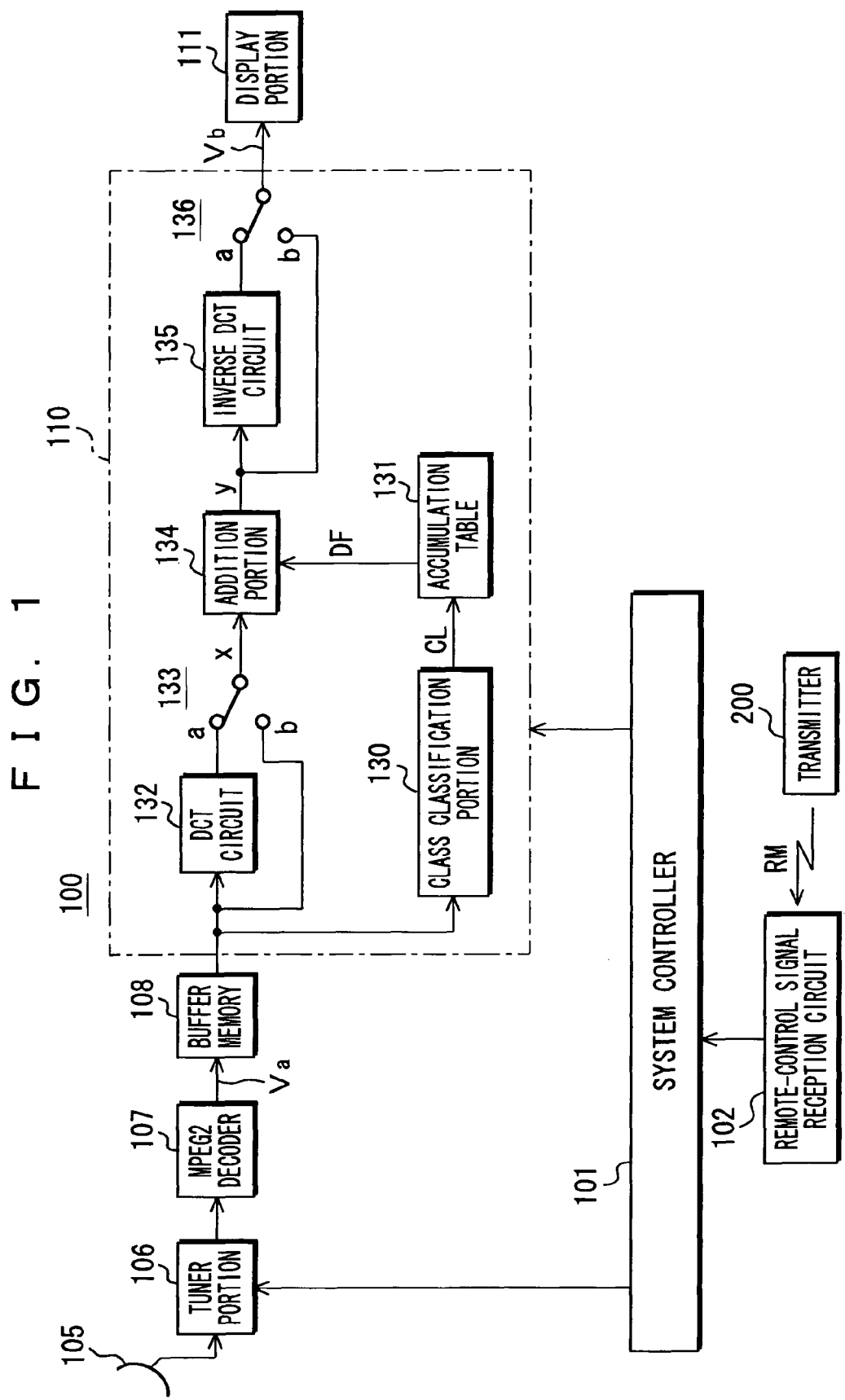
FIG. 1 is a block diagram for showing a configuration of a digital broadcast receiver according to a first embodiment.

The following will describe a first embodiment of the present invention with reference to drawings. FIG. 1 shows a configuration of a digital broadcast receiver 100 according to the first embodiment.

This digital broadcast receiver 100 has a microcomputer and comprises a system controller 101 for controlling operations of an overall system and a remote-control signal reception circuit 102 for receiving a remote-control signal. The remote-control signal reception circuit 102 is connected to the system controller 101 and arranged to receive a remote-control signal RM output from a remote-control transmitter 200 in response to a user operation and supply the system controller 101 with an operation signal that corresponds to that signal RM.

The digital broadcast receiver 100 also has a reception antenna 105 and a tuner portion 106 which is supplied with a broadcast signal (RF-modulated signal) captured by this reception antenna 105, to perform channel selection processing, demodulation processing, error correction processing, etc., thereby obtaining an MPEG2 stream as an encoded image signal related to a predetermined program.

Further, the digital broadcast receiver 100 has an MPEG2 decoder 107 for decoding an MPEG2 stream output from the tuner portion 106 to obtain an image signal Va and a buffer memory 108 for temporarily storing the image signal Va output from this MPEG2 decoder 107.

Figure 2:
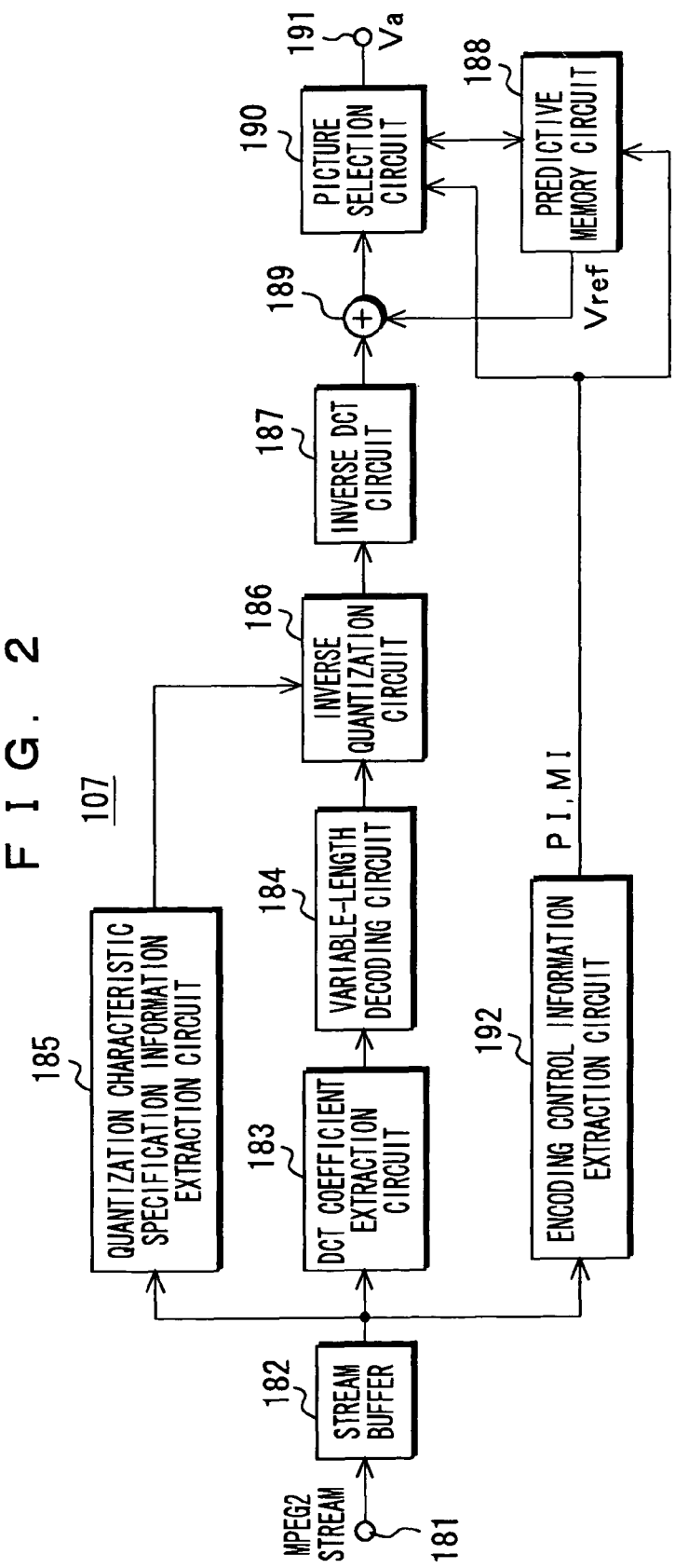
FIG. 2 is a block diagram for showing a configuration of an MPEG2 decoder.

FIG. 2 shows a configuration of the MPEG2 decoder 107. This decoder 107 has an input terminal 181 through which an MPEG2 stream is input and a stream buffer 182 for temporarily storing an MPEG2 stream that has been input through this input terminal 181.

This decoder 107 also has an extraction circuit 183 for extracting a discrete cosine transform (DCT) coefficient as a frequency coefficient from an MPEG2 stream stored in the stream buffer 182 and a variable-length decoding circuit 184 for performing variable-length decoding on a variable-length encoded, for example, Huffman-encoded DCT coefficient extracted by this extraction circuit 183.

Further, this decoder 107 has an extraction circuit 185 for extracting quantization character specification information from an MPEG2 stream stored in the stream buffer 182, an inverse quantization circuit 186 for performing inverse quantization on a quantization DCT coefficient output from the variable-length decoding circuit 184 based on the quantization characteristic specification information extracted by this extraction circuit 185, and an inverse DCT circuit 187 for performing inverse DCT on a DCT coefficient output from the inverse quantization circuit 186.

Further, the decoder 107 has a predictive memory circuit 188 for storing image signals of an intra-picture (I-picture) and a predictive-picture (P-picture) in a memory (not shown) and, by using these image signals, generating and outputting a reference image signal Vref that corresponds to an image signal of a P-picture or a bi-directionally predictive-picture (B-picture) when it is output from the inverse DCT circuit 187.

Further, the decoder 107 has an addition circuit 189 for adding the reference image signal Vref generated by the predictive memory circuit 188 to an image signal of a P-picture or a B-picture when this image signal is output from the inverse DCT circuit 187. It is to be noted that when an image signal of an I-picture is output from the inverse DCT circuit 187, the addition circuit 189 is not supplied with the reference image signal Vref from the predictive memory circuit 188 and so outputs the image signal of the I-picture as it is output from the inverse DCT circuit 187.

Further, the decoder 107 has a picture selection circuit 190 for supplying the predictive memory circuit 188 with image signals of an I-picture and a P-picture output from the addition circuit 189 so that they may be stored in the memory, rearranging in a proper order the image signals of the pictures output from this addition circuit 189, and outputting them and an output terminal 191 for outputting the image signals that has been output from this picture selection circuit 190.

Further, the decoder 107 has an extraction circuit 192 for extracting encoding control information, that is, picture information PI and motion compensation vector information MI from an MPEG2 stream stored in the stream buffer 182. The motion compensation vector information MI extracted by this extraction circuit 192 is supplied to the predictive memory circuit 188, which uses this motion compensation vector information MI so that motion compensation may be performed when the reference image signal Vref is generated. The picture information PI extracted by the extraction circuit 192, on the other hand, is supplied to the predictive memory circuit 188 and the picture selection circuit 190 so that pictures may be identified by these predictive memory circuit 188 and picture selection circuit 190 based on this picture information PI.

The following will describe operations of the MPEG2 decoder 107 shown in FIG. 2.

An MPEG2 stream stored in the stream buffer 182 is supplied to the extraction circuit 183, which extracts a DCT coefficient as a frequency coefficient. This DCT coefficient, which is already variable-length encoded, is supplied to the variable-length decoding circuit 184 to be decoded. A quantization DCT coefficient output from this variable-length decoding circuit 184 is supplied to the inverse quantization circuit 186, where it undergoes inverse quantization.

A DCT coefficient output from the inverse quantization circuit 186 undergoes inverse DCT at the inverse DCT circuit 183 so that an image signal of each of the pictures may be obtained. This image signal of each of the picture is supplied via the addition circuit 189 to the picture selection circuit 190.

In this case, to each of the image signals of the P-picture and the B-picture, the addition circuit 189 adds the reference image signal Vref output from the predictive memory circuit 188. The image signals of the pictures are rearranged in a proper order by the picture selection circuit 190 and output to the output terminal 191.

Again, as shown in FIG. 1, the digital broadcast receiver 100 comprises an image-signal-processing portion 110 for converting the image signal Va stored in the buffer memory 108 into an image signal Vb in which is reduced an encoding noise (encoding distortion) such as block noise (block distortion) and mosquito noise and a display portion 111 for displaying an image due to the image signal output from this image-signal-processing portion 110. The display portion 111 is constituted of a display device such as a cathode-ray tube (CRT) or a liquid crystal display (LCD).

The following will describe operations of the digital broadcast receiver 100 shown in FIG. 1.

An MPEG2 stream output from the tuner portion 106 is supplied to the MPEG2 decoder 107 to be decoded. The image signal Va output from this decoder 107 is supplied to the buffer memory 108 to be stored temporarily.

In such a manner, the image signal Va stored in the buffer memory 108 is supplied to the image-signal-processing portion 110, where it is converted into the image signal Vb in which the encoding noise (encoding distortion) is reduced. This image-signal-processing portion 110 provides pixel data that constitutes the image signal Vb, from pixel data that constitutes the image signal Va.

The image signal Vb output from the image-signal-processing portion 110 is supplied to the display portion 111, which displays on its screen an image due to that image signal Vb.

The following will describe details of the image-signal-processing portion 110.

The image-signal-processing portion 110 has an accumulation table 131. This accumulation table 131 stores beforehand difference data DF as correction data for correction of encoding noise (encoding distortion) for each class. This difference data DF is that of pixel data or difference data of a DCT coefficient (frequency coefficient) obtained through DCT processing.

The accumulation table 131 is supplied with a class code CL output from a class classification portion 130, which will be described later, as read address information. From this accumulation table 131, the difference data DF that corresponds to a class code CL is read and supplied to an addition portion 134, which will be described later.

Difference data DF stored in this accumulation table 131 is generated beforehand by using a student signal that corresponds to the image signal Va and a teacher signal that corresponds to the image signal Vb. For example, the student signal is obtained by decoding an MPEG2 stream obtained by MPEG2 encoding the teacher signal.

Further, the image-signal-processing portion 100 has a DCT circuit 132 for performing DCT processing on the image signal Va stored in the buffer memory 108 to obtain a DCT coefficient and a transfer switch 133 whose a-side fixed terminal is supplied with a DCT coefficient output from the DCT circuit 132 and whose b-side fixed terminal is supplied with the image signal Va output from the buffer memory 108. This transfer switch 133 is configured so that it may be connected to its b-side if difference data DF stored in the accumulation table 131 is difference data of pixel data and that it may be connected to its a-side if the difference data DF is that of a DCT coefficient obtained through DCT processing.

Further, the image-signal-processing portion 110 has the addition portion 134 serving as correction means for adding the difference data DF read out of the accumulation table 131 to data (pixel data or DCT coefficient) x, which has been output from a movable terminal of the transfer switch 133, corresponding to a target position in the image signal Vb, thus generating data y of the target position in the image signal Vb.

It is to be noted that items of data x and y are block data that corresponds to a DCT block, which is used as a unit in DCT processing. In the present embodiment, the number of items of data (pixel data or DCT coefficient) that constitute data y is equal to that of items of data (pixel data or DCT coefficient) that constitute data x.

In this case, the number of items of pixel data that constitute the image signal Vb is equal to that of items of pixel data that constitute the image signal Va. For example, if data x is comprised of 8×8 items of data, 8×8 items of data are generated in the addition portion 134 as data y. In this case, further, the difference data DF supplied from the accumulation table 131 to the addition portion 134 is also comprised of 8×8 items of data.

Further, the image-signal-processing portion 110 has an inverse DCT circuit 135 for performing inverse DCT processing on an output signal of the addition portion 134 and a transfer switch 136 whose a-side fixed terminal is supplied with an output signal of the inverse DCT circuit 135 and whose b-side fixed terminal is supplied with an output signal of the addition portion 134. This transfer switch 136 is configured so that it may be connected to its b-side if the difference data DF stored in the accumulation table 131 is difference data of pixel data and that it may be connected to its a-side if the difference data DF is that of a DCT coefficient obtained through DCT processing. A signal output from a movable terminal of this transfer switch 136 is supplied to the display portion 111 as the image signal Vb.

Further, the image-signal-processing portion 110 has the class classification portion 130 serving as class detection means for detecting a class to which pixel data y of a target position in the image signal Vb belongs. This class classification portion 130 uses multiple items of pixel data, which are positioned in a periphery of a target position in the image signal Vb, among multiple items of pixel data that constitute the image signal Va stored in the buffer memory 108, to generate a class code CL that indicates a class to which pixel data y of the target position in this image signal Vb belongs.

Figure 3:
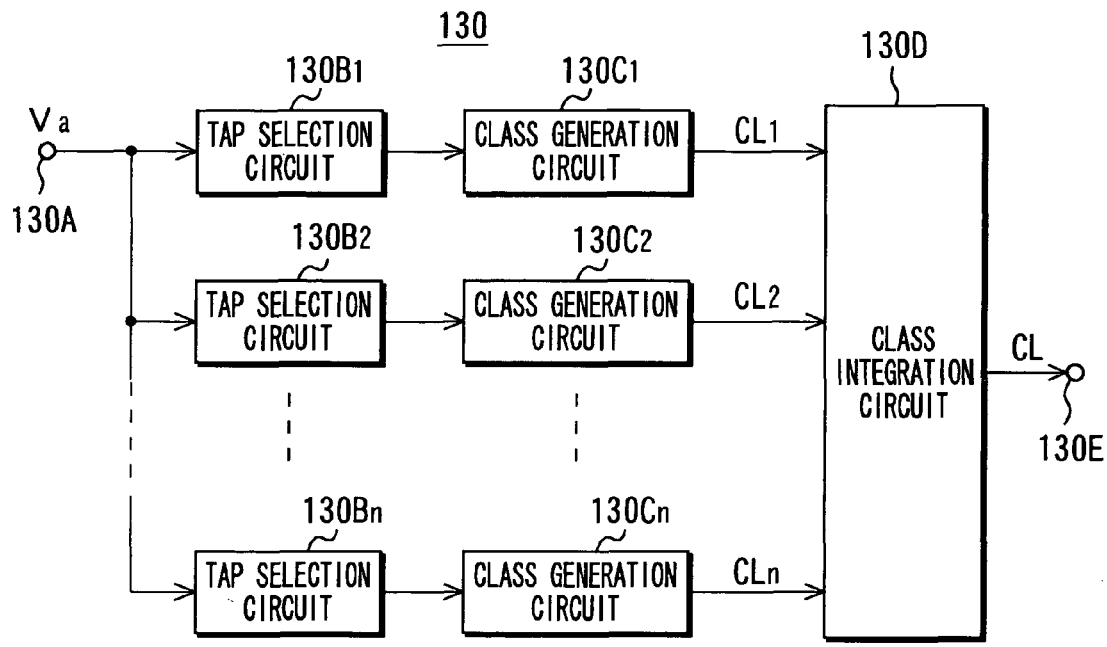
FIG. 3 is a block diagram for showing a configuration of a class classification portion.

FIG. 3 shows a configuration of the class classification portion 130.

This class classification portion 130 has an input terminal 130A through which the image signal Va is input and tap selection circuits $130B_1$ through $130B_n$ for selectively taking out multiple items of pixel data of a class tap which is used to detect n number of type(s) of class (es) to which pixel data y of a target position in the image signal Vb belongs, respectively.

Further, the class classification portion 130 has class generation circuits $130C_1$ through $130C_n$ for generating class codes $CL_1$ through $CL_n$ that indicate n number of types of classes by using pixel data taken out by the tap selection circuits $130B_1$ through $130B_n$ respectively, a class integration circuit 130D for integrating class codes $CL_1$ through $CL_n$ generated by these class generating circuits $130C_1$ through $130C_n$ into one class code CL, and an output terminal 130E for outputting this class code CL.

In the present embodiment, class codes $CL_1$ through $CL_6$ that indicate six types of classes are generated, and thus, these class codes $CL_1$ through $CL_6$ are integrated into one class code CL and output. The six classes are a space waveform class, a time variation class, an AC variation class, a flat class, a line correlation class, and a block edge class. The following will describe these classes briefly below.

(1) The following will describe the space waveform class. It is supposed that the tap selection circuit $130B_1$ and the class generation circuit $130C_1$ constitute a system for detecting this space waveform class.

Figure 4:
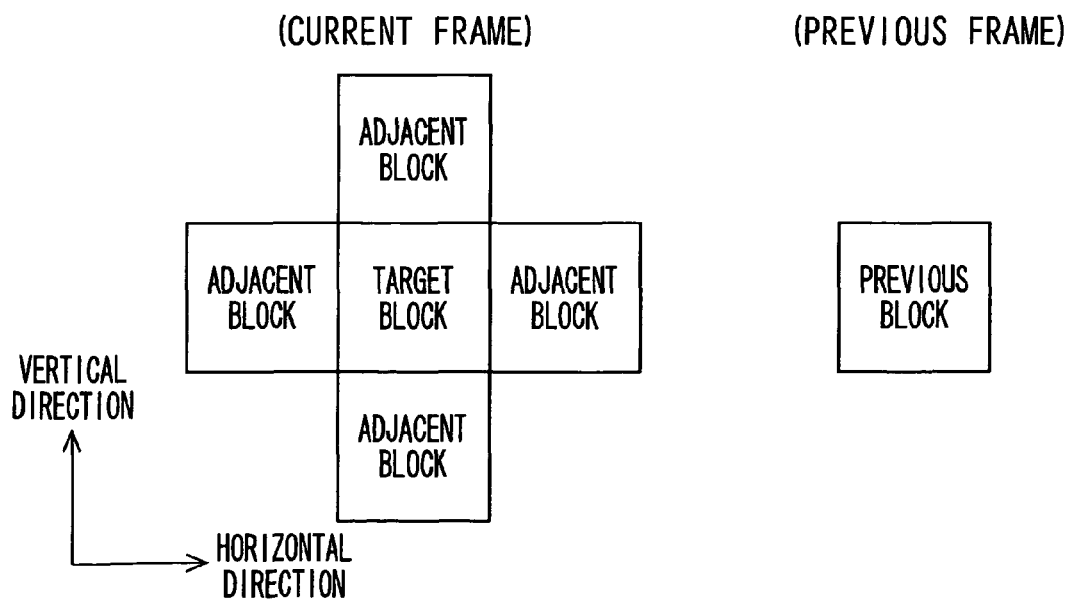
FIG. 4 is a diagram for showing blocks for selecting a tap.

The tap selection circuit $130B_1$ takes out, from a current frame of the image signal Va, pixel data of a block (target block shown in FIG. 4) that corresponds to pixel data y of a target position in the image signal Vb. The class generation circuit $130C_1$ divides 8×8 items of pixel data of the target block into four regions to obtain pixel average values of each divided region to provide 2×2 items of upper-hierarchy pixel data and performs, for example, 1-bit adaptive dynamic range coding (ADRC) on each of these 2×2 items of pixel data, thereby generating a 4-bit class code $CL_1$ that indicates the space waveform class.

ADRC is utilized to obtain a maximum value and a minimum value of multiple items of pixel data of a class tap to obtain a dynamic range, which is a difference between the maximum value and the minimum value, thereby re-quantizing each of the pixel values in such a manner as to adapt to the dynamic range. In the case of 1-bit ADRC, each of the pixel values is converted into one bit in accordance with whether it is larger or smaller than an average value of the plural pixel values of the class tap. ADRC processing aims at reducing the number of classes representing a pixel value level distribution to a relatively small number. Therefore, besides ADRC, any other coding method such as vector quantization (VQ) may be used which compresses the number of bits of a pixel value.

(2) The following will describe the time variation class. It is supposed that the tap selection circuit $130B_2$ and the class generation circuit $130C_2$ constitute a system for detecting this time variation class.

The tap selection circuit $130B_2$ takes out, from a current frame of the image signal Va, pixel data of a block (target block shown in FIG. 4) that corresponds to pixel data y of a target position in the image signal Vb and also, from an immediately previous frame of the image signal Va, pixel data of a block (previous block shown in FIG. 4) that corresponds to the target block.

The class generation circuit $130C_2$ performs subtractions between 8×8 items of pixel data of the target block and 8×8 items of pixel data of the previous block for each of the corresponding pixels to obtain 8×8 difference values, obtains a sum of squares of these 8×8 difference values, and performs threshold-value decision on this sum of squares, thereby generating a two-bit class code $CL_2$ that indicates the time variation class.

(3) The following will describe the AC variation class. It is supposed that the tap selection circuit $130B_3$ and the class generation circuit $130C_3$ constitute a system for detecting this AC variation class.

The tap selection circuit $130B_3$ takes out, from a current frame of the image signal Va, pixel data of a block (target block shown in FIG. 4) that corresponds to pixel data y of a target position in the image signal Vb and also, from an immediately previous frame of the image signal Va, pixel data of a block (previous block shown in FIG. 4) that corresponds to the target block.

The class generation circuit $130C_3$ performs DCT processing on each of the 8×8 items of pixel data of the target block and the 8×8 items of pixel data of the previous block to obtain a DCT coefficient (frequency coefficient). The class generation circuit $130C_3$ obtains, on each base position of an AC portion, the number $m_1$ of the base positions where the coefficient exists at either side, and, of these positions, the number $m_2$ of the base positions where the code is inverted or one of the coefficient values is 0, to perform threshold-value decision on $m_1/m_2$, thereby generating a two-bit class code $CL_3$ that indicates the AC variation class. For a block with a smaller amount of time variation, this AC variation class can be used to perform class classification in accordance with mosquito distortion.

(4) The following will describe the flat class. It is supposed that the tap selection circuit $130B_4$ and the class generation circuit $130C_4$ constitute a system for detecting this flat class.

The tap selection circuit $130B_4$ takes out, from a current frame of the image signal Va, pixel data of a block (target block shown in FIG. 4) that corresponds to pixel data y of a target position in the image signal Vb. The class generation circuit $130C_4$ detects a maximum value and a minimum value of 8×8 items of pixel data of the target block and performs threshold-value decision on a dynamic range, which is a difference between these values, thereby generating a one-bit class code $CL_4$ that indicates the flat class.

(5) The following will describe the line correlation class. It is supposed that the tap selection circuit $130B_5$ and the class generation circuit $130C_5$ constitute a system for detecting this line correlation class.

The tap selection circuit $130B_5$ takes out, from a current frame of the image signal Va, pixel data of a block (target block shown in FIG. 4) that corresponds to pixel data y of a target position in the image signal Vb.

The class generation circuit $130C_5$ performs subtractions between a first line and a second line, a third line and a fourth line, a fifth line and a sixth line, and a seventh line and an eighth line of 8×8 pixel data in the target block for each of the corresponding pixels to obtain 8×4 difference values, obtains a sum of squares of these 8×4 difference values, and performs threshold-value decision on this sum of squares, thereby generating a one-bit class code $CL_5$ that indicates the line correlation class. This line correlation class indicates whether an intra-frame correlation is high as in the case of a still image or an intra-field correlation is higher than the intra-frame correlation as in the case of a speedily moving case.

(6) The following will describe the block edge class. It is supposed that the tap selection circuit $130B_6$ and the class generation circuit $130C_6$ constitute a system for detecting this block edge class.

The tap selection circuit $130B_6$ takes out, from a current frame of the image signal Va, pixel data of a block (target block shown in FIG. 4) that corresponds to pixel data y of a target position in the image signal Vb and also takes out, from this current frame, pixel data of vertically and horizontally adjacent blocks (adjacent blocks shown in FIG. 4) to the target block.

The class generation circuit $130C_6$ performs subtractions between eight items of pixel data in four sides of the target block and pixel data of the adjacent blocks that are adjacent thereto for each of the corresponding pixels to obtain 4×8 difference values, obtains a sums of squares of each of these eight difference-values, and performs threshold-value decision on the four sums of squares that correspond to the four sides of the target block respectively, thereby generating a four-bit class code $CL_6$ that indicates the block edge class.

In the present embodiment, the class integration circuit 130D integrates class codes $CL_1$ through $CL_6$ generated by the class generation circuit $130C_1$ through $130C_6$, into one class code CL.

In this case, if $CL_1$ through $CL_6$ are integrated simply, the class code CL indicates 16 classes (space waveform classes)×4 classes (time variation classes)×4 classes (AC variation classes)×2 classes (flat classes)×2 classes (line correlation classes)×16 classes (block edge classes)=16384 classes.

In the present embodiment, however, the AC variation classes are integrated to the time variation classes in a form of a tree structure. That is, if the time variation is small in quantity, a relevant portion has a high possibility of being a still portion. Therefore, time variation classification is performed, so that if the time variation is small in quantity, AC variation classification is performed in a tree structure. Accordingly, the number of classes after the time variation classes and the AC variation classes are integrated is 7 (=4+4−1).

Further, in the present embodiment, the line correlation classes are integrated to the flat classes in a form of a tree structure. That is, flat classification is performed, so that if the classes are not flat, line correlation classification is performed in a tree structure; accordingly, the number of classes after the flat classes and the line correlation classes are integrated is 3 (=2+2−1).

By thus integrating the classes by using a tree structure, the class code CL indicates 16 classes (space waveform classes)×7 classes (time variation classes and AC variation classes)×16 classes (block edge classes)×3 classes (flat classes and line correlation classes)=5376 classes, thus enabling the number of classes to be reduced significantly.

The following will describe operations of this image-signal-processing portion 110.

First, such a case will be described that difference data DF stored in the accumulation table 131 is that of pixel data. In this case, the transfer switches 133 and 136 are each connected to the b-sides thereof.

The class classification portion 130 generates a class code CL that indicates a class to which pixel data y of the target position in this image signal Vb belongs using multiple items of pixel data in the image signal Va, which are positioned in a periphery of a target position in the image signal Vb.

This class code CL is supplied to the accumulation table 131 as read address information. From the accumulation table 131, based on this class code CL, difference data DF that corresponds to the target position in the image signal Vb is read and supplied to the addition portion 134.

Further, of the image signal Va stored in the buffer memory 108, pixel data x corresponding to the target position in the image signal Vb is supplied via the b-side of the transfer switch 133 to the addition portion 134. The addition portion 134 adds to this pixel data x the difference data DF read out of the accumulation table, to generate pixel data y of the target position in the image signal Vb.

It is to be noted that the pixel data x and y are each block data comprised of, for example, 8×8 items of pixel data. Further, the difference data DF supplied from the accumulation table 131 to the addition portion 134 is also comprised of, for example, 8×8 items of difference data. The addition portion 134 adds each of the items of difference data that constitute the difference data DF to each of the items of pixel data that constitute the pixel data x, to obtain each of the items of pixel data that constitute the pixel data y.

Figure 5:
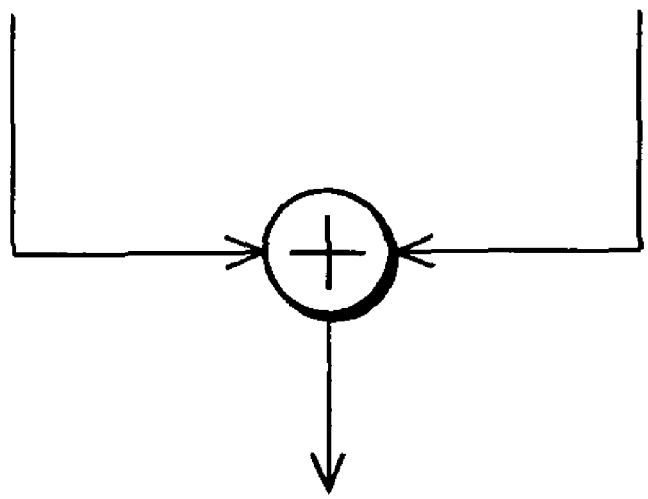
FIG. 5 is an explanatory diagram of operations of an addition portion.

FIG. 5 shows outlined addition operations in the addition portion 134 assuming, for simplicity, that the block data is comprised of 2×2 items of pixel data. To four items of pixel data A-D that constitute the pixel data x, four items of difference data a-d that constitute the difference data DF are added respectively, so that four items of pixel data A'-D' that constitute the pixel data y are obtained. That is, A'=A+a, B'=B+b, C'=C+c, and D'=D+d.

The pixel data y generated by the addition portion 134 is output via the b-side of the transfer switch 136 as an output signal of the image-signal-processing portion 110. That is, this pixel data y constitutes the image signal Vb.

Next, such a case will be described that difference data DF stored in the accumulation table 131 is that of a DCT coefficient obtained through DCT processing. In this case, the transfer switches 133 and 136 are each connected to the a-sides thereof.

The class classification portion 130 generates a class code CL that indicates a class to which pixel data y of the target position in the image signal Vb belongs using multiple items of pixel data positioned in a periphery of a target position in the image signal Vb, of the image signal Va stored in the buffer memory 108.

This class code CL is supplied to the accumulation table 131 as read address information. From the accumulation table 131, based on this class code CL, difference data DF that corresponds to the target position in the image signal Vb is read and supplied to the addition portion 134.

Further, a DCT coefficient x, which is obtained by the DCT circuit 132, corresponding to pixel data y of the target position in the image signal Vb and being obtained by performing DCT processing on multiple items of pixel data of the image signal Va is supplied via the a-side of the transfer switch 133 to the addition portion 134. The addition portion 134 adds the difference data DF to this DCT coefficient x, to generate a DCT coefficient y that corresponds to pixel data of the target position in the image signal Vb.

It is to be noted that the DCT coefficients x and y are each block data comprised of, for example, 8×8 DCT coefficients. Further, the difference data DF supplied from the accumulation table 131 to the addition 134 is also comprised of, for example, 8×8 items of difference data. The addition portion 134 adds each difference data that constitutes the difference data DF to each of the DCT coefficients that constitute the DCT coefficient x, to obtain each of the DCT coefficients that constitute the DCT coefficient y (see FIG. 5).

The DCT coefficient y generated by the addition portion 134 is supplied to the inverse DCT circuit 135. This inverse DCT circuit 135 performs inverse DCT processing on the DCT coefficient y to obtain the pixel data. The pixel data thus output from the inverse DCT circuit 135 is output via the a-side of the transfer switch 136 as an output signal of the image-signal-processing portion 110.

In such a manner, the image-signal-processing portion 110, when correcting data (pixel data or DCT coefficient) x related to the image signal Va to thereby obtain data (pixel data or DCT coefficient) y related to the image signal Vb, detects a class to which the data y belongs based on the image signal Va and adds difference data DF that corresponds to this detected class to the data x to thereby obtain data y corrected so as to reduce encoding noise, thereby enabling such an image signal Vb that the encoding noise is reduced well to be obtained.

Figure 6:
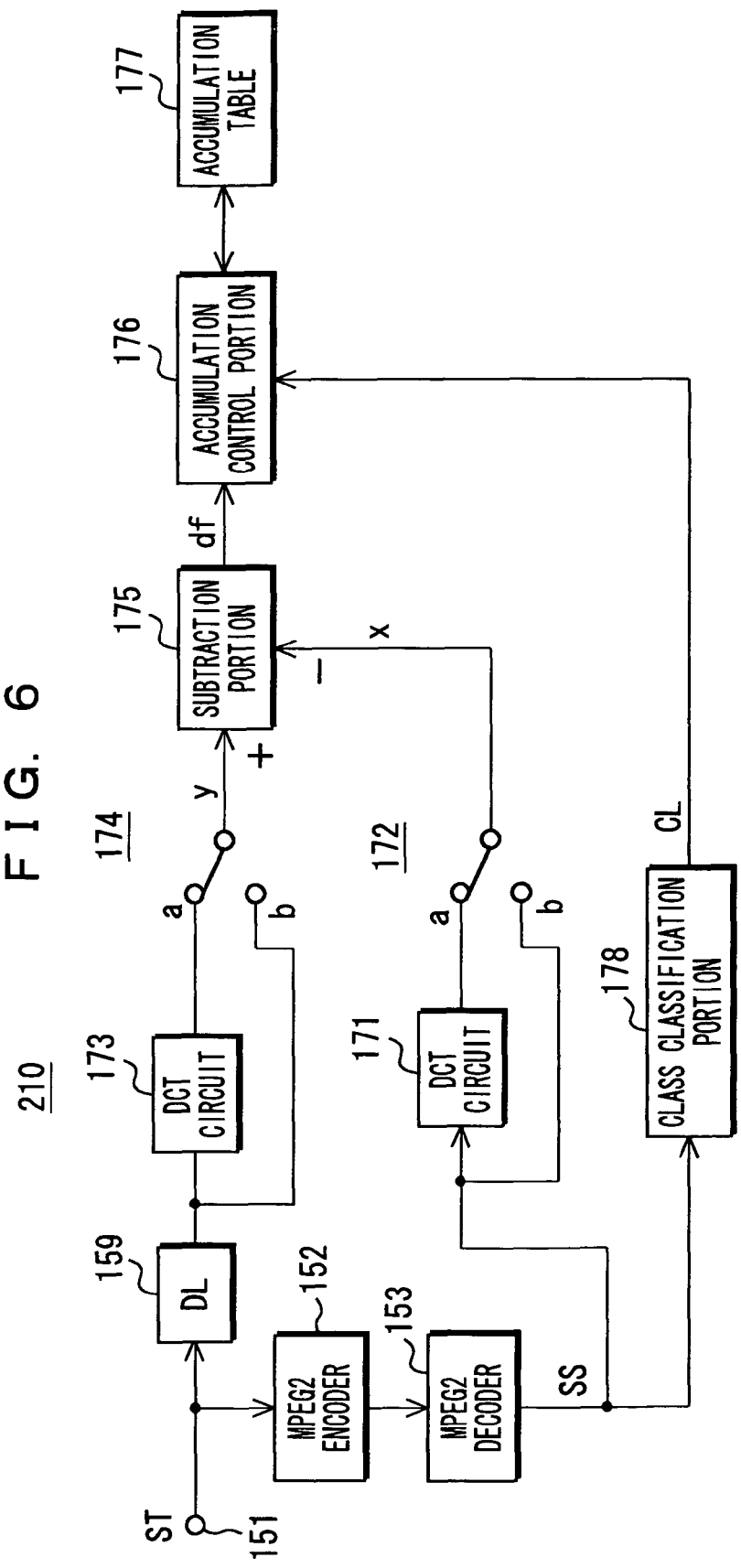
FIG. 6 is a block diagram for showing a configuration of an unit for generating difference data.

FIG. 6 shows a configuration of a unit 210 for generating difference data DF to be stored in the accumulation table 131 in the image-signal-processing portion 110 of FIG. 1.

This unit 210 for generating difference data has an input terminal 151 through which a teacher signal ST corresponding to the image signal Vb is input, an MPEG2 encoder 152 for encoding this teacher signal ST to obtain an MPEG2 stream, and an MPEG2 decoder 153 for decoding this MPEG2 stream to obtain a student signal SS that corresponds to the image signal Va.

Further, the unit 210 for generating difference data has a DCT circuit 171 for performing DCT processing on the student signal SS output from the MPEG2 decoder 153 to obtain a DCT coefficient and a transfer switch 172 whose a-side fixed terminal is supplied with a DCT coefficient output from this DCT circuit 171 and whose b-side fixed terminal is supplied with the student signal SS output from the MPEG2 decoder 153. This transfer switch 172 is configured so that it may be connected to its b-side if the difference data DF stored in the accumulation table 177, which will be described later, is difference data of pixel data and that it may be connected to its a-side if the difference data DF is that of a DCT coefficient obtained through DCT processing.

Further, the unit 210 for generating difference data has a DCT circuit 173 for performing DCT processing on the teacher signal ST time-adjusted by a delay circuit 159 to obtain a frequency coefficient and a transfer switch 174 whose a-side fixed terminal is supplied with a frequency coefficient output from this DCT circuit 173 and whose b-side fixed terminal is supplied with the teacher signal ST time-adjusted by the delay circuit 159. This transfer switch 174 is configured so that it may be connected to its b-side if the difference data DF stored in the accumulation table 177, which will be described later, is difference data of pixel data and that it may be connected to its a-side if the difference data DF is that of a DCT coefficient obtained through DCT processing.

Further, the unit 210 for generating difference data has a subtraction portion 175 for subtracting data (pixel data or DCT coefficient) x, which is output from a movable terminal of the transfer switch 173, corresponding to a target position in the teacher signal ST, from data (pixel data or DCT coefficient) y of the target position of this teacher signal ST, thus obtaining difference data df.

It is to be noted that items of the data x and y are each block data that corresponds to a DCT block, which is used as a unit in DCT processing. In the present embodiment, the number of items of the data (pixel data or DCT coefficient) that constitute data y is equal to that of items of the data (pixel data or DCT coefficient) that constitute data x.

In this case, the number of items of the pixel data that constitute the teacher signal ST is equal to that of items of the pixel data that constitute the student signal SS. For example, if data x and y are each comprised of 8×8 items of pixel data, 8×8 items of difference data are generated in the subtraction portion 175 as difference data df.

Figure 7:
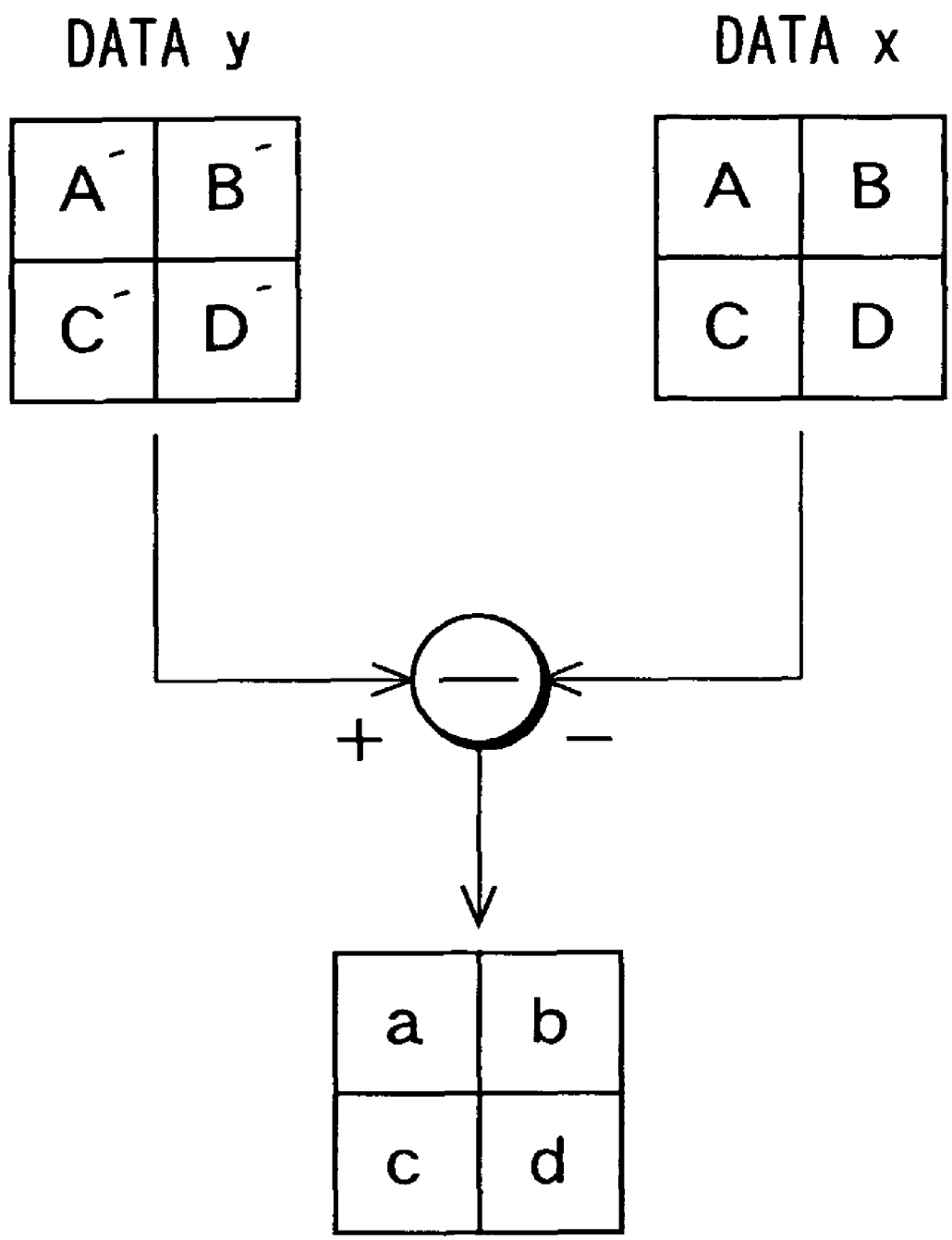
FIG. 7 is an explanatory diagram of operations of a subtraction portion.

FIG. 7 shows outlined subtraction operations in the subtraction portion 175 assuming, for simplicity, that the block data is comprised of 2×2 items of data. Four items of data A-D that constitute the data x are subtracted from four items of data A'-D' that constitute the data y, respectively so that four items of difference data a-d that constitute the data x are obtained. That is, a=A'-A, b=B'-B, c=C'-C, and d=D'-D.

Further, the unit 210 for generating difference data has an accumulation control portion 176 for averaging difference data df, for each class, sequentially output from the subtraction portion 175, based on a class code CL generated by a class classification portion 178, which will be described later and storing its result in the accumulation table 177 as difference data DF.

Further, the unit 210 for generating difference data has the class classification portion 178 serving as class detection means for detecting a class to which pixel data of a target position in the teacher signal ST belongs. This class classification portion 178, detailed description of which is omitted though, is arranged the same way as the class classification portion 130 in the image-processing-portion 110 shown in FIG. 1 in that it uses multiple items of pixel data positioned in the periphery of the target position in the teacher signal ST among multiple items of pixel data that constitutes the student signal SS output from the MPEG2 decoder 153, to generate a class code CL that indicates a class to which pixel data of the target position in this teacher signal ST belongs.

The following will describe operations of the unit 210 for generating difference data shown in FIG. 6.

First, such a case will be described that difference data DF stored in the accumulation table 177 is that of pixel data. In this case, the transfer switches 172 and 174 are each connected to the b-sides thereof.

A teacher signal ST corresponding to the image signal Vb is supplied to the input terminal 151 and encoded in the MPEG2 encoder 152 where an MPEG2 stream is generated. This MPEG2 stream is supplied to the MPEG2 decoder 153. The MPEG2 decoder 153 decodes the MPEG2 stream to generate a student signal SS that corresponds to the image signal Va. This student signal SS has undergone MPEG2 encoding and decoding and so contains an encoding noise (encoding distortion).

Of the teacher signal ST time-adjusted by the delay circuit 159, pixel data y of a target position therein is supplied via the b-side of the transfer switch 174 to the subtraction portion 175. This subtraction portion 175 is supplied via the b-side of the transfer switch 172 with pixel data x that corresponds to the target position in the teacher signal ST among the student signal SS output from the MPEG2 decoder 153. Then, the subtraction portion 175 subtracts pixel data x from pixel data y to generate difference data df. The difference data df that correspond to each of the target positions in the teacher signal and is output sequentially from this subtraction portion 175 is supplied to the accumulation control portion 176.

Note here that the pixel data x and y are each block data comprised of, for example, 8×8 items of pixel data. The subtraction portion 175 subtracts each of the items of pixel data that constitute the pixel data x from each of the items of pixel data that constitute the pixel data y to obtain each of the items of difference data that constitute the difference data df.

The class classification portion 178 generates a class code CL that indicates a class to which the pixel data y of the target position in this teacher signal ST belongs using multiple items of pixel data positioned in a periphery of the target position in the teacher signal ST among the multiple items of pixel data that constitute the student signal SS output from the MPEG2 decoder 153.

This class code CL is supplied to the accumulation control portion 176. The accumulation control portion 176 averages multiple items of difference data df, respectively, for each class, that is sequentially output from the subtraction portion 175, based on the class code CL, and stores its result in the accumulation table 177 as multiple items of difference data DF.

Next, such a case is described that difference data DF stored in the accumulation table 177 is that of a DCT coefficient. In this case, the transfer switches 172 and 174 are each connected to the a-side thereof.

A teacher signal ST corresponding to the image signal Vb is supplied to the input terminal 151 and encoded in the MPEG2 encoder 152 where an MPEG2 stream is generated. This MPEG2 stream is supplied to the MPEG2 decoder 153. The MPEG2 decoder 153 decodes the MPEG2 stream, to generate a student signal SS that corresponds to the image signal Va. This student signal SS has undergone MPEG2 encoding and decoding and so contains an encoding noise (encoding distortion).

Of the teacher signal ST time-adjusted by the delay circuit 159, a DCT coefficient y obtained by performing DCT processing at the DCT circuit 173 on pixel data of a target position thereof is supplied via the a-side of the transfer switch 174 to the subtraction portion 175. Further, of the student signal SS output from the MPEG decoder 153, a DCT coefficient x obtained by performing DCT processing at the DCT circuit 171 on pixel data that corresponds to the target position of the teacher signal ST is supplied via the a-side of the transfer switch 172 thereto. Then, the subtraction portion 175 subtracts the DCT coefficient x from the DCT coefficient y to generate difference data df. The difference data df that correspond to each of the target positions in the teacher signal ST and are output sequentially from this subtraction portion 175 is supplied to the accumulation control portion 176.

Note here that the DCT coefficients x and y are each block data comprised of, for example, 8×8 DCT coefficients. The subtraction portion 175 subtracts each of the DCT coefficients that constitute the DCT coefficient x from each of the DCT coefficients that constitute the DCT coefficient y to obtain each of the items of difference data that constitute the difference data df.

The class classification portion 178 uses multiple items of pixel data positioned in a periphery of the target position in the teacher signal ST among multiple items of pixel data that constitute the student signal SS output from the MPEG2 decoder 153, to generate a class code CL that indicates a class to which the pixel data of the target position in this teacher signal ST belongs.

This class code CL is supplied to the accumulation control portion 176. The accumulation control portion 176 averages multiple items of difference data df, respectively, for each class, that is sequentially output from the subtraction portion 175, based on the class code CL, and stores its result in the accumulation table 177 as multiple items of difference data DF.

It is thus possible to generate class-specific difference data DF to be stored in the accumulation table 131 in the image-signal-processing portion 110 of FIG. 1, in the unit 210 for generating difference data shown in FIG. 6.

Figure 8:
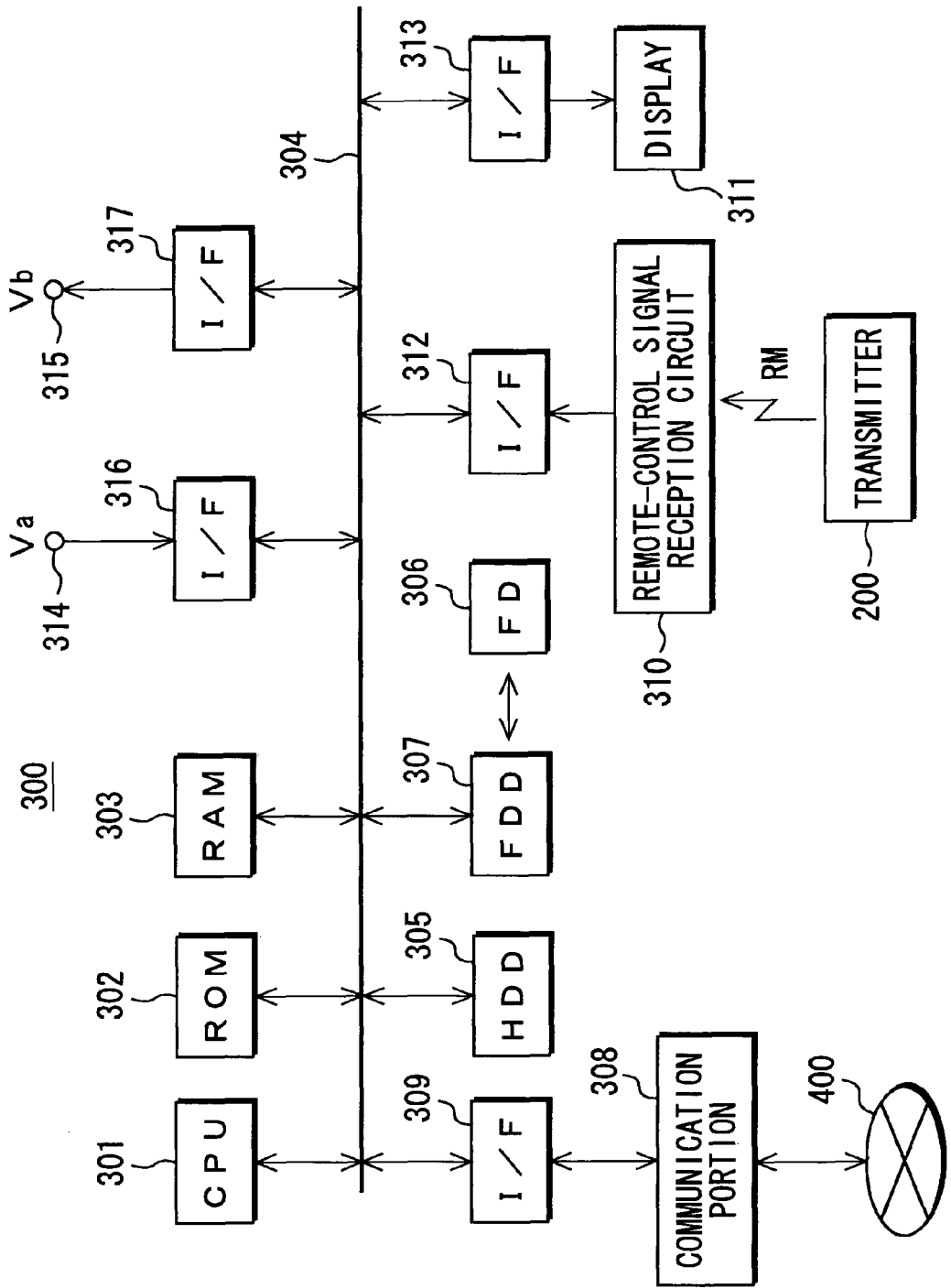
FIG. 8 is a block diagram for showing a configuration example of an apparatus for processing image signal for realizing it in software.

It is to be noted that processing in the image-signal-processing portion 110 of FIG. 1 can be realized also in software by, for example, such an apparatus 300 for processing image signal as shown in FIG. 8.

First, the apparatus 300 for processing image signal shown in FIG. 8 will be described. This apparatus 300 for processing image signal has a CPU 301 for controlling operations of the device as a whole, a read only memory (ROM) 302 for storing a control program for this CPU 301, difference data, etc., and a random access memory (RAM) 303 for providing a working space for the CPU 301. These CPU 301, ROM 302, and RAM 303 are each connected to a bus 304.

Further, the apparatus 300 for processing image signal has a hard disk drive (HDD) 305 serving as an external memory and a drive (FDD) 307 for driving a floppy (registered trademark) disk 306. These drives 305 and 307 are each connected to the bus 304.

Further, the apparatus 300 for processing image signal has a communication portion 308 that connects to a communication network 400 such as the Internet in a wire line or wireless manner. This communication portion 308 is connected to the bus 304 via an interface 309.

Further, the apparatus 300 for processing image signal has a user interface portion. This user interface portion has a remote-control signal reception circuit 310 for receiving the remote-control signal RM from the remote-control transmitter 200 and a display 311 constituted of a liquid crystal display (LCD) etc. The reception circuit 310 is connected to the bus 304 via an interface 312 and, similarly, the display 311 is connected to the bus 304 via an interface 313.

Further, the apparatus 300 for processing image signal has an input terminal 314 for allowing the image signal Va to be input and an output terminal 315 for outputting the image signal Vb. The input terminal 314 is connected to the bus 304 via an interface 316 and, similarly, the output terminal 315 is connected to the bus via an interface 317.

It is to be noted that instead of storing the control program, difference data, etc. in the ROM302 beforehand as described above, they can also be downloaded via the communication portion 308 from the communication network 400 such as, for example, the Internet and accumulated to a hard disk or the RAM303 and used. Further, these control program, difference data, etc. may be provided on the floppy (registered trademark) disk 306.

Further, instead of inputting the image signal Va to be processed through the input terminal 314, it may be recorded on a hard disk beforehand or downloaded via the communication portion 308 from the communication network 400 such as the Internet. Further, instead of outputting the image signal Vb after being processed to the output terminal 315 or concurrently with doing so, it may be supplied to the display 311 so that an image would be displayed or, further, stored on a hard disk or sent via the communication portion 308 to the communication network 400 such as the Internet.

Figure 9:
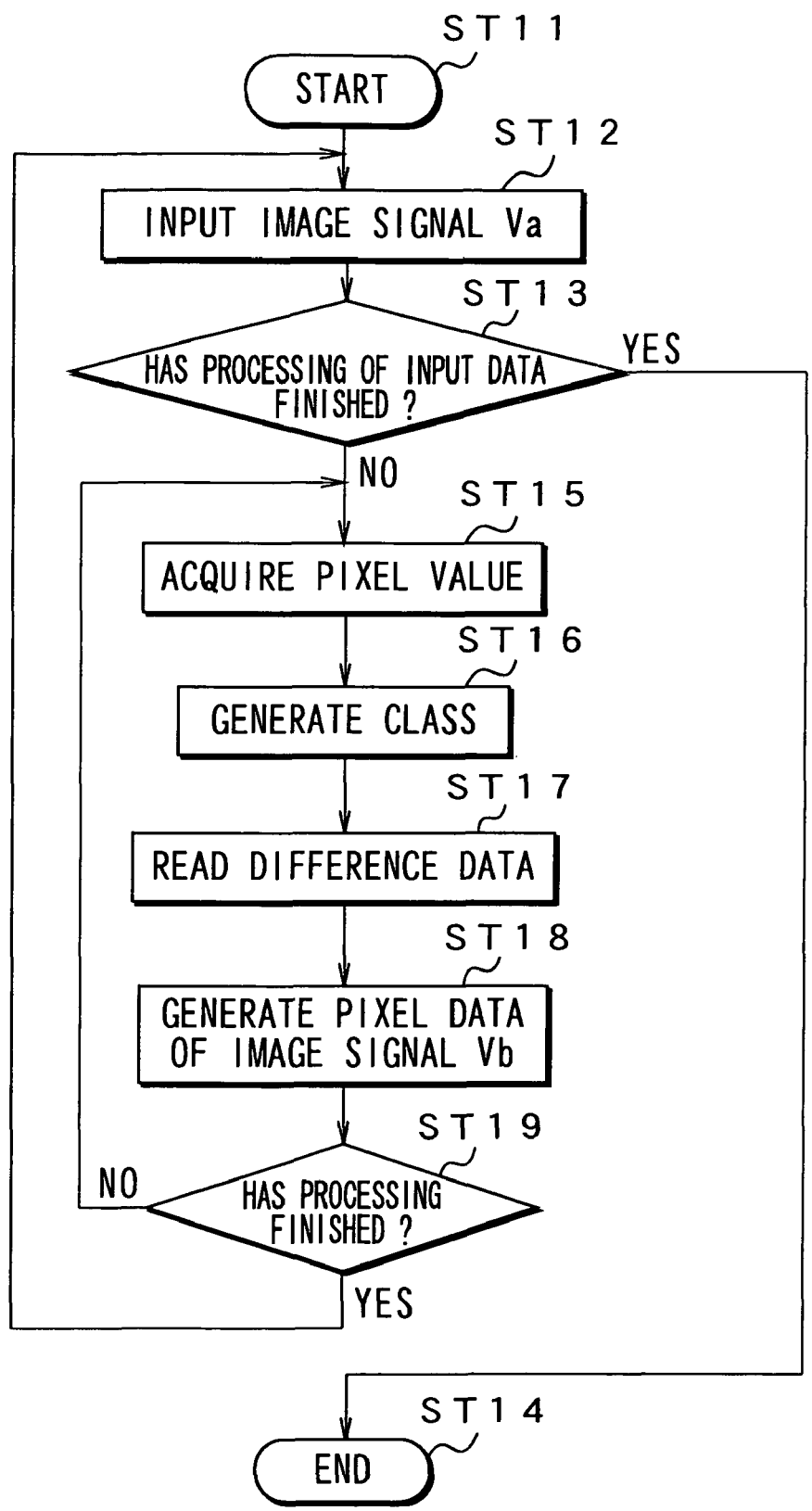
FIG. 9 is a flowchart for showing image signal processing.

The following will describe a processing procedure for obtaining the image signal Vb from the image signal Va in the apparatus 300 for processing image signal shown in FIG. 8, with reference to a flowchart of FIG. 9.

First, at step ST11, the process starts processing, and at step ST12, it inputs from, for example, the input terminal 314 one frame or one field of the image signal Va into the apparatus. In such a manner, pixel data that constitutes the image signal Va input from the input terminal 314 is stored in the RAM303 temporarily. It is to be noted that if this image signal Va is recorded in the hard disk drive 307 in the device beforehand, this image signal Va is read out of this drive 307 so that the pixel data that constitutes this image signal Va is temporarily stored in the RAM303.

At step ST13, it decides whether processing of all the frame or field of the image signal Va has finished. If the processing has finished, the process ends the processing at step ST14. Otherwise, it goes to step ST15.

At this step ST15, the process acquires pixel data of a class tap to be used for class classification from the image signal Va input at step ST12, in accordance with a target position in the image signal Vb. At step ST16, it generates a class code CL from the class tap pixel data.

Next, at step ST17, based on the class code CL generated at step ST16, the process reads difference data DF that corresponds to that class code CL out of the ROM302 etc. and stores it in the RAM303 temporarily.

Next, at step ST18, it adds the difference data DF read at step ST17 to pixel data x that corresponds to the target position in the image signal Vb among multiple items of pixel data that constitute the image signal Va, to generate pixel data y of the target position in the image signal Vb.

If, in this case, the difference data DF stored in the ROM302 etc. is that of a DCT coefficient which is obtained through DCT processing, the data y, which is a result of the addition, is a DCT coefficient, so that at step ST18, inverse DCT processing is performed further thereon. In this case, further, DCT processing is performed on the image signal Va input at the above-mentioned step ST12, to provide data x that corresponds to the target position in the image signal Vb, as a DCT coefficient.

Next, at step ST19, the process decides whether processing of obtaining pixel data of the image signal Vb has finished in all regions of pixel data of the frame or field of the image signal Va input at step ST12. If the processing has finished, the process returns to step ST12 to input the next one frame or field of the image signal Va. Otherwise, the process returns to step ST15 to repeat the same processing as the above on the next target position.

By thus performing the processing along the flowchart of FIG. 9, it is possible to process pixel data of the input image signal Va, thereby obtaining pixel data of the image signal Vb. As described above, the image signal Vb thus processed and obtained is output to the output terminal 315 or supplied to the display 311 so that a resultant image may be displayed or, further, supplied to the hard disk drive 305 to be recorded on a hard disk.

Although a processing device is not shown, processing in the unit 210 for generating difference data of FIG. 6 can also be realized in software.

Figure 10:
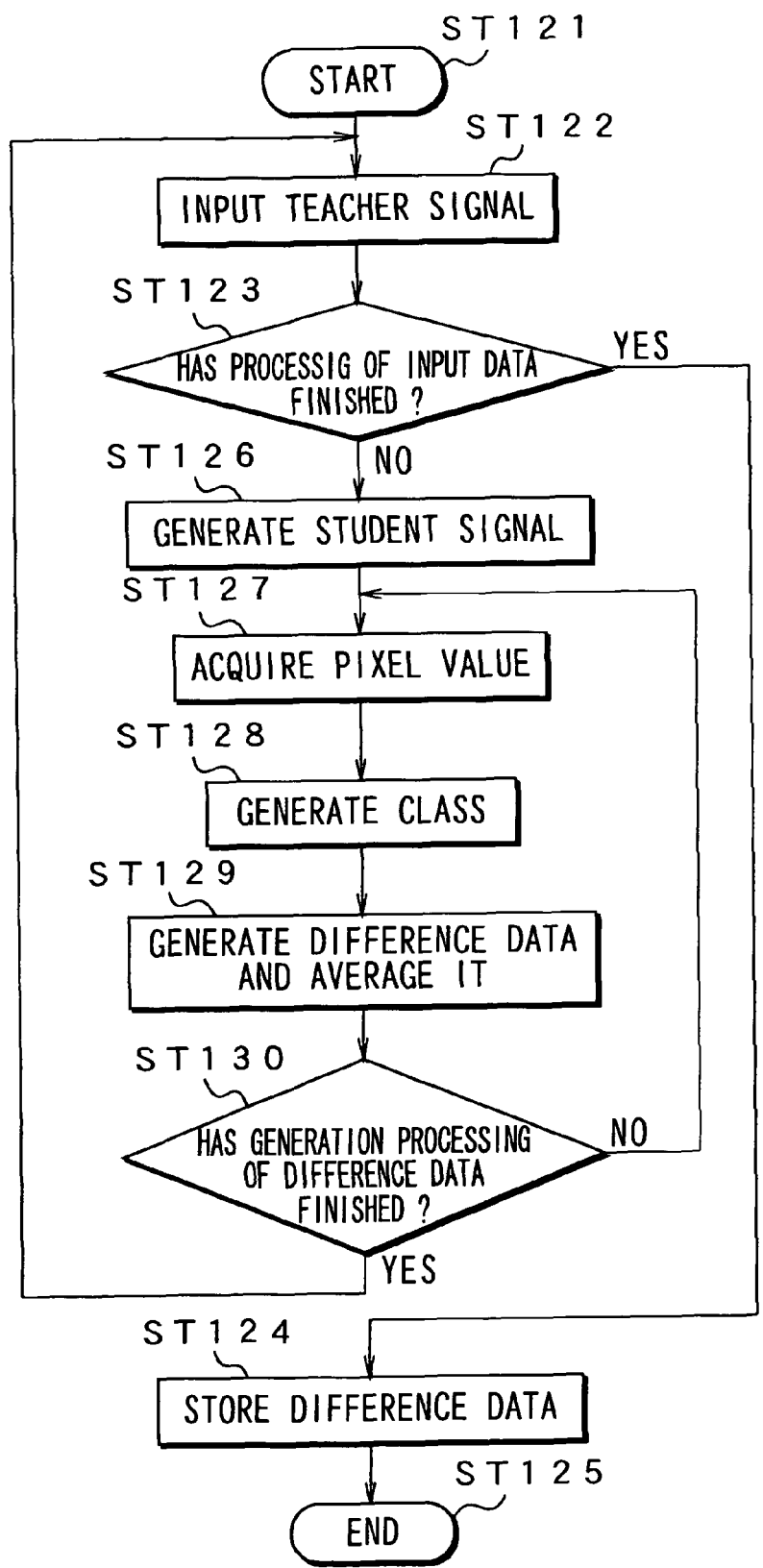
FIG. 10 is a flowchart for showing difference data generation processing.

The following will describe a processing procedure for generating difference data with reference to a flowchart of FIG. 10.

First, at step ST121 the process starts processing, and at step ST122 it inputs one frame or one field of the teacher signal ST. At step ST123, it decides whether processing of all the frame or field of the teacher signal ST has finished. If the processing has finished, the process goes to step ST124 to save difference data DF of each class in a memory and goes to ST125 to end the processing. Otherwise, it goes to step ST126.

At step ST126, the process performs MPEG encoding on the teacher signal ST input at step ST122 and, further, performs MPEG decoding on a resultant encoded data to generate a student signal SS.

Next, at step ST127, the process acquires pixel data of a class tap to be used for class classification from the student signal SS generated at step ST126, in accordance with a target position in the teacher signal ST. At step ST128, it generates a class code CL from the class tap pixel data.

Next, at step ST129, the process subtracts pixel data x of the student signal SS that corresponds to the target position in the teacher signal ST from pixel data y of the target position of this teacher signal ST to obtain difference data df. Further, at this step ST129, the process performs averaging processing thereon, for each class, based on the class code CL generated at step ST128, to generate difference data DF.

Next, at step ST130, the process decides whether processing of generating the difference data DF has finished in all regions of the teacher signal ST input at step ST122. If processing of generating the difference data DF has finished, the process returns to step ST122 to input the next one frame or field of the teacher signal, thus repeating the same processing as above. Otherwise, the process returns to step ST127 to repeat the same processing as the above on the next target position.

In this case, to generate difference data of a DCT coefficient obtained through DCT processing as the difference data DF, it is necessary to provide difference data df, which is a result of the subtraction, as the difference data of the DCT coefficient. In such a case, the process performs DCT processing on the teacher signal ST input at the above-mentioned step ST122, to convert the pixel data y that corresponds to the target position in the teacher signal ST into a DCT coefficient. Further, it performs DCT processing on the student signal SS generated at the above-mentioned step ST126, to convert the pixel data x of the student signal SS that corresponds to the target position in the teacher signal ST into a DCT coefficient.

By thus performing the processing along the flowchart of FIG. 10, it is possible to obtain the difference data DF by the same method as that for the unit 210 for generating difference data shown in FIG. 6.

It is to be noted that in the image-signal-processing portion 110 of the digital broadcast receiver 100 shown in FIG. 1 according to the present embodiment, items of data x and y have each been block data that corresponds to a DCT block which provides a unit to be used in DCT processing, the number of the items of data (pixel data or DCT coefficient) that constitute the data y has been equal to the number of the items of data (pixel data or DCT coefficient) that constitute the data x, and the number of the items of pixel data that constitute the image signal Vb has been equal to the number of the items of pixel data that constitute the image signal Va.

However, it is also possible to make the number of the items of pixel data that constitute the image signal Vb equal to N (which is 2 or larger integer) times the number of the items of pixel data that constitute the image signal Va. In this case, the number of the items of data (pixel data or DCT coefficient) that constitute the data y is N times the number of the items of data (pixel data or DCT coefficient) that constitute the data x. In this case, further, difference data DF to be supplied from the accumulation table 131 to the addition portion 134 is comprised of the same number of the items of difference data as that of the items of data that constitute the data y. For example, if N=4, the data x is comprised of 8×8 items of data and the data y is comprised of 16×16 items of data.

In this case, the addition portion 134 performs different additions depending on whether the difference data DF stored in the accumulation table 131 is that of pixel data or that of DCT coefficients (frequency coefficients) obtained through DCT processing.

First, such a case will be described that the difference data DF stored in the accumulation table 131 is that of pixel data.

In this case, to each of the difference data contained in each of divided regions obtained by dividing the difference data DF by N, each of the items of corresponding pixel data that constitute the pixel data x is added to obtain each item of pixel data that constitute pixel data y.

Figure 11:
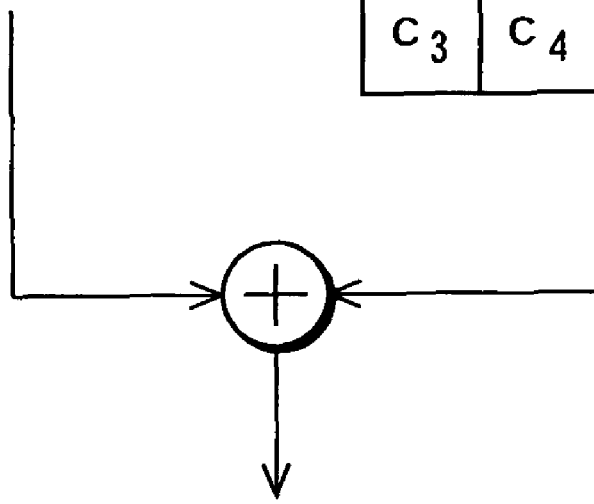
FIG. 11 is another explanatory diagram for showing operations of the addition portion.

FIG. 11 shows outlined addition operations performed by the addition portion 134 in a case where N=4, for example, assuming, for simplicity, that the pixel data x is comprised of 2×2 items of pixel data and the pixel data y is comprised of 4×4 items of pixel data. The difference data DF is divided by 4 into $a_1$-$a_4$, $b_1$-$b_4$, $c_1$-$c_4$, and $d_1$-$d_4$. To each of the items of difference data $a_1$-$a_4$, pixel data A that constitutes the pixel data x is added so that each of the items of pixel data $A_1$-$A_4$ that constitute the pixel data y is obtained.

Further, to each of the items of difference data $b_1$-$b_4$, pixel data B that constitutes the pixel data x is added so that each of the items of pixel data $B_1$-$B_4$ that constitute the pixel data y is obtained. Further, to each of the items of difference data $c_1$-$c_4$, pixel data C that constitutes the pixel data y is added so that each of the items of pixel data $C_1$-$C_4$ that constitute the pixel data y is obtained. Further, to each of the items of difference data $d_1$-$d_4$, pixel data D that constitutes the pixel data x is added so that each of the items of pixel data $D_1$-$D_4$ that constitute the pixel data y is obtained.

Further, the difference data DF in this case can be generated in the unit 210 for generating difference data shown in FIG. 6. In this case, for example, after the MPEG3 encoder 153 is used to perform decoding, thinning-out processing is performed, to make the number of the items of pixel data that constitute the student signal SS equal to (1/N) times the number of the items of pixel data that constitute the teacher signal ST. Accordingly, the number of the items of pixel data that constitute the pixel data y becomes N times the number of the items of pixel data that constitute the pixel data x. For example, if N=4, the pixel data x is comprised of 8×8 items of pixel data and the pixel data y is comprised of 16×16 items of pixel data.

In this case, the subtraction portion 175 subtracts from each of the items of pixel data contained in each of the regions obtained by dividing the pixel data y by N each of the items of corresponding pixel data that constitute the pixel data x, so that each of the items of difference data that constitute difference data df is obtained.

Figure 12:
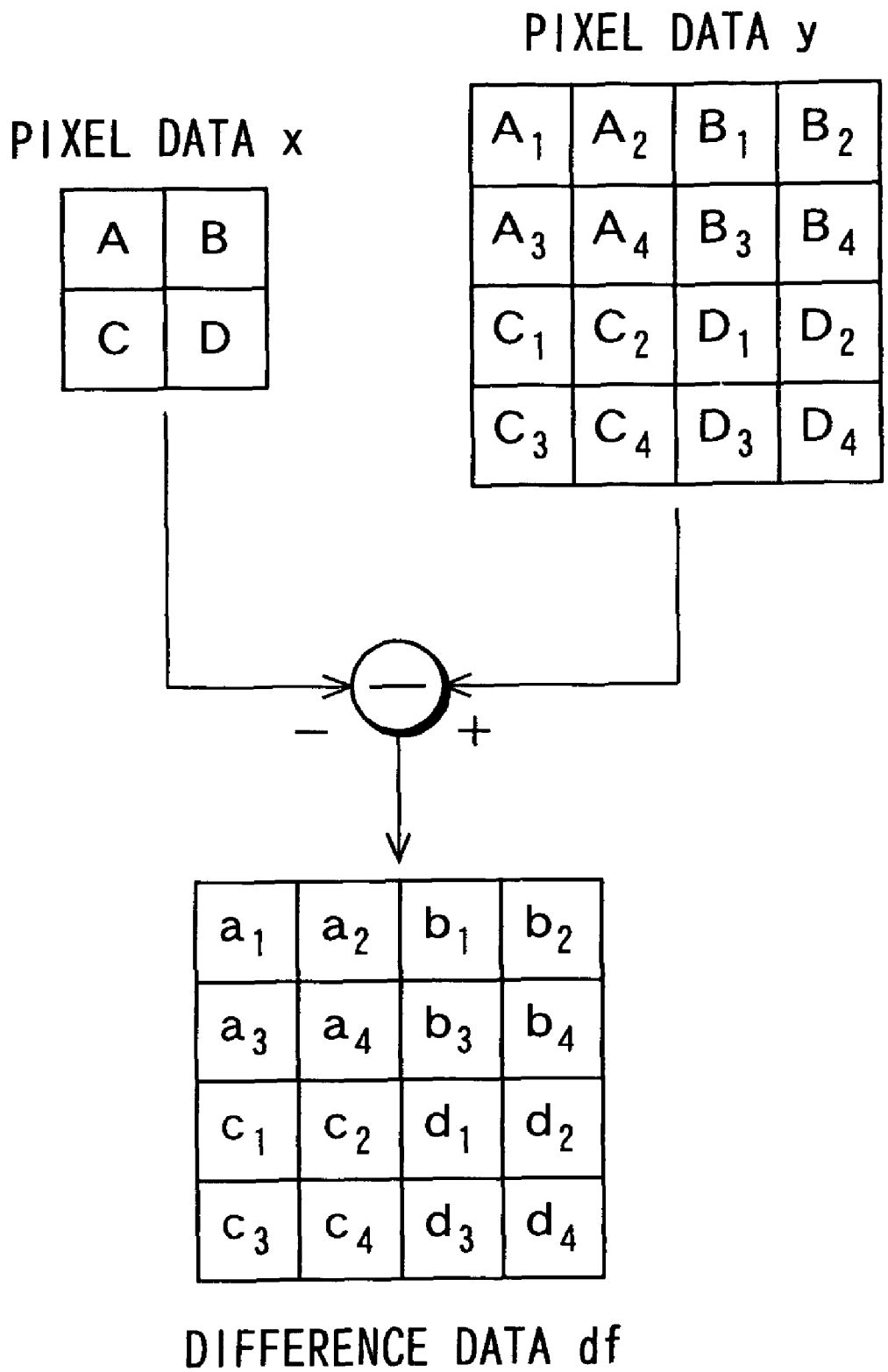
FIG. 12 is another explanatory diagram of operations of the subtraction portion.

FIG. 12 shows outlined subtraction operations performed by the subtraction portion 175 in a case where N=4 for example, assuming, for simplicity, that the pixel data x is comprised of 2×2 items of pixel data and the pixel data y is comprised of 4×4 items of pixel data. The pixel data y is divided by 4 into $A_1$-A, $B_1$-$B_4$, $C_1$-$C_4$, and $D_1$-$D_4$. From each of the items of pixel data $A_1$-$A_4$, pixel data A that constitutes the pixel data x is subtracted so that each of the items of difference data $a_1$-$a_4$ that constitute the difference data df is obtained.

Further, from each of the items of pixel data $B_1$-$B_4$, pixel data B that constitutes the pixel data x is subtracted so that each of the items of difference data $b_1$-$b_4$ that constitute the difference data df is obtained. Further, from each of the items of pixel data $C_1$-$C_4$, pixel data C that constitutes the pixel data x is subtracted so that each of the items of pixel data $c_1$-$c_4$ that constitute the difference data df is obtained. Further, from each of the items of pixel data $D_1$-$D_4$, pixel data D that constitutes the pixel data x is subtracted so that each of the items of difference data $d_1$-$d_4$ that constitute the difference data df is obtained.

Next, such a case will be described that the difference data DF stored in the accumulation table 131 in the image-signal-processing portion 110 (see FIG. 1) is that of a DCT coefficient obtained through DCT processing.

In this case, to a low-frequency component portion, which corresponds to a DCT coefficient x, of each of the items of difference data that constitute the difference data DF, the corresponding one of DCT coefficients that constitute this DCT coefficient x is added, so that each of the DCT coefficients that constitute a DCT coefficient y is obtained.

FIG. 13 shows outlined addition operations performed by the addition portion 134 in a case where N=4, for example, assuming, for simplicity, that the DCT coefficient x is comprised of 2×2 DCT coefficients and the DCT coefficient y is comprised of 4×4 DCT coefficients.

To low-frequency component portions a-d, which correspond to the DCT coefficient x, of the items of difference data a-p that constitute the difference data DF, DCT coefficients A-D that constitute the DCT coefficient x are added so that DCT coefficients A'-D' that constitute the DCT coefficient y are obtained, respectively. Further, items of the other difference data e-p of the DCT coefficient y provide the DCT coefficients e-p that constitute the DCT coefficient y as they are.

Further, the difference data DF in this case can be generated by the unit 210 for generating difference data shown in FIG. 6. In this case, for example, after the MPEG encoder 153 is used to perform decoding, thinning-out processing is performed, to make the number of the items of pixel data that constitute the student signal SS equal to (1/N) times the number of the items of pixel data that constitute the teacher signal ST. Accordingly, the number of the DCT coefficients that constitute the DCT coefficient y becomes N times the number of DCT coefficients that constitute the DCT coefficient x. For example, if N=4, the DCT coefficient x is comprised of 8×8 DCT coefficients and the DCT coefficient y is comprised of 16×16 DCT coefficients.

In this case, the subtraction portion 175 subtracts from low-frequency component portions, which correspond to the DCT coefficient x, of the DCT coefficients that constitute the DCT coefficient y, the DCT coefficients that constitute the DCT coefficient x, so that the items of difference data that constitute the difference data df are obtained.

Figure 14:
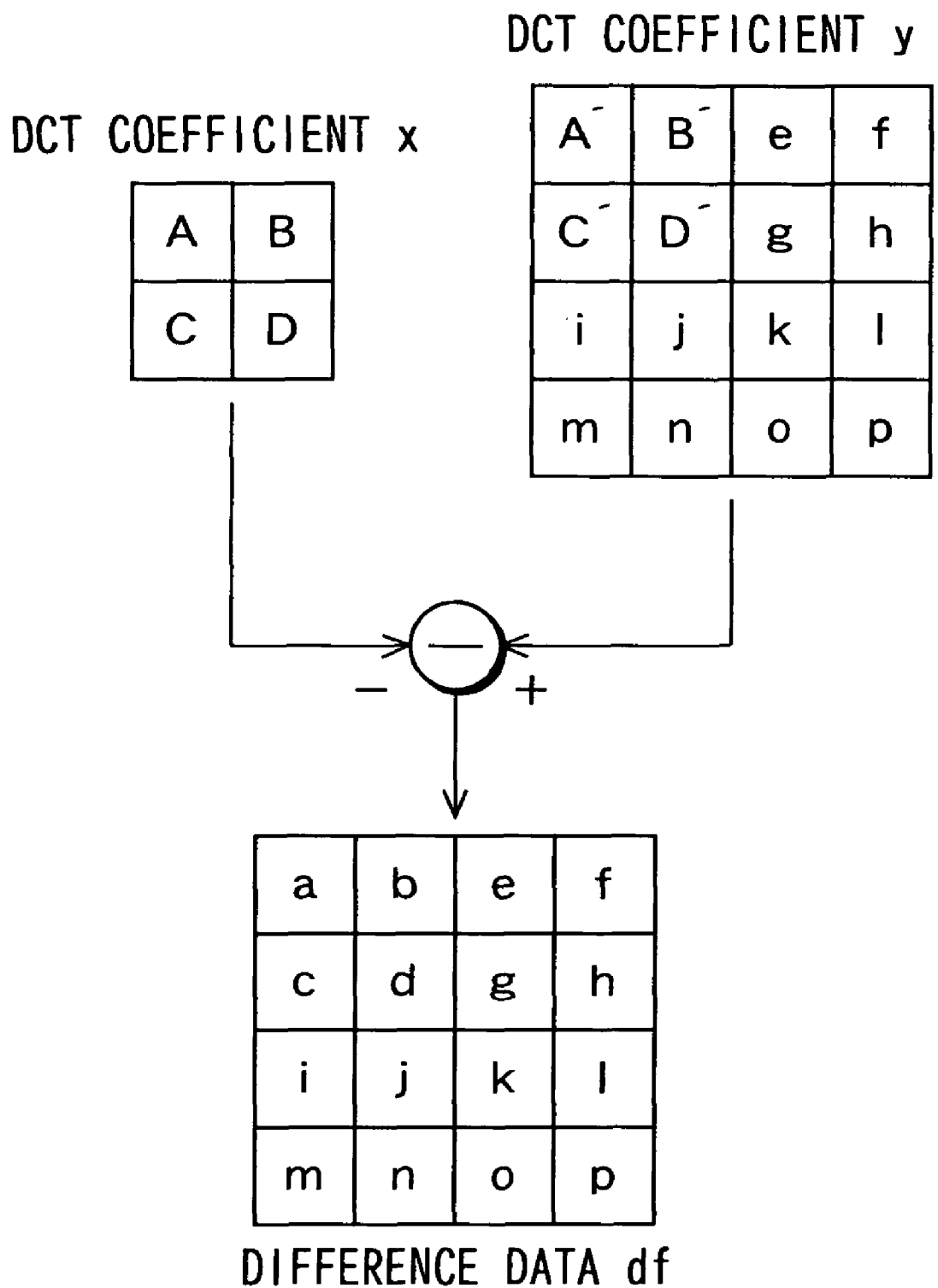
FIG. 14 is a further explanatory diagram of operations of the subtraction portion.

FIG. 14 shows outlined subtraction operations performed by the subtraction portion 175 in a case where N=4 for example, assuming, for simplicity, that the DCT coefficient x is comprised of 2×2 DCT coefficients and the DCT coefficient y is comprised of 4×4 DCT coefficients. From low-frequency component portions A'-D', which correspond to the DCT coefficient x, of the DCT coefficients A'-p that constitute the DCT coefficient y, the DCT coefficients A-D that constitute the DCT coefficient x are subtracted, so that items of difference data a-d that constitute the difference data df are obtained. Further, the other DCT coefficients e-p of the DCT coefficient y provide the difference data e-p that constitute the difference data df as they are.

It is to be noted that instead of storing difference data of a DCT coefficient (frequency coefficient) obtained through DCT processing in the accumulation table 131, the DCT coefficient itself may be stored. In this case, the DCT coefficient to be stored in the accumulation table 131 can be obtained by using the DCT coefficient y itself in place of difference data df obtained by subtracting the DCT coefficient x from the DCT coefficient y in, for example, the unit 210 for generating difference data shown in FIG. 6.

In this case, by the addition portion 134 in the image-signal-processing portion 110, at least the low-frequency components, which correspond to the DCT coefficient x, of DCT coefficients (correction data) from the accumulation table 131 are replaced by the corresponding DCT coefficients that constitute the DCT coefficient x, so that DCT coefficients that constitute the DCT coefficient y are obtained.

Figure 15:
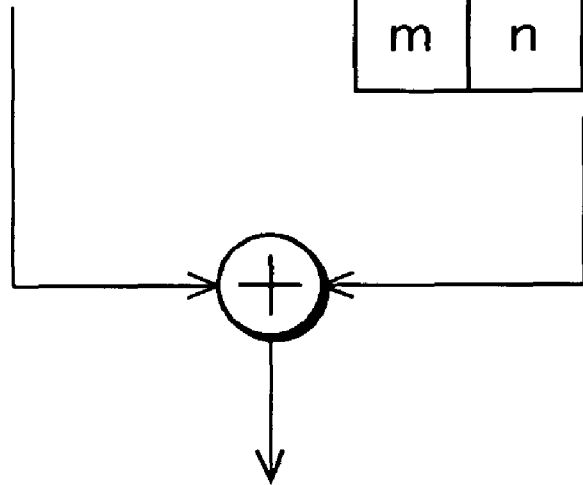
FIG. 15 is an additional explanatory diagram for showing operations of the addition portion.

FIG. 15 shows outlined addition operations performed by the addition portion 134 in a case where N=4 for example, assuming, for simplicity, that the DCT coefficient x is comprised of 2×2 DCT coefficients and the DCT coefficient y is comprised of 4×4 DCT coefficients.

Low-frequency component portions a-d, which correspond to the DCT coefficient x, of frequency coefficients a-p that constitute DCT coefficient (correction data) are replaced by the DCT coefficients A-D that constitute the DCT coefficient x, so that the DCT coefficients A-D and e-p that constitute the DCT coefficient y are provided, respectively. It may be considered that not all of the portions of e-p are used but some or all of them are used depending on, for example, classes.

Although the above-mentioned first embodiment has handled an MPEG2 stream involving DCT, the present invention is similarly applicable to handling of other encoded informational digital signals. Further, encoding may involve, in place of DCT, any other orthogonal transformation such as wavelet transformation, discrete sine transformation, etc.

Further, although in the above-mentioned first embodiment the informational signal has been an image signal, the present invention is not limited to it. For example, the present invention is applicable similarly to a case where the informational signal is an audio signal.

The following will describe a second embodiment of the present invention.

Figure 16:
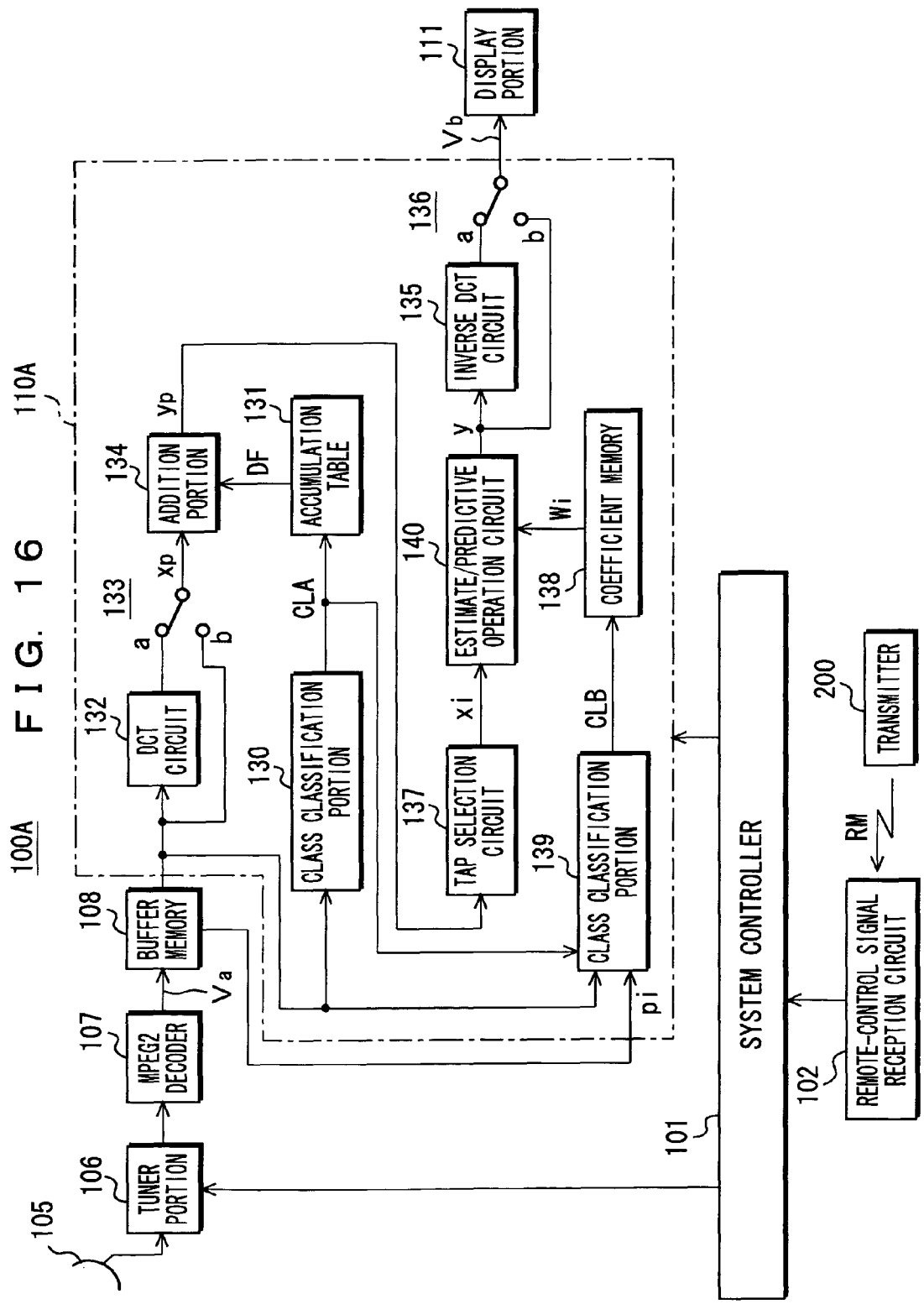
FIG. 16 is a block diagram for showing a configuration of a digital broadcast receiver according to a second embodiment.

FIG. 16 shows a configuration of a digital broadcast receiver 100A according to the second embodiment.

The digital broadcast receiver 100A has an image-signal-processing portion 110A by which the image-signal-processing portion 110 in the digital broadcast receiver 100 shown in FIG. 1 is replaced and operates in the same way as the digital broadcast receiver 100.

It is to be noted that an MPEG2 decoder 107 in the digital broadcast receiver 100A has the same configuration and operates in the same way as the MPEG2 decoder 107 in the digital broadcast receiver 100 shown in FIG. 1 (see FIG. 2 and its explanation). However, in the MPEG2 decoder 107 in the digital broadcast receiver 100A, when an image signal Va is output from the picture selection circuit 190, in addition to each of the items of pixel data that constitute this image signal Va, pixel position mode information pi for indicating which position of, for example, 8×8 pixel positions of a DCT block the pixel data has is also output with it being paired with each of the items of pixel data. This pixel position mode information pi is used as information for class classification as described later.

The image-signal-processing portion 110A will be described in detail. Such components of this image-signal-processing portion 110A as to correspond to those of the image-signal-processing portion 110 shown in FIG. 1 are indicated by the same symbols and so their description is omitted as appropriate.

This image-signal-processing portion 110A has a class classification portion 130, an accumulation table 131, a DCT circuit 132, a transfer switch 133, an addition portion 134, an inverse DCT circuit 135, and a transfer switch 136, which are the same as the class classification portion 130, the accumulation table 131, the DCT circuit 132, the transfer switch 133, the addition portion 134, the inverse DCT circuit 135, and the transfer switch 136, respectively, in the above-mentioned image-signal-processing portion 110 of FIG. 1 and so their description is omitted.

Further, this image-signal-processing portion 110A has a tap selection circuit 137 serving as data selection means for taking out selectively and outputting, as data of a predictive tap, multiple items of data related to a target position in an image signal Vb based on output data (pixel data or DCT coefficient) of the addition portion 134.

The tap selection circuit 137 selectively takes out the multiple items of pixel data positioned in a periphery of the target position in the image signal Vb if difference data of pixel data is stored in the accumulation table 131 and the transfer switch 133 is connected to its b-side and used.

If difference data of a DCT coefficient is stored in the accumulation table 131 and the transfer switch 133 is connected to its a-side and used, on the other hand, the tap selection circuit 137 selectively takes out plural DCT coefficients corresponding to the periphery of the target position in the image signal Vb. For example, as the plural DCT coefficients, DC coefficients are selected which are present in a DCT coefficient block that corresponds to block data containing pixel data of the target position in the image signal Vb and four DCT coefficient blocks adjacent to this DCT coefficient block.

Further, the image-signal-processing portion 110A has a coefficient memory 138. This coefficient memory 138 stores, for each class, coefficient data Wi (i=1, ... , n, n is the number of predictive taps) which is used in an estimate equation used by an estimate/predictive operation circuit 140, which will be described later. This coefficient memory 138 is supplied with a class code CLB output from a class classification portion 139, which will be described later, as read address information. From this coefficient memory 138, the coefficient data Wi of an estimate equation that corresponds to the class code CLB is read and supplied to the estimate/predictive operation circuit 140. A method for generating the coefficient data Wi will be described later.

Further, the image-signal-processing portion 110A has the class classification portion 139 as class detection means for detecting a class (second class) to which pixel data of the target position in the image signal Vb belongs. This class classification portion 139 classifies classes in units of an item of pixel data or a DCT coefficient.

Figure 17:
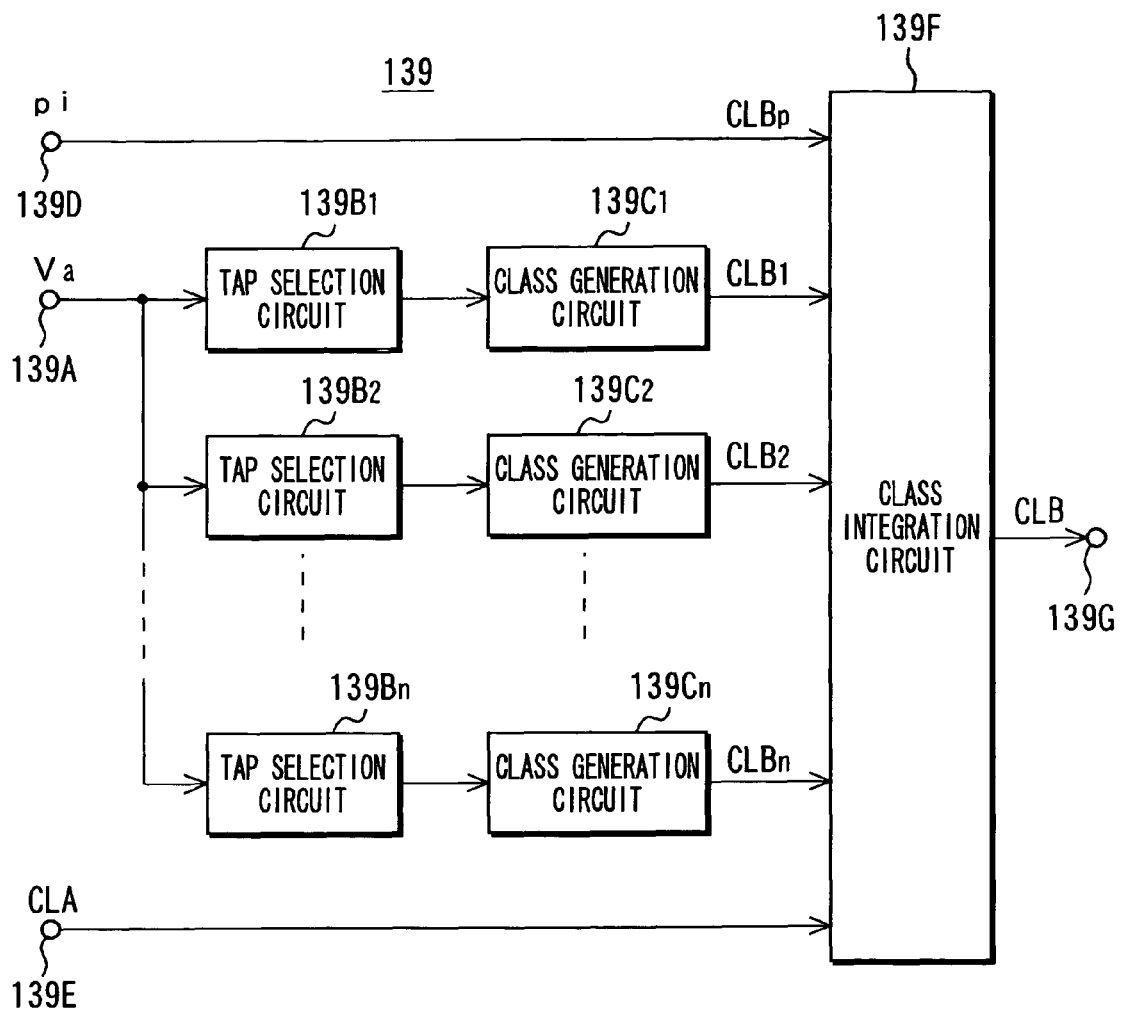
FIG. 17 is a block diagram for showing a configuration of a class classification portion.

FIG. 17 shows a configuration of the class classification portion 139.

This class classification portion 139 has an input terminal 139A through which the image signal Va is input and tap selection circuits 139B$_1$ through 139B$_n$ for selectively taking out multiple items of pixel data of class taps used to detect classes in units of an item of pixel data or a DCT coefficient to which pixel data y of the target position in the image signal Vb belongs, based on the image signal Va input through this input terminal 139A.

Further, the class classification portion 139 has class generation circuits 139C$_1$ through 139C$_n$ for generating class codes CLB$_1$ through CLB$_n$ that indicate n number of types of classes by using items of pixel data, respectively, taken out by the tap selection circuits 139B$_1$ through 139B$_n$.

In the present embodiment, a class code CLB$_1$ that indicates one type of class is generated. This one type of class refers to a time/space waveform class. This class will be described briefly below.

It is supposed that the tap selection circuit 138B$_1$ and the class generation circuit 139C$_1$ constitute a system for detecting this time/space waveform class.

The tap selection circuit 139B$_1$ selectively takes out and outputs multiple items of data related to the target position in the image signal Vb similar to the above-mentioned tap selection circuit 137. The class generation circuit 139C$_1$ performs, for example, 1-bit ADRC etc. on each of the multiple items of data to generate a class code CLB$_1$ that indicates a space waveform class.

Further, the class classification portion 139 has an input terminal 139D through which the pixel position mode information pi that corresponds to the target position in the image signal Vb is input and an input terminal 139E through which a class code CLA, which is a result of block-unit class classification performed by the above-mentioned class classification portion 130, is input. The information pi that is input through the input terminal 139D provides as it is a class code CLB$_p$ that indicates a pixel position mode class.

Further, the class classification portion 139 has a class integration circuit 139F for integrating class codes CLB$_1$ through CLB$_n$ generated by the class generation circuits 139C$_1$ through 139C$_n$, a class code CLB$_p$ input through the input terminal 139D, and a class code CLA input through the input terminal 139E into one class code CLB and an output terminal 139G for outputting this class code CLB.

Again, referring back to FIG. 16, the image-signal-processing portion 110A further has the estimate/predictive operation circuit 140 for calculating the pixel data y related to the target position in the image signal Vb to be generated by using an estimate equation of Equation (1) from data xi of a predictive tap taken out selectively by the tap selection circuit 130 and coefficient data Wi read out of the coefficient memory 138.

$$y = \sum_{i=1}^{n} W_i \cdot x_i \quad (1)$$

The estimate/predictive operation circuit 140 generates pixel data of the target position in the image signal Vb if multiple items of pixel data positioned in a periphery of the target position in the image signal Vb is taken out selectively by the tap selection circuit 137. If plural DCT coefficients corresponding to the periphery of the target position in the image signal Vb are taken out selectively by the tap selection circuit 137, on the other hand, the estimate/predictive operation circuit 140 generates a DCT coefficient that corresponds to pixel data of the target position in the image signal Vb. The data y calculated by this estimate/predictive operation circuit 140 is supplied to the inverse DCT circuit 135 and a b-side fixed terminal of the transfer switch 136.

The following will describe operations of this image-signal-processing portion 110A.

First, a case such that difference data DF stored in the accumulation table 131 is that of pixel data will be described. In this case, the transfer switches 133 and 136 are each connected to the b-sides thereof.

The class classification portion 130 generates a class code CLA indicating a class to which pixel data of a target position in the mage signal Vb belongs, based on the image signal Va. This class code CLA is resulted from the block-unit class classification. This class code CLA is supplied to the accumulation table 131 as read address information. From the accumulation table 131, based on this class code CLA, difference data DF that corresponds to the target position in the image signal Vb is read and supplied to the addition portion 134.

Further, of the image signal Va stored in the buffer memory 108, pixel data x$_p$ that corresponds to the target position in the image signal Vb is supplied via the b-side of the transfer switch 133 to the addition portion 134. The addition portion 134 adds to this pixel data x$_p$ the difference data DF read out of the accumulation table 131, corrects the pixel data x$_p$, thereby generating pixel data y$_p$ that corresponds to the pixel data of the target position in the image signal Vb.

Further, the class classification portion 139 generates a class code CLB that indicates a class to which pixel data of the target position in the image signal Vb belongs, based on the image signal Va, the pixel position mode information pi, and the class code CLA. This class code CLB is resulted from the pixel-data-unit class classification. This class code CLB is supplied to the coefficient memory 138 as read address information. From the coefficient memory 138, coefficient data Wi that corresponds to the class code CLB is read and supplied to the estimate/predictive operation circuit 140.

Further, in the tap selection circuit 137, multiple items of pixel data positioned in a periphery of the target position in the image signal Vb are selectively taken out as pixel data of a predictive tap, based on the corrected pixel data y$_p$ output from the addition portion 134. In the estimate/predictive operation circuit 140, pixel data y of the target position in the image signal Vb to be generated is obtained based on the above-mentioned Equation (1) by using the pixel data xi of the predictive tap and the coefficient data Wi read out of the coefficient memory 138. This pixel data y is output via the b-side of the transfer switch 136 as an output signal of the image-signal-processing portion 110A. That is, this pixel data y constitutes the image signal Vb.

Next, a case such that difference data DF stored in the accumulation table 131 is that of a DCT coefficient obtained through DCT processing will be described. In this case, the transfer switches 133 and 136 are each connected to the a-sides thereof.

The class classification portion 130 generates a class code CLA that indicates a class to which pixel data of a target position in the image signal Vb belongs, based on the image signal Va. This class code CLA is resulted from block-unit class classification. This class code CLA is supplied to the accumulation table 131 as read address information. From the accumulation table 131, based on this class code CLA, difference data DF corresponding to the target position in the image signal Vb is read and supplied to the addition portion 134.

A DCT coefficient $x_p$ obtained at the DCT circuit 132 by performing DCT processing on multiple items of pixel data of the image signal Va that correspond to the pixel data of the target position in the image signal Vb is supplied via the a-side of the transfer switch 133 to the addition portion 134. The addition portion 134 adds to this DCT coefficient $x_p$ the difference data DF, and corrects the DCT coefficient $x_p$, thereby generating a DCT coefficient $y_p$ that corresponds to the pixel data of the target position in the image signal Vb.

Further, in the class classification portion 139, a class code CLB indicating a class to which pixel data of the target position in the image signal Vb belongs, is generated based on the image signal Va, the pixel position mode information pi, and the class code CLA. This class code CLB is resulted from the pixel-data-unit class classification. This class code CLB is supplied to the coefficient memory 138 as read address information. From the coefficient memory 138, coefficient data Wi that corresponds to the class code CLB is read and supplied to the estimate/predictive operation circuit 140.

Further, in the tap selection circuit 137, plural frequency coefficients positioned in a periphery of the target position in the image signal Vb are selectively taken out as a frequency coefficient of a predictive tap based on the corrected DCT coefficient YP output from the addition position 134. In the estimate/predictive operation circuit 140, a DCT coefficient y corresponding to the pixel data of the target position in the image signal Vb to be generated is obtained based on the above-mentioned estimate equation of Equation (1) by using the frequency coefficient xi of the predictive tap and the coefficient data Wi read out of the coefficient memory 138.

This DCT coefficient y is supplied to the inverse DCT circuit 135. In this inverse DCT circuit 135, inverse DCT processing is performed on the DCT coefficient y so that pixel data is obtained. In such a manner, the pixel data output from the inverse DCT circuit 135 is output via the a-side of the transfer switch 136 as an output signal of the image-signal-processing portion 110A. That is, this pixel data constitutes the image signal Vb.

In such a manner, in the image-signal-processing portion 110A, when data (pixel data or DCT coefficient) $x_p$ related to the image signal Va is corrected to obtain data (pixel data or DCT coefficient) $y_p$ related to the image signal Vb, a first class to which the data $y_p$ belongs is detected on the basis of the image signal Va, so that difference data DF that corresponds to this detected class is added to the data $x_p$ to obtain the data $y_p$ in which an encoding noise is reduced, thereby enabling an image signal, as image signal Vb, in which its encoding noise is well reduced to be obtained.

Further, in the image-signal-processing portion 110A, the data (pixel data or DCT coefficient) y of the target position in the image signal Vb is obtained on the basis of an estimate equation by using the data xi of a predictive tap selected on the basis of the corrected data (pixel data or DCT coefficient) and the coefficient data Wi that corresponds to a second class to which the pixel data of the target position in the image signal Vb belongs, so that, of the encoding noise in the informational signal obtained by decoding the encoded informational digital signal, the one yet remained by the correction processing by use of the above-mentioned difference data (correction data) DF is well reduced.

Further, the class classification portion 139 generates the class code CLB as class classification in units of pixel data or DCT coefficient, whereas the class classification portion 130 generates the class code CLA as class classification in units of block. That is, class classification in the class classification portion 139 is the one obtained by making class classification that is made in the class classification portion 130 finer.

In this case, the number of classes classified in the class classification portion 130 can be made smaller, so that the number of items of difference data to be stored in the accumulation table 131 can be made smaller correspondingly, thereby saving on a memory capacity of the accumulation table 131. It is to be noted that if such a memory capacity of the accumulation table 131 is not taken into account, such a configuration can also be provided that, for example, a class code CLB generated by the class classification portion 139 may be used as read address information for the coefficient memory 138 as well as for the accumulation table 131.

The following will describe a method for generating the coefficient data Wi to be stored in the coefficient memory 138 in the image-signal-processing portion 110A of FIG. 16. This coefficient data Wi is generated by learning beforehand.

First, this learning method will be described. In above-mentioned Equation (1), before learning, items of coefficient data $W_1, W_2, \ldots, W_n$ are undetermined coefficients. The learning is performed for each class on the multiple items of signal data. If the number of the items of learning data is m, in accordance with Equation (1), the following Equation (2) is set.

$$y_k = W_1 \times x_{k1} + W_2 \times x_{k2} + \ldots + W_n \times x_{kn} \quad (2)$$

(k=1, 2, ..., m)

where n indicates the number of predictive taps.

If m>n, the items of coefficient data $W_1, W_2, \ldots, W_n$ are not determined uniquely, so that an element $e_k$ of an error vector e is defined by the following Equation (3), to obtain coefficient data that minimizes $e^2$ in Equation (4). The coefficient data is determined uniquely by so-called the least-squares method.

$$e_k = y_k - \{w_1 \times x_{k1} + W_2 \times x_{k2} + \ldots + W_n \times x_{kn}\} \quad (3)$$
$$(k = 1, 2, \ldots, m)$$

$$e^2 = \sum_{k=1}^{m} e_k^2 \quad (4)$$

According to an actual method for calculating to obtain the coefficient data that minimizes $e^2$ in Equation (4), first, as indicated in Equation (5), $e^2$ can be partially differentiated by using the coefficient data Wi (i=1, 2, ..., n), to obtain the coefficient data Wi in such a manner that a partially differentiated value may be 0 for each value of i.

$$\frac{\partial e^2}{\partial W_i} = \sum_{k=1}^{m} 2\left[\frac{\partial e_k}{\partial W_i}\right] e_k = \sum_{k=1}^{m} 2x_{ki} \cdot e_k \quad (5)$$

The following will describe a specific procedure for obtaining the coefficient data Wi by using Equation (5). By defining Xij and Yij as indicated by Equations (6) and (7) respectively, Equation (5) can be rewritten into a determinant of Equation (8).

$$X_{ji} = \sum_{p=1}^{m} x_{pi} \cdot x_{pj} \quad (6)$$

$$Y_i = \sum_{k=1}^{m} x_{ki} \cdot y_k \quad (7)$$

$$\begin{bmatrix} X_{11} & X_{12} & \ldots & X_{1n} \\ X_{21} & X_{22} & \ldots & X_{2n} \\ \ldots & \ldots & \ldots & \ldots \\ X_{n1} & X_{2n} & \ldots & X_{nn} \end{bmatrix} \begin{bmatrix} W_1 \\ W_2 \\ \ldots \\ W_n \end{bmatrix} = \begin{bmatrix} Y_1 \\ Y_2 \\ \ldots \\ Y_n \end{bmatrix} \quad (8)$$

Equation (8) is generally referred to as a normal equation. By solving this normal equation with a general solution such as sweeping-out (Gauss-Jordan elimination), the coefficient data Wi (i=1, 2, ..., n) can be solved.

Figure 18:
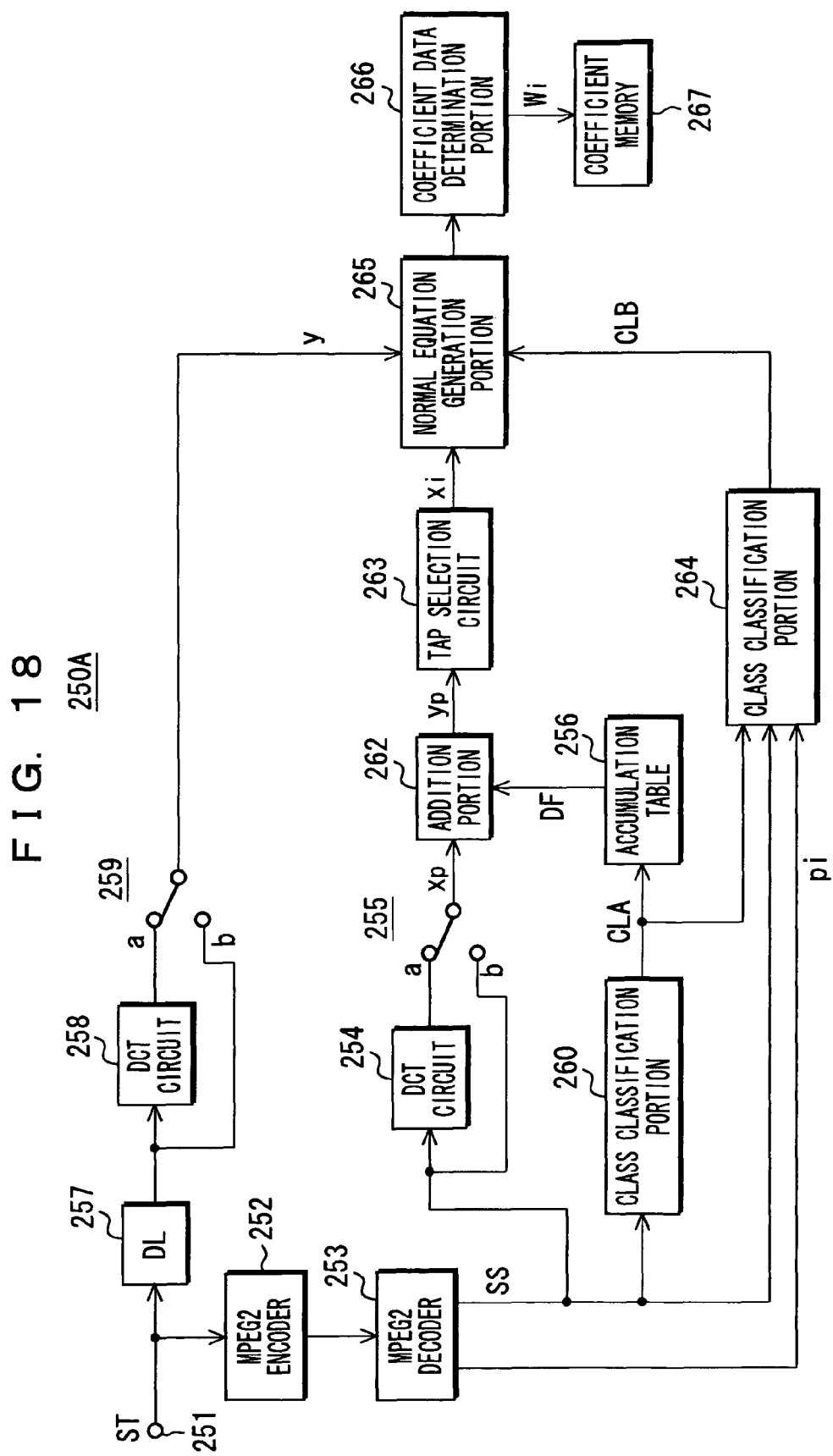
FIG. 18 is a block diagram for showing a configuration of a unit for generating coefficient data.

FIG. 18 shows a configuration of a unit 250A for generating coefficient data Wi to be stored in the coefficient memory 138 in the image-signal-processing portion 110A of FIG. 16.

This unit 250A for generating coefficient data has an input terminal 251 through which a teacher signal ST corresponding to the image signal Vb is input, an MPEG2 encoder 252 for encoding this teacher signal ST to obtain an MPEG2 stream, and an MEPG2 decoder 253 for decoding this MPEG2 stream to obtain a student signal SS that corresponds to the image signal Va. It is to be noted that the MPEG2 decoder 253 corresponds to the MPEG2 decoder 107 and the buffer memory 108 in the digital broadcast receiver 100A shown in FIG. 16.

Further, the unit 250A for generating coefficient data has a DCT circuit 254 for obtaining a DCT coefficient by performing DCT processing on the student signal SS output from the MPEG2 decoder 253 and a transfer switch 255 whose a-side fixed terminal is supplied with a DCT coefficient output from this DCT circuit 254 and whose b-side fixed terminal is supplied with the student signal SS output from the MPEG2 decoder 253.

This transfer switch 255 is connected to the b-side thereof if difference data DF stored in an accumulation table 256, which will be described later, is that of pixel data and to the a-side if it is that of a DCT coefficient obtained through DCT processing.

Further, the unit 250A for generating coefficient data has the accumulation table 256. The accumulation table 256 beforehand stores for each class the difference data DF as correction data for correcting an encoding noise (encoding distortion), similar to the accumulation table 131 in the image-signal-processing portion 110A of FIG. 16.

This accumulation table 256 is supplied with a class code CLA output from a class classification portion 260, which will be described later, as read address information. From this accumulation table 156, difference data DF that corresponds to the class code CLA is read and supplied to an addition portion 262, which will be described later.

The class classification portion 260 is used to detect a class to which pixel data of a target position in the teacher signal ST belongs. This class classification portion 260, detailed description of which is omitted though, is arranged in the same way as the class classification portion 130 in the image processing portion 110A shown in FIG. 16 in that it performs block-unit class classification based on the student signal SS to generate a class code CLA that indicates a class to which the pixel data of the target position in the teacher signal ST belongs.

Further, the unit 250A for generating coefficient data has a DCT circuit 258 for performing DCT processing on the teacher signal ST time-adjusted by a delay circuit 257 to obtain a DCT coefficient and a transfer switch 259 whose a-side fixed terminal is supplied with the DCT coefficient output from this DCT circuit 258 and whose b-side fixed terminal is supplied with the teacher signal ST time-adjusted by the delay circuit 257. This transfer switch 259 is connected to the b-side thereof if difference data DF stored in the accumulation table 256 is that of pixel data and to the a-side if it is that of a DCT coefficient obtained through DCT processing.

Further, the unit 250A for generating coefficient data has the addition portion 262 serving as correction means for adding the difference data DF read out of the accumulation table 256 to data (pixel data or DCT coefficient) $x_p$, which corresponds to a target position in the teacher signal ST, output from a movable terminal of the transfer switch 255, thus generating data $y_p$ (pixel data or DCT coefficient) of the target position in the teacher signal ST.

It is to be noted that items of data $x_p$ and $y_p$ are each block data corresponding to a DCT block, which is used as a unit in DCT processing. In the present embodiment, the number of items of data (pixel data or DCT coefficient) that constitute the data $y_p$ is equal to that of items of data (pixel data or DCT coefficient) that constitute the data $x_p$.

In this case, the number of the items of pixel data that constitute the teacher signal ST is equal to that of the items of pixel data that constitute the student signal SS. For example, if the data $x_p$ is comprised of 8×8 items of data, 8×8 items of data are generated in the addition portion 262 as the data $y_p$. In this case, the difference data DF supplied from the accumulation table 256 to the addition portion 262 is also comprised of 8×8 items of data.

Further, the unit 250A for generating coefficient data has a tap selection circuit 263, as data selection means, for taking out selectively and outputting, as data of a predictive tap, multiple items of data related to the target position in the teacher signal ST based on output data (pixel data or DCT coefficient) of the addition portion 262.

This tap selection circuit 263 is arranged in the same way as the tap selection circuit 137 in the image-signal-processing device 110A of FIG. 16. This tap selection circuit 263 selectively takes out multiple items of data positioned in a periphery of the target position in the teacher signal ST if difference data of pixel data is stored in the accumulation table 256 and the transfer switch 255 is connected to its b-side and used.

If difference data of a DCT coefficient is stored in the accumulation table 256 and the transfer switch 255 is connected to its a-side and used, on the other hand, the tap selection circuit 263 selectively takes out plural DCT coefficients that correspond to the periphery of the target position in the teacher signal ST. For example, as the plural DCT coefficients, DC coefficients are selected which are present in a DCT coefficient block that corresponds to block data containing pixel data of the target position in the teacher signal ST and four DCT coefficient blocks adjacent to this DCT coefficient block.

Further, the unit 250A for generating coefficient data has a class classification portion 264. This class classification portion 264, detailed description of which is omitted, is arranged in the same way as the class classification portion 139 in the image-signal-processing portion 110A shown in FIG. 16 in that it performs class classification in units of pixel data or DCT coefficient based on the student signal SS, pixel position mode information pi, and a class code CLA generated by the class classification portion 260, to generate a class code CLB that indicates a class to which pixel data of the target position in the teacher signal ST belongs.

Further, the unit 250A for generating coefficient data has a normal equation generation portion 265 for generating a normal equation (see the above-mentioned Equation (8)) for obtaining coefficient data Wi (i=1, . . . , n) for each class by using data (pixel data or DCT coefficient) y of each target position in the teacher signal ST, the data y being output from a movable terminal of the transfer switch 259, data xi of a predictive tap selectively taken out by the tap selection circuit 263 corresponding to this data y of each target position, and a class code CLB generated by the class classification portion 264 corresponding to pixel data of each target position.

In this case, although one item of data y and the n number of data xi of a predictive tap corresponding thereto are combined to generate one item of learning data, many items of learning data are generated for each class. Accordingly, a normal equation for obtaining the coefficient data Wi is generated for each class by the normal equation generation portion 265.

Further, the unit 250A for generating coefficient data has a coefficient data determination portion 266 which is supplied with data of a normal equation generated by the normal equation generation portion 265 and solves this normal equation to obtain coefficient data Wi of each class and a coefficient memory 267 for storing this obtained coefficient data Wi of each class.

The following will describe operations of the unit 250A for generating coefficient data shown in FIG. 18.

First, a case such that the difference data DF stored in the accumulation table 256 is that of pixel data will be described. In this case, the transfer switches 255 and 259 are each connected to the b-sides thereof.

A teacher signal ST that corresponds to the image signal Vb is supplied to the input terminal 251 and encoded by the MPEG2 encoder 252 where an MPEG2 stream is generated. This MPEG2 stream is supplied to the MPEG2 decoder 253. The MPEG2 decoder 253 decodes the MPEG2 stream to generate the student signal SS corresponding to the image signal Va.

In the class classification portion 260, based on the student signal SS, a class code CLA indicating a class to which pixel data of the target position in the teacher signal ST belongs is generated. This class code CLA is resulted from block-unit class classification. This class code CLA is supplied to the accumulation table 256 as read address information. From the accumulation table 256, based on this class code CLA, the difference data DF that corresponds to the target position in the teacher signal ST is read and supplied to the addition portion 262.

Further, of data of the student signal SS obtained by the MPEG2 decoder 253, the pixel data $x_p$ corresponding to the target position in the teacher signal ST is supplied via the b-side of the transfer switch 255 to the addition portion 262. In the addition portion 262, the difference data DF read out of the accumulation table 256 is added to this pixel data $x_p$, and corrected so that pixel data $y_p$ corresponding to the pixel data of the target position in the teacher signal ST is generated.

In the class classification portion 264, a class code CLB indicating a class to which pixel data of the target position in the teacher signal ST belongs, is generated based on the student signal SS, the pixel position mode information pi, and the class code CLA. This class code CLB is resulted from the pixel-data-unit class classification. Further, in the tap selection circuit 263, multiple items of pixel data positioned in a periphery of the target position in the teacher signal ST are selectively taken out as pixel data xi of a predictive tap based on the corrected pixel data $y_p$ output from the addition portion 262.

In the normal equation generation portion 265, a normal equation (see the above-mentioned Equation (8)) for obtaining coefficient data Wi (i=1, . . . , n) for each class is generated by using the pixel data y of each target position obtained from the teacher signal ST time-adjusted by the delay circuit 257, the pixel data xi of the predictive tap selectively taken out by the tap selection circuit 263 corresponding to the pixel data y of each target position, and a class code CLB generated by the class classification portion 264 corresponding to the pixel data y of each target position.

Then, this normal equation is solved in the coefficient data determination portion 266 where the coefficient data Wi of each class is obtained, and the coefficient data Wi is stored in the coefficient memory 267.

Next, a case such that difference data DF stored in the accumulation table 256 is that of a DCT coefficient obtained through DCT processing will be described. In this case, the transfer switches 255 and 259 are each connected to the a-sides thereof.

A teacher signal ST corresponding to the image signal Vb is supplied to the input terminal 251 and encoded by the MPEG2 encoder 252 where an MPEG2 stream is generate. This MPEG2 stream is supplied to the MPEG2 decoder 253. The MPEG2 decoder 253 decodes this MPEG2 stream to generate a student signal SS that corresponds to the image signal Va.

In the class classification portion 260, based on the student signal SS, a class code CLA indicating a class to which pixel data of a target position in the teacher signal ST belongs is generated. This class code CLA is resulted from the block-unit class classification. This class code CLA is supplied to the accumulation table 256 as read address information. From the accumulation table 256, based on this class code CLA, the difference data DF that corresponds to the target position in the teacher signal ST is read and supplied to the addition portion 262.

Further, of data of the student signal SS obtained by the MPEG2 decoder 253, pixel data corresponding to the target position in the teacher signal ST undergoes DCT processing at the DCT circuit 254, a DCT coefficient $x_p$ obtained as a result of which is supplied via the a-side of the transfer switch 255 to the addition portion 262. In the addition portion 262, the difference data DF read out of the accumulation table 256 is added to this DCT coefficient $x_p$ and corrected, so that a DCT coefficient $y_p$ that corresponds to the pixel data of the target position in the teacher signal ST is generated.

In the class classification portion 264, a class code CLB that indicates a class to which the pixel data of the target position in the teacher signal ST belongs, is generated based on the student signal SS, the pixel position mode information pi, and the class code CLA. This class code CLB is resulted from the pixel-data-unit class classification.

Further, in the tap selection circuit 263, plural DCT coefficients positioned in a periphery of the target position in the teacher signal ST are selectively taken out as a DCT coefficient xi of a predictive tap based on the corrected DCT coefficient $y_p$ output from the addition portion 262.

Further, DCT processing is performed in the DCT circuit 258 on pixel data of the target position in the teacher signal ST time-adjusted by the delay circuit 257. In the normal equation generation portion 265, a normal equation (see the above-mentioned Equation (8)) for obtaining coefficient data Wi (i=1, ..., n) is generated for each class by using a DCT coefficient y that corresponds to the pixel data of each target position obtained by this DCT circuit 258, a DCT coefficient xi of a predictive tap selectively taken out by the tap selection circuit 263 corresponding to each of the DCT coefficients y, and a class code CLB generated by the class classification portion 264 corresponding to the pixel data of each target position.

Then, this normal equation is solved in the coefficient data determination portion 266 where the coefficient data Wi of each class is obtained, and the coefficient data Wi is stored in the coefficient memory 267.

In such a manner, in the unit 250A for generating coefficient data shown in FIG. 18, it is possible to generate the coefficient data Wi for each class to be stored in the coefficient memory 138 in the image-signal-processing portion 110A of FIG. 16.

This coefficient data Wi has been generated by adding, at the addition portion 262, difference data DF to the data (pixel data or DCT coefficient) $x_p$ related to the student signal SS and correcting the data, and selectively taking out the data xi as a predictive tap based on this corrected data (pixel data or DCT coefficient) $y_p$ and using the data xi. Therefore, in the image-signal-processing portion 110A shown in FIG. 16, in the image signal Vb obtained from the image signal Va through an estimate equation by use of this coefficient data Wi, an encoding noise yet remained by correction by means of addition of the difference data DF is well reduced.

It is to be noted that the processing in the image-signal-processing portion 110A of FIG. 16 can also be realized in software by, for example, the apparatus 300 for processing image signal of FIG. 8.

Figure 19:
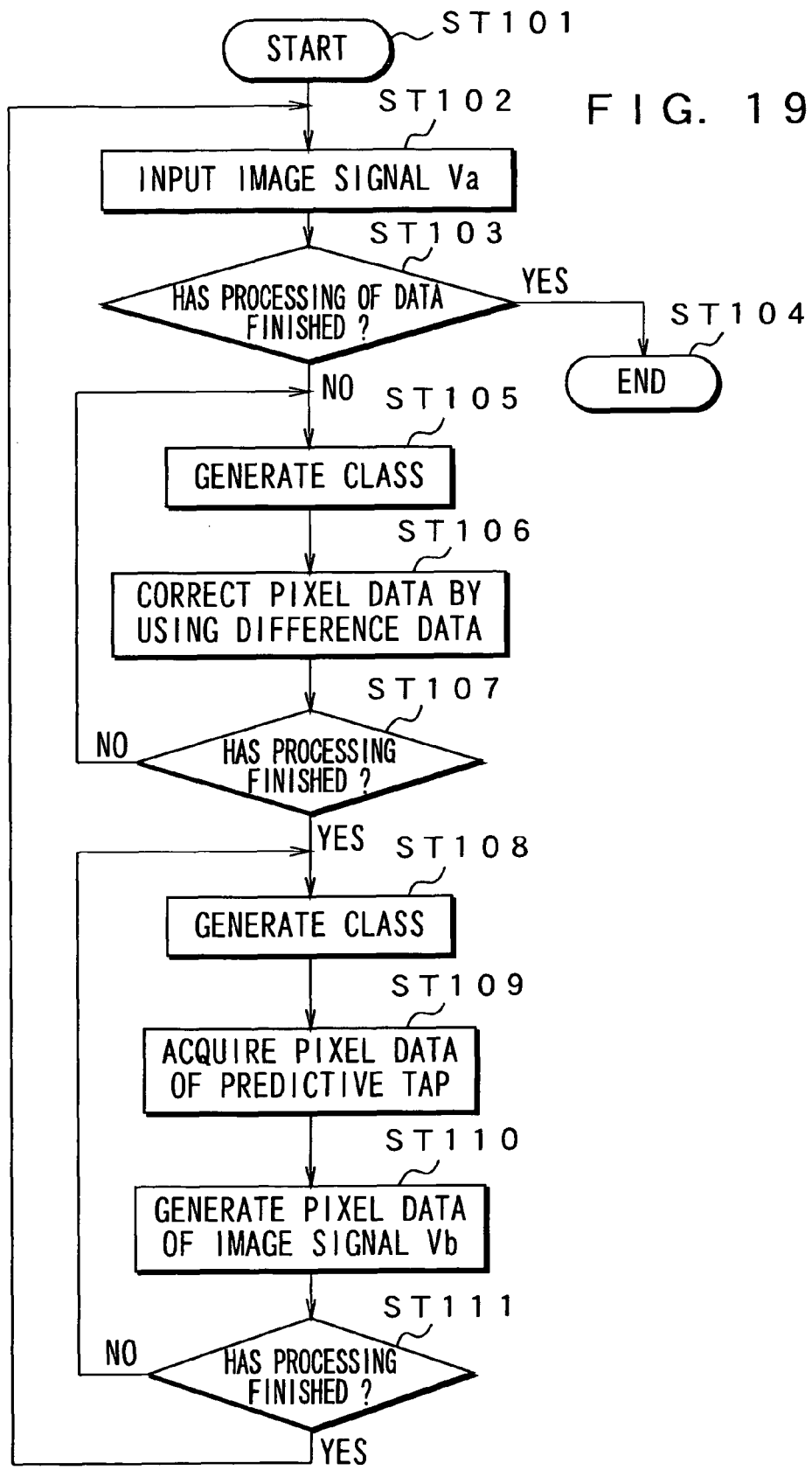
FIG. 19 is a flowchart for showing image signal processing.

The following will describe a processing procedure for obtaining the image signal Vb from the image signal Va with reference to a flowchart of FIG. 19.

First, at step ST101 the process starts processing, and at step ST102 it inputs through, for example, the input terminal 314 one frame or one field of the image signal Va into the apparatus. In such a manner, items of pixel data that constitutes the image signal Va input through the input terminal 314 are stored in the RAM303 temporarily. It is to be noted that if this image signal Va has recorded in the hard disk drive 305 in the device beforehand, this image signal Va is read out of this drive 305 to temporarily store the items of pixel data that constitutes this image signal Va in the RAM303.

At step ST103, it decides whether processing of all the frames or fields of the image signal Va has finished. If the processing has finished, the process ends the processing at step ST104. Otherwise, it goes to step ST105.

At this step ST105, the process performs block-unit class classification based on the image signal Va input at step ST102, to generate a class code CIA that indicates a class to which pixel data of a target position in the image signal Vb belongs. At step ST106, based on the class code CLA generated at step ST105, the process reads difference data DF that corresponds to that class code CIA from the ROM302 etc. and adds the difference data DF to pixel data $x_p$ that corresponds to the target position in the image signal Vb among multiple items of pixel data that constitute the image signal Va and corrects it, to generate pixel data $y_p$ that corresponds to pixel data of the target position in the image signal Vb.

Next, at step ST107, it decides whether the processing to obtain the pixel data $y_p$ is finished in all regions of the pixel data in the image signal Va input at step ST102. If the processing has finished, the process goes to step ST108. Otherwise, it returns to step ST105 to shift to processing of the next target position.

At step ST108, the process performs pixel-data-unit class classification based on the image signal Va input at step ST102, the pixel position mode information pi input as paired with pixel data of this image signal Va, and the class code CIA generated at the above-mentioned step ST105, to generate a class code CLB that indicates a class to which pixel data of the target position in the image signal Vb belongs.

Next, at step ST109, the process acquires multiple items of pixel data (pixel data of a predictive tap) positioned in a periphery of the target position in the image signal Vb based on the pixel data $y_p$ corrected at step ST106. At step ST110, the process reads out of the ROM302 etc. coefficient data Wi that corresponds to the class code CLB generated at step ST108 based on that class code CLB and uses this coefficient data Wi and the pixel data xi of the predictive tap to generate pixel data y of the target position in the image signal Vb by using an estimate equation (see Equation (1)).

Next, at step ST111, the process decides whether the processing to obtain pixel data of the image signal Vb has finished in all regions of the pixel data of the image signal Va input at step ST102. If the processing has not yet finished, the process returns to step ST108 to shift to processing of the next target position. If it has finished, on the other hand, the process returns to step ST102 to shift to processing of inputting the next one frame or one field of the image signal Va.

In this case, if the difference data DF stored in the ROM302 etc. is that of a DCT coefficient which is obtained by DCT processing, the process performs DCT processing on the image signal Va input at step DT102, to provide data $x_p$ to which the difference data DF is to be added, as a DCT coefficient. In this case, at step ST106, as a result of the addition, a DCT coefficient $y_p$ is obtained.

Further, at step ST109, the process acquires plural DCT coefficients that corresponds to the periphery of the target position in the image signal Vb based on the DCT coefficient $y_p$ corrected at step ST106. For example, as the plural DCT coefficients, the process acquires DC coefficients which are present in a DCT coefficient block that corresponds to block data containing pixel data of the target position in the image signal Vb and four DCT coefficient blocks adjacent to this DCT coefficient block.

Further, since the data y obtained by an estimate equation at step ST110 is a DCT coefficient, the process further performs inverse DCT processing thereon to generate pixel data of the target position in the image signal Vb.

In such a manner, by performing the processing along the flowchart shown in FIG. 19, it is possible to process pixel data of the input image signal Va, thereby obtaining pixel data of the image signal Vb. As described above, the image signal Vb thus processed and obtained is output to the output terminal 315 or supplied to the display portion 311 where an image due to the signal may be displayed or, further, supplied to the hard disk drive 305 where it is recorded on a hard disk.

Further, although a processing unit is not shown, processing in the unit 250A for generating coefficient data of FIG. 18 can also be realized in software.

Figure 20:
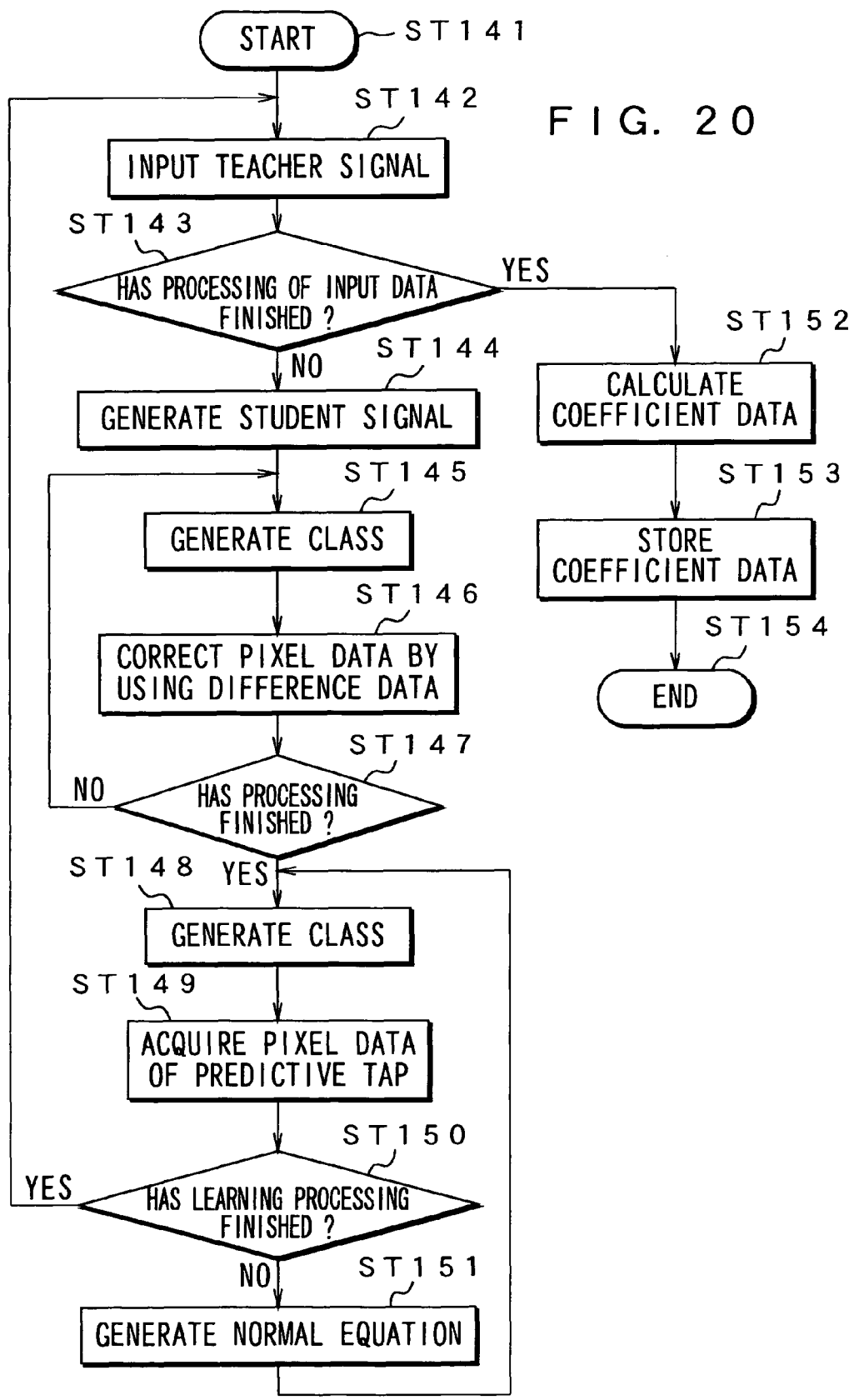
FIG. 20 is a flowchart for showing coefficient data generation processing.

The following will describe a processing procedure for generating coefficient data with reference to a flowchart of FIG. 20.

First, at step ST141, the process starts processing, and at step ST142, it inputs one frame or one field of the teacher signal. At step ST143, it decides whether processing of all the frames or fields of the teacher signal has finished. If the processing has not yet finished, the process goes to step ST144 where a student signal is generated from the teacher signal input at step ST142.

At step ST145, the process performs block-unit class classification based on the student signal SS generated at step ST144, to generate a class code CLA that indicates a class to which pixel data of a target position in the teacher signal ST belongs.

Next, at step ST146, based on the class code CLA generated at step ST145, the process reads out of the ROM etc. difference data DF that corresponds to that class code CLA and adds the difference data DF to pixel data $x_p$ that corresponds to the target position in the teacher signal ST among multiple items of pixel data that constitute the student signal SS and corrects it, to generate pixel data $y_p$ that corresponds to pixel data of the target position in the teacher signal ST.

At step ST147, it decides whether the processing to obtain the pixel data $y_p$ has finished in all regions of the pixel data of the student signal SS generated at step ST144. If the processing has finished, the process goes to step ST148. Otherwise, it returns to step ST145 to shift to processing of the next target position.

At step ST148, the process performs pixel-data-unit class classification thereon based on the student signal SS generated at step ST144, pixel position mode information pi obtained so as to correspond to pixel data of the student signal SS that corresponds to pixel data of the target position in the teacher signal, although not described above, and the class code CLA generated at the above-mentioned step ST145, to generate a class code CLB that indicates a class to which pixel data of the target position in the teacher signal ST belongs.

Next, at step ST149, the process acquires multiple items of pixel data (pixel data of a predictive tap) xi positioned in a periphery of the target position in the teacher signal ST based on the pixel data $y_p$ corrected at step ST146. At step ST150, the process decides whether learning processing has finished in all regions of the one frame or field of the pixel data of the teacher signal input at step ST142. If learning processing has finished, the process returns to step ST142 to input the next one frame or field of the teacher signal, thus repeating the same processing as described above. Otherwise, the process goes to step ST151.

At this step ST151, the process generates a normal equation (see Equation (8)) for obtaining the coefficient data Wi for each class by using the class code CLB generated at step ST148, the multiple items of pixel data xi acquired at step ST149, and the pixel data y of the target position in the teacher signal ST and then returns to step ST148 to shift to the processing of the next target position.

If the processing has finished at the above-mentioned step ST143, the process, at above-mentioned step ST152, solves the normal equation generated at step ST151 by a sweeping-out method etc., to calculate coefficient data of each class. At step ST153, the process saves the coefficient data of each class in the memory and ends the processing at step ST154.

In such a manner, by performing the processing along the flowchart shown in FIG. 20, it is possible to obtain coefficient data Wi of each class by using the same method as that for the unit 250A for generating coefficient data shown in FIG. 18.

If, in this case, the difference data DF stored in the ROM etc. is that of a DCT coefficient which is obtained through DCT processing, the process performs DCT processing on the student signal SS generated at step ST144, to provide data $x_p$ to which the difference data DF is to be added, as a DCT coefficient. Accordingly, the DCT coefficient $y_p$ is obtained as a result of the addition at step ST146.

Further, at step ST149, the process acquires plural DCT coefficients that correspond to the periphery of the target position in the teacher signal ST based on the DCT coefficient $y_p$ corrected at step ST146. For example, as the plural DCT coefficients, the process acquires DC coefficients which are present in a DCT coefficient block that corresponds to block data containing pixel data of the target position in the teacher signal ST and four DCT coefficient blocks adjacent to this DCT coefficient block.

Further, in this case, when generating a normal equation at step ST151, the process obtains a DCT coefficient y that constitute learning data with it being pared with plural DCT coefficients xi acquired at step ST149 by performing DCT processing on the pixel data of the target position in the teacher signal ST.

The following will describe a third embodiment of the present invention.

Figure 21:
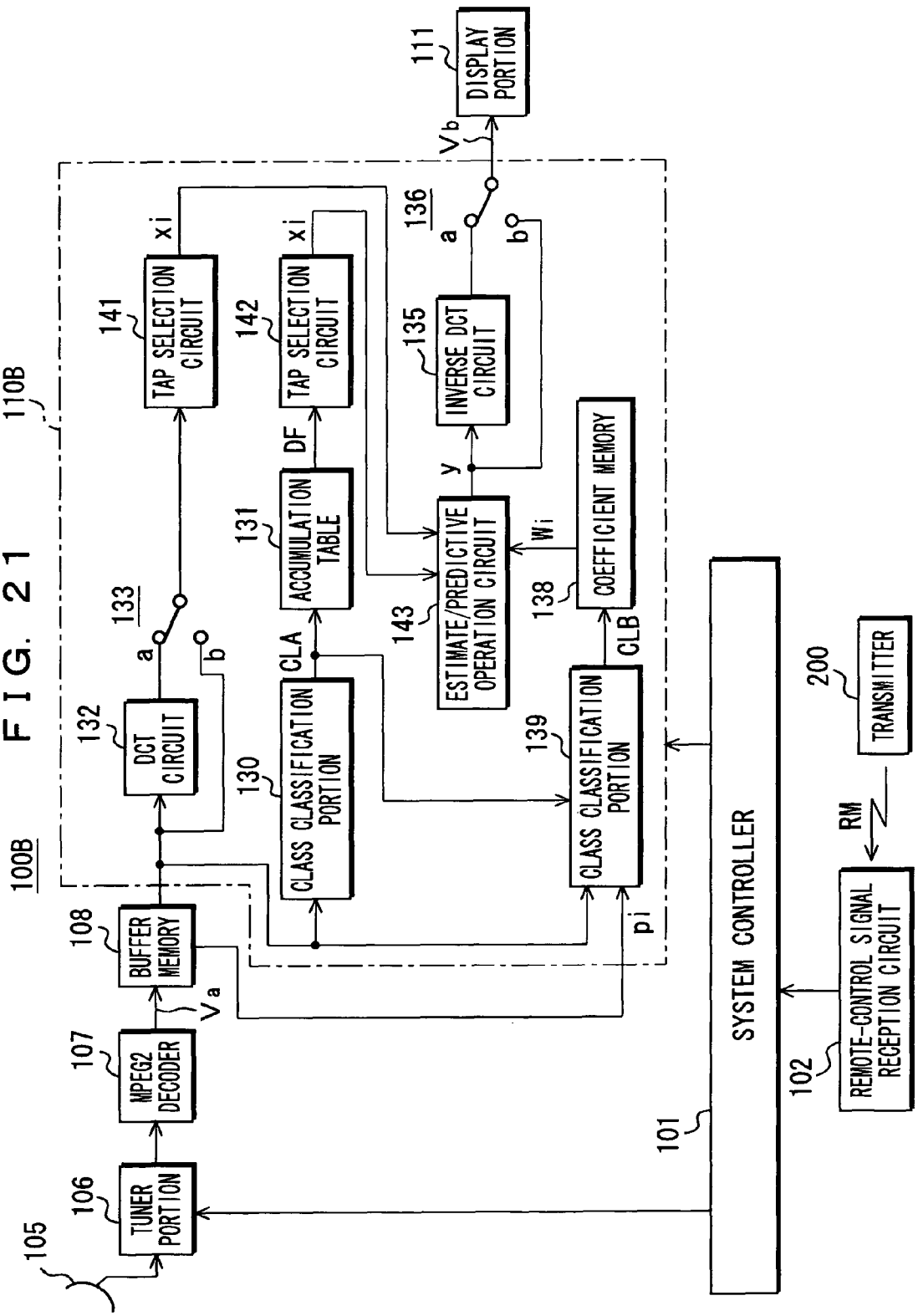
FIG. 21 is a block diagram for showing a configuration of a digital broadcast receiver according to a third embodiment.

FIG. 21 shows a configuration of a digital broadcast receiver 100B according to the third embodiment. In this FIG. 21, components corresponding to those of FIG. 16 are indicated by the same symbols.

The digital broadcast receiver 100B has an image-signal-processing portion 110B by which the image-signal-processing portion 110A of the digital broadcast receiver 100A shown in FIG. 16 is replaced and operates in the same way as the digital broadcast receiver 100A.

The following will describe details of the image-signal-processing portion 110B. In this image-signal-processing portion 110B, components corresponding to those of the image-signal-processing portion 110A shown in FIG. 16 are indicated by the same symbols and their detailed description will be omitted.

This image-signal-processing portion 110B has a tap selection circuit 141 serving as data selection means for taking out selectively and outputting, as item(s) of data xi (i=1–m) of a predictive tap, multiple items of data corresponding to a target position in an image signal Vb based on data (pixel data or DCT coefficient), which correspond to the target position in the image signal Vb, output from a movable terminal of a transfer switch 133.

The tap selection circuit 141 selectively takes out multiple items of pixel data positioned in a periphery of the target position in the image signal Vb if difference data of pixel data is stored in an accumulation table 131 and the transfer switch 133 is connected to its b-side and used.

If difference data of a DCT coefficient is stored in the accumulation table 131 and the transfer switch 133 is connected to its a-side and used, on the other hand, the tap selection circuit 141 selectively takes out plural DCT coefficients corresponding to the periphery of the target position in the image signal Vb. For example, as the plural DCT coefficients, DC coefficients are selected which are present in a DCT coefficient block that corresponds to block data containing pixel data of the target position in the image signal Vb and four DCT coefficient blocks adjacent to this DCT coefficient block.

Further, the image-signal-processing portion 110B has a tap selection circuit 142 serving as data selection means for taking out selectively and outputting, as item(s) of data xi (i=m+1, . . . , n) of a predictive tap, multiple items of difference data corresponding to the multiple items of data selected by the above-mentioned tap selection circuit 141, based on difference data DF read out of the accumulation table 131 corresponding to a class code CLA output from a class classification portion 130.

Further, the image-signal-processing portion 110B has an estimate/predictive operation circuit 143 for calculating pixel data y related to the target position in the image signal Vb to be generated by using an estimate equation of Equation (1) from the items of data xi of predictive taps taken out selectively by the tap selection circuits 141 and 142 and coefficient data Wi read out of the coefficient memory 138 corresponding to a class code CLB output from a class classification portion 139.

The estimate/predictive operation circuit 143 generates pixel data of the target position in the image signal Vb if multiple items of pixel data positioned in a periphery of the target position in the image signal Vb are selectively taken out in the tap selection circuit 141. If the plural DCT coefficients corresponding to the periphery of the target position in the image signal Vb are selectively taken out, on the other hand, the estimate/predictive operation circuit 143 generates a DCT coefficient corresponding to pixel data of the target position in the image signal Vb.

The other components of the image-signal-processing portion 110B have the same configurations as those of the image-signal-processing portion 110A shown in FIG. 16.

The following will describe operations of this image-signal-processing portion 110B.

First, a case such that difference data DF stored in the accumulation table 131 is that of pixel data will be described. In this case, the transfer switches 133 and 136 are each connected to the b-sides thereof.

The tap selection circuit 141 selectively takes out the multiple items of pixel data positioned in the periphery of the target position in the image signal Vb as item(s) of data xi (i=1, ..., m) of the predictive tap, based on an image signal Va stored in a buffer memory 108.

In the class classification portion 130, based on the image signal Va, a class code CLA indicating a class to which pixel data of the target position in the image signal Vb belongs is generated. This class code CLA is resulted from the block-unit class classification. This class code CLA is supplied to the accumulation table 131 as read address information. From the accumulation table 131, based on this class code CLA, difference data DF corresponding to the target position in the image signal Vb is read.

In the tap selection circuit 142, based on the difference data DF read out of the accumulation table 131, multiple items of difference data that correspond to the multiple items of pixel data selected by the above-mentioned tap selection circuit 141 are selectively taken out as item(s) of data xi (i= m+1, ..., n) of a predictive tap.

The class classification portion 139 generates a class code CLB indicating a class to which pixel data of the target position in the image signal Vb belongs, based on the image signal Va, pixel position mode information pi, and the class code CLA. This class code CLB is resulted from the pixel-data-unit class classification. This class code CLB is supplied to the coefficient memory 138 as read address information. From the coefficient memory 138, coefficient data Wi that corresponds to the class code CLB is read and supplied to the estimate/predictive operation circuit 143.

In the estimate/predictive operation circuit 143, the pixel data y of the target position in the image signal Vb to be generated is obtained based on the above-mentioned Equation (1) by using items of data xi of predictive taps selectively taken out by the tap selection circuits 141 and 142 and the coefficient data Wi read out of the coefficient memory 138.

This pixel data y is output via the b-side of the transfer switch 136 as an output signal of the image-signal-processing portion 110B. That is, this pixel data y constitutes the image signal Vb.

Next, a case such that difference data DF stored in the accumulation table 131 is that of a DCT coefficient obtained through DCT processing will be described. In this case, the transfer switches 133 and 136 are each connected to the a-sides thereof.

The tap selection circuit 141 selectively takes out the plural DCT coefficients corresponding to the periphery of the target position in the image signal Vb as item(s) of data xi (i=1, ..., m) of a predictive tap, based on a DCT coefficient, which is received from the DCT circuit 132 and corresponds to pixel data of the target position in the image signal Vb, obtained by performing DCT processing on the multiple items of pixel data of the image signal Va.

In the class classification portion 130, based on the image signal Va, a class code CLA indicating a class to which pixel data of the target position in the image signal Vb belongs is generated. This class code CLA is resulted from the block-unit class classification. This class code CIA is supplied to the accumulation table 131 as read address information. From the accumulation table 131, based on this class code CLA, the difference data DF corresponding to the target position in the image signal Vb is read.

In the tap selection circuit 142, the multiple items of difference data that correspond to the plural DCT coefficients selected by the above-mentioned tap selection circuit 141 are selectively taken out as item(s) of data xi (i=m+1, ..., n) of a predictive tap, based on the difference data DF read out of the accumulation table 131.

In the class classification portion 139, the class code CLB indicating a class to which the pixel data of the target position in the image signal Vb belongs, is generated based on the image signal Va, the pixel position mode information pi, and the class code CIA. This class code CLB is resulted from the pixel-data-unit (DCT-coefficient-unit) class classification. This class code CLB is supplied to the coefficient memory 138 as read address information. From the coefficient memory 138, the coefficient data Wi corresponding to the class code CLB is read and supplied to the estimate/predictive operation circuit 143.

In the estimate/predictive operation circuit 143, the DCT coefficient y corresponding to the pixel data of the target position in the image signal Vb to be generated is obtained based on the above-mentioned estimate equation of Equation (1) by using the items of data xi of predictive taps selectively taken out by the tap selection circuits 141 and 142 and the coefficient data Wi read out of the coefficient memory 138.

This DCT coefficient y is then supplied to an inverse DCT circuit 135. This inverse DCT circuit 135 performs inverse DCT processing on the DCT coefficient y to obtain pixel data. In such a manner, the pixel data output from the inverse DCT circuit 135 is output via the a-side of the transfer switch 136 as an output signal of the image-signal-processing portion 110B. That is, this pixel data constitutes the image signal Vb.

In such a manner, in the image-signal-processing portion 110B, when the image signal Va is converted to obtain the image signal Vb, item(s) of data xi of the predictive tap are selected on the basis of the data (pixel data or DCT coefficient) related to the image signal Va and based on the difference data (correction data) DF that corresponds to a first class to which pixel data of a target position in the image signal Vb belongs, item(s) of data xi of the predictive tap are selected and also, using these items of data xi of the predictive tap and the coefficient data Wi that corresponds to a second class to which pixel data of the target position in the image signal Vb belongs, the data (pixel data or DCT coefficient) y of the target position in the image signal Vb is obtained based on the estimate equation.

This operation is basically equivalent to that for, as in the image-signal-processing portion 110A shown in FIG. 16, correcting data (pixel data or DCT coefficient) $x_p$ related to the image signal Va to obtain the data (pixel data or DCT coefficient) $y_p$ related to the image signal Vb and using item(s) of data xi of the predictive tap selected on the basis of this corrected data (pixel data or DCT coefficient) and the coefficient data Wi, the data (pixel data or DCT coefficient) y of the target position in the image signal Vb is obtained based on an estimate equation, thus enabling a signal having its well reduced encoding noise as the image signal Vb to be obtained.

Figure 22:
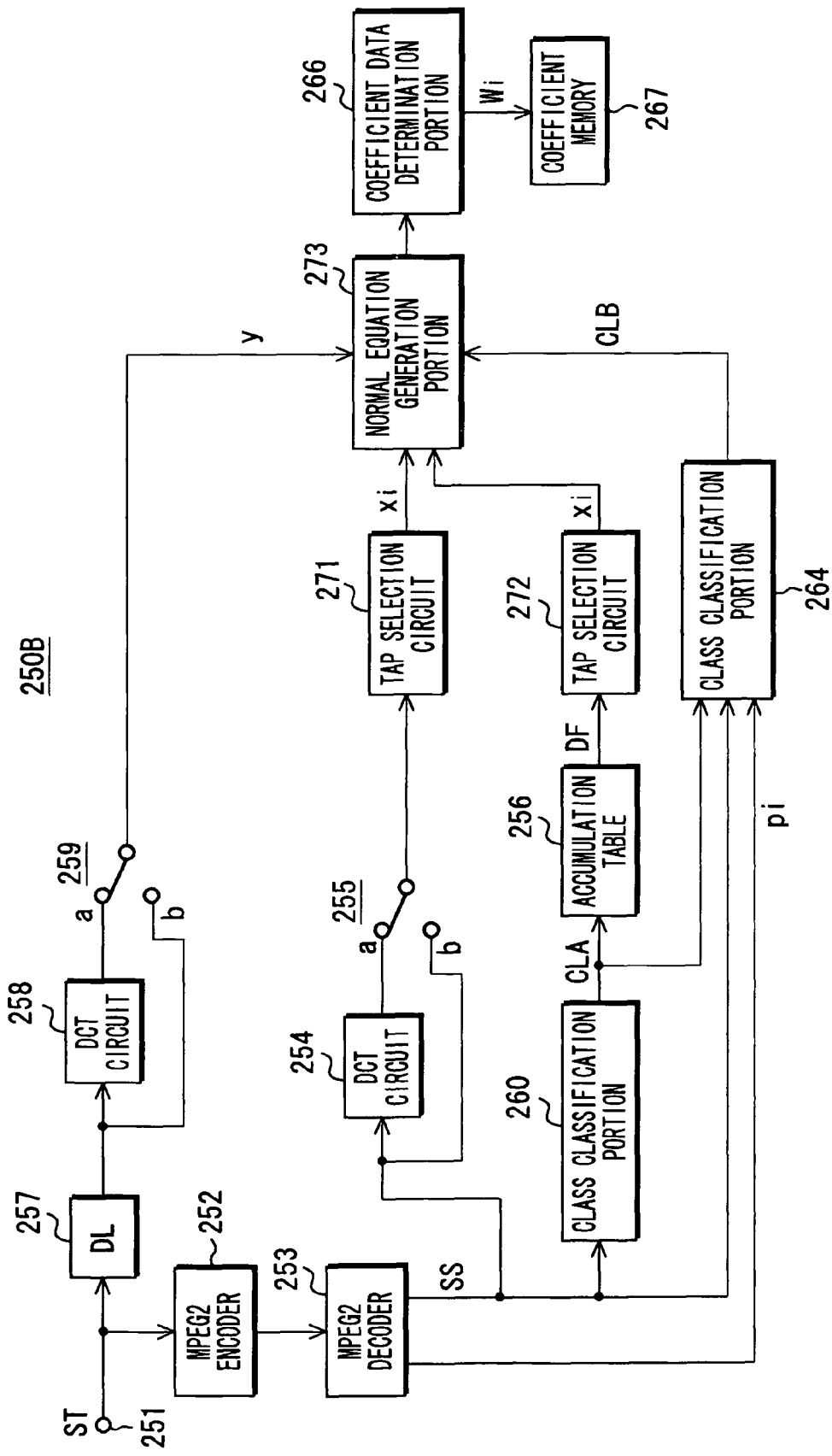
FIG. 22 is a block diagram for showing a configuration of another unit for generating coefficient data.

The following will describe a unit 250B for generating coefficient data Wi to be stored in the coefficient memory 138 in the image-signal-processing portion 110B shown in FIG. 21. FIG. 22 shows a configuration of the unit 250B for generating coefficient data. In FIG. 22, components that correspond to those of FIG. 18 are indicated by the same symbols.

The unit 250B for generating coefficient data has a tap selection circuit 271 serving as data selection means for taking out selectively and outputting, as item(s) of data xi (i=1, . . . , m) of a predictive tap, multiple items of data related to a target position in a teacher signal ST based on data (pixel data or DCT coefficient), which is output from a movable terminal of a transfer switch 255, corresponding to the target position in the teacher signal ST.

This tap selection circuit 271 has the same configuration as that of the tap selection 141 in the image-signal-processing device 110B of FIG. 21. The tap selection circuit 271 selectively takes out multiple items of pixel data positioned in a periphery of the target position in the teacher signal ST if difference data of pixel data is stored in an accumulation table 256 and the transfer switches 255 and 259 are each connected to b-sides thereof and used.

If difference data of a DCT coefficient is stored in the accumulation table 256 and the transfer switches 255 and 259 are each connected to a-sides thereof and used, on the other hand, the tap selection circuit 271 selectively takes out plural DCT coefficients corresponding to the periphery of the target position in the teacher signal ST. For example, as the plural DCT coefficients, DC coefficients are selected which are present in a DCT coefficient block that corresponds to block data containing pixel data of the target position in the teacher signal ST and four DCT coefficient blocks adjacent to this DCT coefficient block.

Further, the unit 250B for generating coefficient data has a tap selection circuit 272 serving as data selection means for taking out selectively and outputting, as item(s) of data xi (i=m+1, . . . , n) of a predictive tap, multiple items of difference data that correspond to the multiple items of data selected by the above-mentioned tap selection circuit 271, based on difference data DF read out of the accumulation table 256 corresponding to a class code CLA output from a class classification portion 260. This tap selection circuit 272 has the same configuration as that of the tap selection circuit 142 in the image-signal-processing portion 110B of FIG. 21.

Further, the unit 250B for generating coefficient data has a normal equation generation portion 273 for generating a normal equation (see the above-mentioned Equation (8)) for obtaining item(s) of coefficient data Wi (i=1, . . . , n) for each class by using the data (pixel data or DCT coefficient) y, which is output from a movable terminal of the transfer switch 259, of each target position in the teacher signal ST, the items of data xi of predictive taps selectively taken out by the tap selection circuits 271 and 272, and a class code CLB output from a class classification portion 264.

In this case, although one item of data y and the n number of items of data xi of a predictive tap corresponding thereto are combined to generate one item of learning data, many items of the learning data are generated for each class. Accordingly, a normal equation for obtaining the coefficient data Wi is generated for each class in the normal equation generation portion 273.

The following will describe operations of the unit 250B for generating coefficient data shown in FIG. 22.

First, a case such that difference data DF stored in the accumulation table 256 is that of pixel data will be described. In this case, the transfer switches 255 and 259 are each connected to the b-sides thereof.

A teacher signal ST that corresponds to the image signal Vb is supplied to the input terminal 251 and encoded by the MPEG2 encoder 252 where an MPEG2 stream is generated. This MPEG2 stream is supplied to the MPEG2 decoder 253. The MPEG2 decoder 253 decodes the MPEG2 stream to generate the student signal SS corresponding to the image signal Va.

In the tap selection circuit 271, based on the student signal SS output from the MPEG2 decoder 253, the multiple items of pixel data positioned in the periphery of the target position in the teacher signal ST are selectively taken out as item(s) of data xi (i=1, . . . , m) of the predictive tap.

In the class classification portion 260, based on the student signal SS, a class code CLA indicating a class to which pixel data of the target position in the teacher signal ST belongs is generated. This class code CLA is resulted from the block-unit class classification. This class code CLA is supplied to the accumulation table 256 as read address information. From the accumulation table 256, based on this class code CLA, the difference data DF that corresponds to the target position in the teacher signal ST is read.

In the tap selection circuit 272, based on the difference data DF read out of the accumulation table 256, multiple items of difference data that correspond to the multiple items of pixel data selected by the above-mentioned tap selection circuit 271 are selectively taken out as item(s) of data xi (i=m+1, . . . , n) of the predictive tap.

In the class classification portion 264, a class code CLB indicating a class to which pixel data of the target position in the teacher signal ST belongs, is generated based on the student signal SS, the pixel position mode information pi, and the class code CIA.

In the normal equation generation portion 273, generates a normal equation (see Equation (8)) for obtaining coefficient data Wi (i=1, . . . , n) for each class by using the pixel data y of each target position obtained from the teacher signal ST time-adjusted by the delay circuit 257, items of pixel data xi of the predictive taps selectively taken out by the tap selection circuits 271 and 272 corresponding to this pixel data y of each target position, respectively, and the class code CLB generated by the class classification portion 264 corresponding to the pixel data y of each target position.

Then, this normal equation is solved in a coefficient data determination portion 266 where the coefficient data Wi of each class is obtained, and the coefficient data Wi is stored in the coefficient memory 267.

Next, a case such that difference data DF stored in the accumulation table 256 is that of a DCT coefficient will be described. In this case, the transfer switches 255 and 259 are each connected to the a-sides thereof.

A teacher signal ST that corresponds to the image signal Vb is supplied to the input terminal 251 and encoded by the MPEG2 encoder 252 where an MPEG2 stream is generate. This MPEG2 stream is supplied to the MPEG2 decoder 253. The MPEG2 decoder 253 decodes this MPEG2 stream to generate a student signal SS that corresponds to the image signal Va.

In the tap selection circuit 271, the plural DCT coefficients positioned in the periphery of the target position in the teacher signal ST are selectively takes out as item(s) of data xi (i=1, ..., m) of the predictive tap based on a DCT coefficient, which is obtained from the DCT circuit 254 and corresponds to the pixel data of the target position in the teacher signal ST, obtained by performing DCT processing on the multiple items of pixel data of the student signal SS.

In the class classification portion 260, a class code CLA indicating a class to which pixel data of the target position in the teacher signal ST belongs is generated based on the student signal SS. This class code CLA is resulted from the block-unit class classification. This class code CIA is supplied to the accumulation table 256 as read address information. From the accumulation table 256, based on this class code CLA, the difference data DF that corresponds to the target position in the teacher signal ST is read.

In the tap selection circuit 272, based on the difference data DF read out of the accumulation table 256, multiple items of difference data that correspond to the plural DCT coefficients selected by the above-mentioned tap selection circuit 271 are selectively taken out as item(s) of data xi (i=m+1, ..., n) of a predictive tap.

In the class classification portion 264, a class code CLB indicating a class to which pixel data of the target position in the teacher signal ST belongs is generated based on the student signal SS, the pixel position mode information pi, and the class code CLA. This class code CLB is resulted from the pixel-data-unit class classification.

On the pixel data in the teacher signal ST time-adjusted by the delay circuit 257, DCT processing is performed in the DCT circuit 258. In the normal equation generation portion 273, is generates a normal equation (see Equation (8)) for obtaining the coefficient data Wi (i=1, ..., n) for each class by using the DCT coefficient y, which is obtained by this DCT circuit 258, corresponding to pixel data of each target position, items of pixel data xi of the predictive taps selectively taken out by the tap selection circuits 271 and 272 corresponding to each of the DCT coefficients y, and a class code CLB generated by the class classification portion 264 corresponding to the pixel data of each target position.

Then, this normal equation is solved in the coefficient data determination portion 266 where coefficient data Wi of each class is obtained, and the coefficient data Wi is stored in the coefficient memory 267.

In such a manner, in the unit 250B for generating coefficient data shown in FIG. 22, it is possible to generate the coefficient data Wi of each class to be stored in the coefficient memory 138 in the image-signal-processing portion 110B of FIG. 21.

This coefficient data Wi has been generated by taking out selectively and using the items of data xi serving as a predictive tap based on the data (pixel data or DCT coefficient) related to the student signal SS and the difference data (correction data). Therefore, in the image-signal-processing portion 110B shown in FIG. 21, the image signal Vb obtained from the image signal Va through an estimate equation by use of this coefficient data Wi has a well reduced encoding noise.

It is to be noted that the processing in the image-signal-processing portion 110B shown in FIG. 21 can also be realized in software by, for example, the apparatus 300 for processing image signal shown in FIG. 8.

Figure 23:
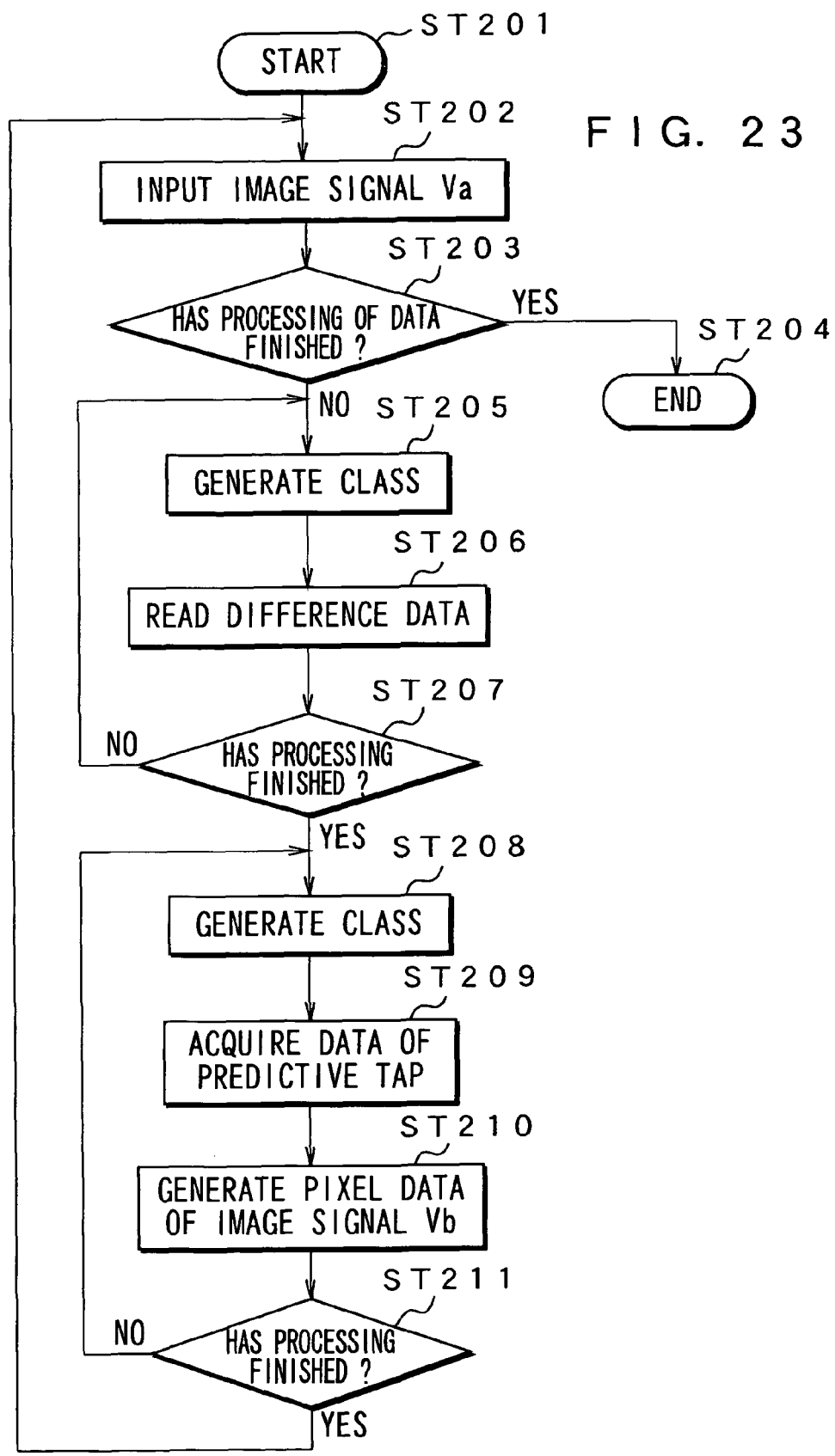
FIG. 23 is a flowchart for showing image signal processing.

The following will describe a processing procedure for obtaining the image signal Vb from the image signal Va with reference to a flowchart of FIG. 23.

First, at step ST201, the process starts processing, and at step ST202, it inputs from, for example, the input terminal 314 one frame or one field of the image signal Va into the apparatus. In such a manner, pixel data that constitutes the image signal Va input from the input terminal 314 is stored in the RAM303 temporarily. It is to be noted that if this image signal Va is recorded in the hard disk drive 305 in the apparatus beforehand, this image signal Va is read out of this drive 305 so that the pixel data that constitutes this image signal Va is temporarily stored in the RAM303.

At step ST203, it decides whether processing of all the frames or fields of the image signal Va has finished. If the processing has finished, the process ends the processing at step ST204. Otherwise, it goes to step ST205.

Next, at this step ST205, the process performs block-unit class classification to generate a class code CLA that indicates a class to which pixel data of a target position in the image signal Vb belongs. At step ST206, based on the class code CLA generated at step ST205, the process reads difference data DF corresponding to that class code CLA out of the ROM302 etc. and stores it in the RAM303 temporarily.

Next, at step ST207, it decides whether the processing to read the difference data has finished in all regions of the pixel data of the image signal Va input at step ST202. If finished, the process goes to step ST208. Otherwise, it returns to step ST205 to shift to processing of the next target position.

At step ST208, the process performs pixel-data-unit class classification based on the image signal Va input at step ST202, pixel position mode information pi input as paired with the pixel data of this image signal Va, and the class code CLA generated at the above-mentioned step ST205, to generate a class code CLB that indicates a class to which pixel data of the target position in the image signal Vb belongs.

At step ST209, the process acquires multiple items of pixel data positioned in a periphery of the target position in the image signal Vb as item(s) of data xi (i=1, ..., m) based on the image signal Va input at step ST202 and also acquires multiple items of difference data that corresponds to the above-mentioned multiple items of pixel data as item(s) of data xi (i=m+1, ..., n) of the predictive tap based on the difference data DF read out at step ST206.

Next, at step ST210, based on that class code CLB generated at step ST208, the process reads out of the ROM302 etc. the coefficient data Wi corresponding to the class code CLB and uses this coefficient data Wi and the pixel data xi of the predictive tap to generate pixel data y of the target position in the image signal Vb through an estimate equation (see Equation (1)).

Next, at step ST211, the process decides whether the processing to obtain pixel data of the image signal Vb has finished in all regions of the pixel data of the image signal Va input at step ST202. If the processing has not yet finished, the process returns to step ST208 to shift to processing of the next target position. If the processing has finished, on the other hand, the process returns to step ST202 to shift to processing of inputting the next one frame or one field of the image signal Va.

In this case, if the difference data DF stored in the ROM302 etc. is that of a DCT coefficient which is obtained by DCT processing, the process performs DCT processing on the image signal Va input at step DT202, to provide a DCT coefficient. Further, at step ST209, based on the DCT coefficient obtained by performing DCT processing on the input image signal Va, the process acquires plural DCT coefficients corresponding to the periphery of the target position in the image signal Vb as item(s) of data xi (i=1, ..., m) of a predictive tap. For example, as the plural DCT coefficients, the process acquires DC coefficients which are present in a DCT coefficient block that corresponds to block data containing pixel data of the target position in the image signal Vb and four DCT coefficient blocks adjacent to this DCT coefficient block.

Further, since data y obtained by the estimate equation at step ST210 is a DCT coefficient, the process further performs inverse DCT processing to generate pixel data of the target position in the image signal Vb.

In such a manner, by performing the processing along the flowchart shown in FIG. 23, it is possible to process pixel data of the input image signal Va, thereby obtaining pixel data of the image signal Vb. As described above, the image signal Vb thus processed and obtained is provided to the output terminal 315 or supplied to the display portion 311 so that an image due to the signal may be displayed or, further, supplied to the hard disk drive 305 where it is recorded on a hard disk.

Further, although a processing device is not shown, processing in the unit 250B for generating coefficient data of FIG. 22 can also be realized in software.

Figure 24:
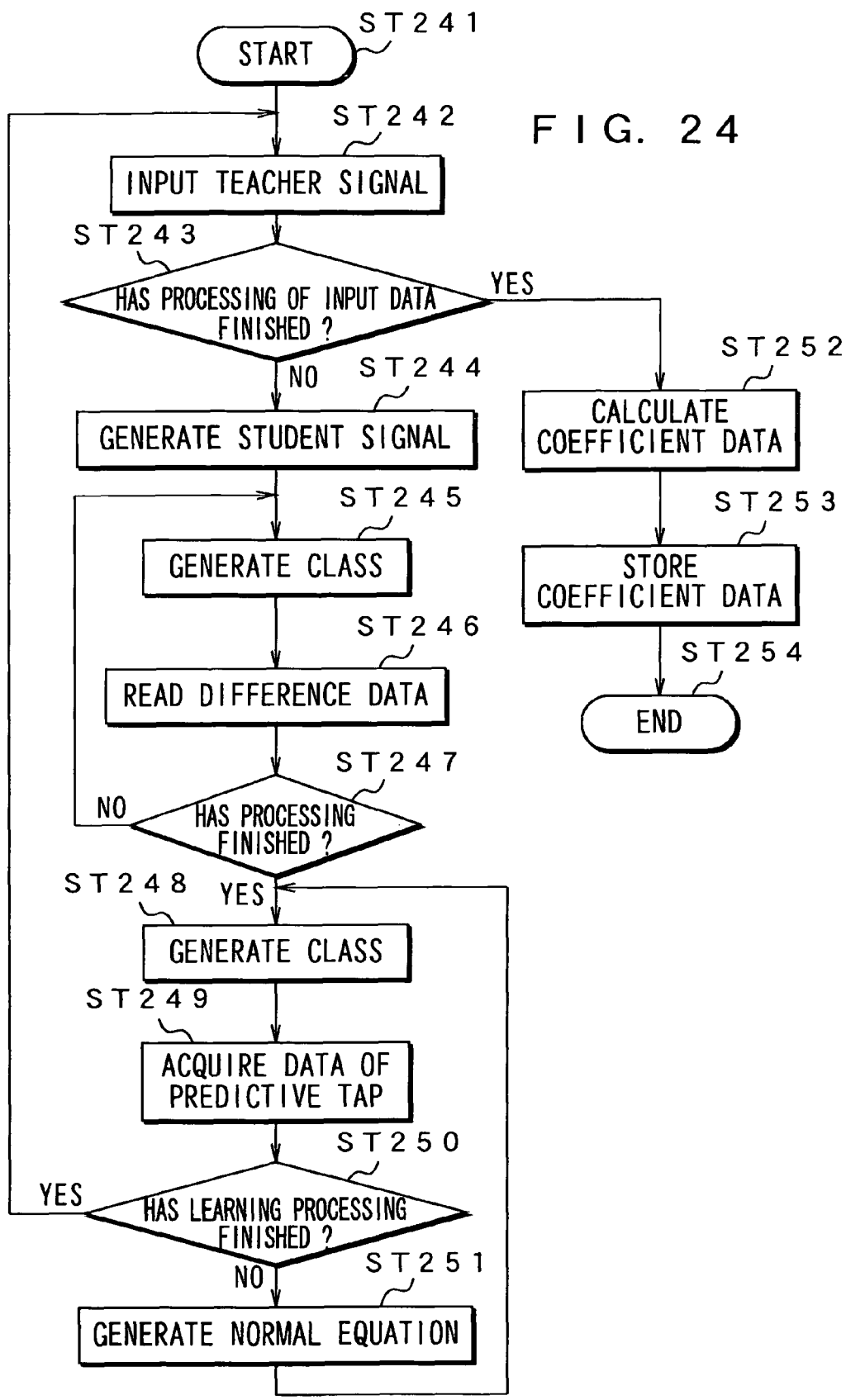
FIG. 24 is a flowchart for showing coefficient data generation processing.

The following will describe a processing procedure for generating coefficient data with reference to a flowchart of FIG. 24.

First, at step ST241, the process starts processing, and at step ST242, it inputs only one frame or one field of the teacher signal. At step ST243, it decides whether processing of all frames or fields of the teacher signal has finished. If the processing has not yet finished, the process goes to step ST244 to generate a student signal from the teacher signal input at step ST242.

At step ST245, the process performs block-unit class classification based on the student signal SS generated at step ST244, to generate a class code CLA that indicates a class to which pixel data of a target position in the teacher signal ST belongs.

Next, at step ST246, based on the class code CLA generated at step ST245, the process reads difference data DF corresponding to that class code CLA out of the ROM etc. and stores it in a RAM temporarily.

At step ST247, it decides whether the processing to read the difference data has finished in all regions of the pixel data of the student signal SS generated at step ST244. If the processing has finished, the process goes to step ST248. Otherwise, it returns to step ST245 to shift to processing of the next target position.

At step ST248, the process performs pixel-data-unit class classification based on the student signal SS generated at step ST244, the pixel position mode information pi obtained so as to correspond to pixel data of the student signal SS that corresponds to pixel data of the target position in the teacher signal ST as not described above, and the class code CLA generated at the above-mentioned step ST245, to generate a class code CLB that indicates a class to which the pixel data of the target position in the teacher signal ST belongs.

Next, at step ST249, the process acquires multiple items of pixel data positioned in a periphery of the target position in the teacher signal ST as item(s) of data xi (i=1, ..., m) of a predictive tap based on the student signal SS generated at step ST244 and also acquires multiple items of difference data that correspond to the above-mentioned multiple items of pixel data as item(s) of data xi (i=m+1, ..., n) of the predictive tap based on the difference data DF read at step ST246.

At step ST250, the process decides whether learning processing is finished in all regions of the one frame or field of the pixel data of the teacher signal input at step ST242. If the learning processing has finished, the process returns to step ST242 to input the next one frame or field of the teacher signal, thus repeating the same processing as described above. Otherwise, the process goes to step ST251.

At this step ST251, the process generates a normal equation (see Equation (8)) for obtaining coefficient data Wi for each class by using the class code CLB generated at step ST248, the item(s) of data xi of the predictive tap acquired at step ST249, and the pixel data y of the target position in the teacher signal ST and then returns to step ST248 to shift to the processing of the next target position.

If the processing has finished at the above-mentioned step ST243, the process, at step ST252, solves the normal equation generated at step ST251 by a sweeping-out method etc., to calculate coefficient data of each class. At step ST253, the process saves the coefficient data of each class in the memory and ends the processing at step ST254.

In such a manner, by performing the processing along the flowchart shown in FIG. 24, it is possible to obtain the coefficient data Wi of each class by using the same method as that for the unit 250B for generating coefficient data shown in FIG. 22.

If, in this case, the difference data DF stored in the ROM etc. is that of a DCT coefficient which is obtained through DCT processing, the process performs DCT processing on the student signal SS generated at step ST244, to provide a DCT coefficient. At step ST249, based on that DCT coefficient, the process acquires plural DCT coefficients corresponding to the periphery of the target position in the teacher signal ST as item(s) of data xi (i=1, ..., m). For example, as the plural DCT coefficients, the process acquires DC coefficients which are present in a DCT coefficient block that corresponds to block data containing pixel data of the target position in the teacher signal ST and four DCT coefficient blocks adjacent to this DCT coefficient block.

Further, in this case, when generating a normal equation at step ST251, the process performs DCT processing on the pixel data of the target position in the teacher signal ST, to obtain a DCT coefficient y that is paired with the item(s) of data xi of the predictive tap acquired at step ST249 to constitute learning data.

The following will describe a fourth embodiment of the present invention.

Figure 25:
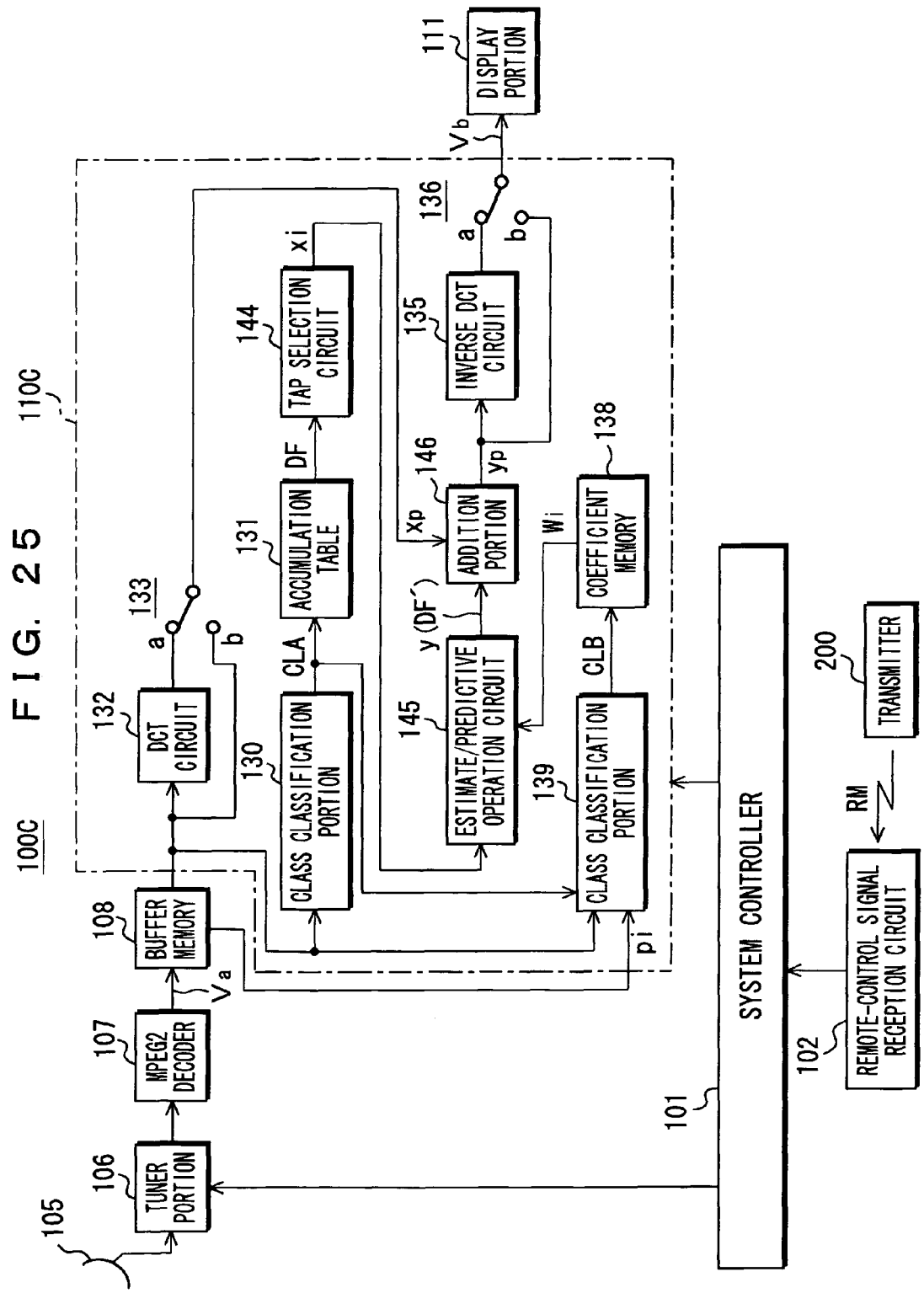
FIG. 25 is a block diagram for showing a configuration of a digital broadcast receiver according to a fourth embodiment.

FIG. 25 shows a configuration of a digital broadcast receiver 100C according to the fourth embodiment. In FIG. 25, components corresponding to those of FIG. 16 are indicated by the same symbols.

The digital broadcast receiver 100C has an image-signal-processing portion 110C by which the image-signal-processing portion 110A of the digital broadcast receiver 100A shown in FIG. 16 is replaced and operates in the same way as the digital broadcast receiver 100A.

The following will describe details of the image-signal-processing portion 110C. In this image-signal-processing portion 110C, components corresponding to those of the image-signal-processing portion 110A shown in FIG. 16 are indicated by the same symbols and their detailed description will be omitted.

This image-signal-processing portion 110C has a tap selection circuit 144 serving as data selection means for taking out selectively and outputting, as item(s) of data xi (i=1, ..., n) of a predictive tap, multiple items of difference data related to a target position in an image signal Vb based on difference data DF read out of an accumulation table 131 corresponding to a class code CLA output from a class classification portion 130.

The tap selection circuit 144 selectively takes out difference data that corresponds to multiple items of pixel data positioned in a periphery of the target position in the image signal Vb if difference data of pixel data is stored in the accumulation table 131 and a transfer switch 133 is connected to its b-side and used.

If difference data of a DCT coefficient is stored in the accumulation table 131 and the transfer switch 133 is connected to its a-side and used, on the other hand, the tap selection circuit 144 selectively takes out difference data that corresponds to plural DCT coefficients in the periphery of the target position in the image signal Vb. For example, as the plural DCT coefficients, DC coefficients are selected which are present in a DCT coefficient block that corresponds to block data containing pixel data of the target position in the image signal Vb and four DCT coefficient blocks adjacent to this DCT coefficient block.

Further, the image-signal-processing portion 110C has an estimate/predictive operation circuit 145 for calculating difference data DF' that corresponds to the target position in the image signal Vb to be generated by using the estimate equation of Equation (1) from the item(s) of data xi of a predictive tap taken out selectively by the tap selection circuits 144 and coefficient data Wi read out of the coefficient memory 138 corresponding to a class code CLB output from a class classification portion 139.

Further, the image-signal-processing portion 110C has an addition portion 146 serving as correction means for adding difference data DF' obtained the estimate/predictive operation circuit 145 to data (pixel data or DCT coefficient) $x_p$, which is output from a movable terminal of the transfer switch 133, corresponding to the target position in the image signal Vb, thus generating data (pixel data or DCT coefficient) $y_p$ of the target position in the image signal Vb.

The other components of the image-signal-processing portion 110C have the same configurations as those of the image-signal-processing portion 110A shown in FIG. 16.

The following will describe operations of this image-signal-processing portion 110C.

First, a case such that difference data DF stored in the accumulation table 131 is that of pixel data will be described. In this case, the transfer switches 133 and 136 are each connected to the b-sides thereof.

In the class classification portion 130, based on the image signal Va, a class code CLA indicating a class to which pixel data of the target position in the image signal Vb belongs is generated. This class code CLA is resulted from the block-unit class classification. This class code CLA is supplied to the accumulation table 131 as read address information. From the accumulation table 131, based on this class code CLA, the difference data DF corresponding to the target position in the image signal Vb is read.

In the tap selection circuit 144, based on the difference data DF read out of the accumulation table 131 corresponding to the class code CLA output from the class classification portion 130, difference data that corresponds to multiple items of pixel data positioned in the periphery of the target position in the image signal Vb is selectively taken out as item(s) of data xi (i=1, . . . , m) of a predictive tap.

In the class classification portion 139, the class code CLB indicating a class to which pixel data of the target position in the image signal Vb belongs is generated based on the image signal Va, pixel position mode information pi, and the class code CLA. This class code CLB is resulted from pixel-data-unit class classification. This class code CLB is supplied to the coefficient memory 138 as read address information.

From the coefficient memory 138, the coefficient data Wi that corresponds to the class code CLB is read and supplied to the estimate/predictive operation circuit 145.

In the estimate/predictive operation circuit 145, difference data y (DF') corresponding to the pixel data of the target position in the image signal Vb to be generated is obtained based on the estimate equation of the above-mentioned Equation (1) by using the item(s) of data xi of a predictive taps selectively taken out by the tap selection circuit 144 and the coefficient data Wi read out of the coefficient memory 138.

Of the image signal Va stored in the buffer memory 108, pixel data $x_p$ that corresponds to the target position in the image signal Vb is supplied via the b-side of the transfer switch 133 to the addition portion 146. Further, the addition portion 146 is supplied with the difference data DF' that corresponds to this pixel data $x_p$ of the target position generated by the estimate/predictive operation circuit 145.

Then, in the addition portion 146, the difference data DF' is added to the pixel data $x_p$, so that they are corrected to generate pixel data $y_p$ of the target position in the image signal Vb. This pixel data $y_p$ is output via the b-side of the transfer switch 136 as an output signal of the image-signal-processing portion 110C. That is, this pixel data $y_p$ constitutes the image signal Vb.

Next, a case such that difference data DF stored in the accumulation table 131 is that of a DCT coefficient obtained through DCT processing will be described. In this case, the transfer switches 133 and 136 are each connected to the a-sides thereof.

In the class classification portion 130, based on the image signal Va, a class code CLA indicating a class to which pixel data of the target position in the image signal Vb belongs is generated. This class code CLA is resulted from the block-unit class classification. This class code CLA is supplied to the accumulation table 131 as read address information. From the accumulation table 131, based on this class code CLA, difference data DF that corresponds to the target position in the image signal Vb is read.

In the tap selection circuit 144, based on the difference data DF read out of the accumulation table 131 corresponding to the class code CLA output from the class classification portion 130, difference data that corresponds to plural DCT coefficients in a periphery of the target position in the image signal Vb is selectively taken out as item(s) of data xi (i=1, . . . , m) of a predictive tap.

In the class classification portion 139, a class code CLB indicating a class to which pixel data of the target position in the image signal Vb belongs is generated based on the image signal Va, the pixel position mode information pi, and the class code CLA. This class code CLB is resulted from the pixel-data-unit (DCT coefficient-unit) class classification. This class code CLB is supplied to the coefficient memory 138 as read address information. From the coefficient memory 138, coefficient data Wi that corresponds to the class code CLB is read and supplied to the estimate/predictive operation circuit 145.

In the estimate/predictive operation circuit 145, difference data y (DF') that corresponds to the pixel data of the target position in the image signal Vb to be generated is obtained based on the above-mentioned estimate equation of Equation (1) by using the item(s) of data xi of a predictive taps selectively taken out by the tap selection circuit 144 and the coefficient data Wi read out of the coefficient memory 138.

The DCT coefficient $x_p$, which is obtained by the DCT circuit 132 and corresponds to pixel data of the target position in the image signal Vb, generated by performing DCT processing on multiple items of pixel data in the image signal Va is supplied via the a-side of the transfer switch 133 to the addition portion 146. Further, this addition portion 146 is supplied with the difference data DF' that corresponds to this pixel data $x_p$ of the target position generated by the estimate/predictive operation circuit 145.

Then, in the addition portion 146, the difference data DF' is added to the pixel data $x_p$, so that they are corrected to generate a DCT coefficient $y_p$ that corresponds to the pixel data of the target position in the image signal Vb. This DCT coefficient $y_p$ is supplied to an inverse DCT circuit 135. This inverse DCT circuit 135 performs inverse DCT processing on the DCT coefficient $y_p$ to obtain pixel data. In such a manner, pixel data output from the inverse DCT circuit 135 is output via the a-side of the transfer switch 136 as an output signal of the image-signal-processing portion 110C. That is, this pixel data constitutes the image signal Vb.

In such a manner, in the image-signal-processing portion 110C, when the image signal Va is converted to obtain the image signal Vb, data xi of a predictive tap is selected on the basis of the difference data (correction data) DF that corresponds to a first class to which pixel data of a target position in the image signal Vb belongs, and thus, using the data xi of the predictive tap and the coefficient data Wi corresponding to a second class to which the pixel data of the target position in the image signal Vb belongs, the difference data (correction data) DF' that corresponds to the pixel data of the target position in the image signal Va is obtained based on an estimate equation, and the difference data DF' is used to correct the data (pixel data or DCT coefficient) $x_p$ related to the image signal Va, thereby obtaining the data (pixel data or DCT coefficient) $y_p$ of the target position in the image signal Vb.

This operation is basically equivalent to that for, as in the image-signal-processing portion 110A shown in FIG. 16, correcting data (pixel data or DCT coefficient) $x_p$ related to the image signal Va to obtain the data (pixel data or DCT coefficient) $y_p$ related to the image signal Vb and using the data xi of the predictive tap selected on the basis of this corrected data (pixel data or DCT coefficient) and the coefficient data Wi, the data (pixel data or DCT coefficient) y of the target position in the image signal Vb is obtained based on an estimate equation, thus enabling a signal having a well reduced encoding noise as the image signal Vb to be obtained.

Figure 26:
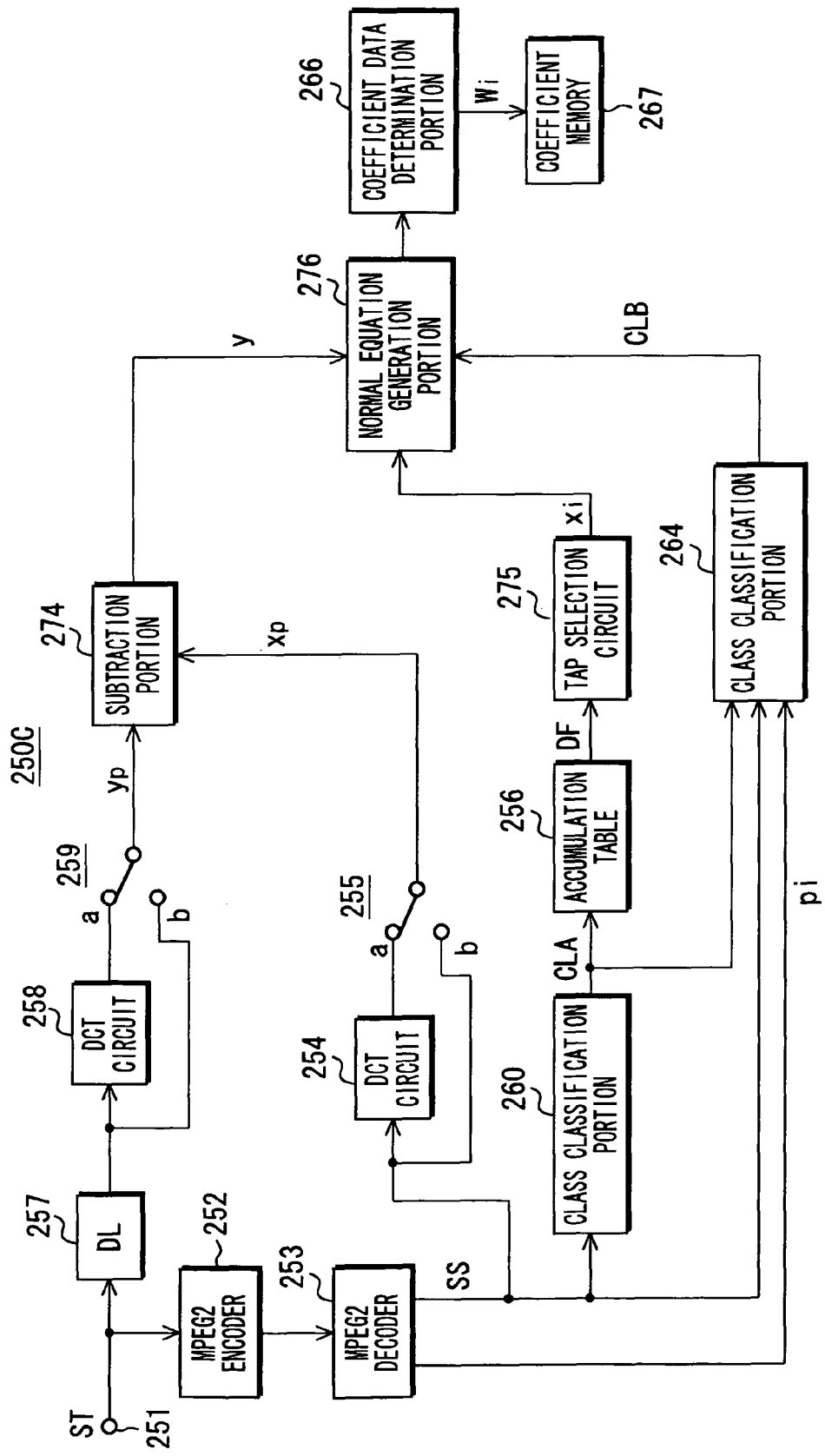
FIG. 26 is a block diagram for showing a configuration of a further unit for generating coefficient data.

The following will describe a unit 250C for generating coefficient data Wi to be stored in the coefficient memory 138 in the image-signal-processing portion 110C shown in FIG. 25. FIG. 26 shows a configuration of the unit 250C for generating coefficient data. In this FIG. 26, components that correspond to those of FIG. 18 are indicated by the same symbols.

The unit 250C for generating coefficient data has a subtraction portion 274 for subtracting data (pixel data or DCT coefficient) $x_p$, which is output from a movable terminal of a transfer switch 255, corresponding to a target position in a teacher signal ST from data (pixel data or DCT coefficient) $y_p$, which is output from a movable terminal of a transfer switch 259, of the target position in this teacher signal ST, thereby obtaining difference data.

Further, the unit 250C for generating coefficient data has a tap selection circuit 275 serving as data selection means for taking out selectively and outputting, as item(s) of data xi (i=1, ..., n) of a predictive tap, multiple items of difference data related to the target position in the teacher signal ST based on difference data DF read out of an accumulation table 256 corresponding to a class code CLA output from a class classification portion 260.

This tap selection circuit 275 has the same configuration as that of the tap selection circuit 144 in the image-signal-processing portion 110C of FIG. 25. The tap selection circuit 275 selectively takes out difference data that corresponds to multiple items of pixel data positioned in a periphery of the target position in the teacher signal ST if difference data of pixel data is stored in the accumulation table 256 and transfer switches 255 and 259 are each connected to the b-sides thereof and used.

If difference data of a DCT coefficient is stored in the accumulation table 256 and the transfer switches 255 and 259 are each connected to the a-sides thereof and used, on the other hand, the tap selection circuit 275 selectively takes out difference data that corresponds to plural DCT coefficients in the periphery of the target position in the teacher signal ST. For example, as the plural DCT coefficients, DC coefficients are selected which are present in a DCT coefficient block that corresponds to block data containing pixel data of the target position in the teacher signal ST and four DCT coefficient blocks adjacent to this DCT coefficient block.

Further, the unit 250C for generating coefficient data has a normal equation generation portion 276 for generating a normal equation (see the above-mentioned Equation (8)) for obtaining item(s) of coefficient data Wi (i=1, ..., n) for each class by using subtraction data y, which is output from the subtraction portion 274, corresponding to each target position in the teacher signal ST, item(s) of data xi of a predictive tap selectively taken out by the tap selection circuit 275, and a class code CLB output from a class classification portion 264.

In this case, although one item of data y and the n number of items of data xi of a predictive tap corresponding thereto are combined to generate one item of learning data, many items of the learning data are generated for each class. Accordingly, a normal equation for obtaining the coefficient data Wi is generated for each class in the normal equation generation portion 276.

The following will describe operations of the unit 250C for generating coefficient data shown in FIG. 26.

First, a case such that difference data DF stored in the accumulation table 256 is that of pixel data will be described. In this case, the transfer switches 255 and 259 are each connected to the b-sides thereof.

A teacher signal ST that corresponds to the image signal Vb is supplied to an input terminal 251 and encoded by an MPEG2 encoder 252 where an MPEG2 stream is generated. This MPEG2 stream is supplied to the MPEG2 decoder 253. The MPEG2 decoder 253 decodes this MPEG2 stream to generate a student signal SS that corresponds to the image signal Va.

Of the teacher signal ST time-adjusted by a delay circuit 257, pixel data $y_p$ of its target position is supplied via the b-side of the transfer switch 259 to the subtraction portion 274. To this subtraction portion 274, the pixel data $x_p$ corresponding to the target position in the teacher signal ST among a student signal SS output from the MPEG2 decoder 253 is supplied via the b-side of the transfer switch 255. Then, the subtraction portion 274 subtracts the pixel data $x_p$ from the pixel data $y_p$ to generate difference data.

In the class classification portion 260, based on the student signal SS, a class code CLA indicating a class to which pixel data of the target position in the teacher signal ST belongs is generated. This class code CLA is resulted from the block-unit class classification. This class code CLA is supplied to the accumulation table 256 as read address information. From the accumulation table 256, based on this class code CLA, difference data DF that corresponds to the target position in the teacher signal ST is read.

In the tap selection circuit 275, based on the difference data DF read out of the accumulation table 256, difference data that corresponds to multiple items of pixel data positioned in a periphery of the target position in the teacher signal ST is selectively taken out as item(s) of data xi (i=1, . . . , n) of a predictive tap.

In the class classification portion 264, the class code CLB indicating a class to which pixel data of the target position in the teacher signal ST belongs is generated based on the student signal SS, the pixel position mode information pi, and the class code CLA.

In the normal equation generation portion 276, a normal equation (see Equation (8)) for obtaining the coefficient data Wi (i=1, . . . , n) is generated for each class by using subtraction data y, which is out put from the subtraction portion 274, corresponding to each target position in the teacher signal ST, item(s) of data xi of a predictive tap selectively taken out by the tap selection circuit 275 corresponding to this subtraction data y of each target position, and a class code CLB generated by the class classification portion 264 corresponding to the pixel data (subtraction data y) of each target position.

Then, this normal equation is solved in a coefficient data determination portion 266 to obtain the coefficient data Wi of each class, and the coefficient data Wi is stored in the coefficient memory 267.

Next, a case such that difference data DF stored in the accumulation table 256 is that of a DCT coefficient will be described. In this case, the transfer switches 255 and 259 are each connected to the a-sides thereof.

A teacher signal ST that corresponds to the image signal Vb is supplied to the input terminal 251 and encoded by the MPEG2 encoder 252 where an MPEG2 stream is generate. This MPEG2 stream is supplied to the MPEG2 decoder 253. The MPEG2 decoder 253 decodes this MPEG2 stream to generate a student signal SS that corresponds to the image signal Va.

On pixel data of a target position in the teacher signal ST time-adjusted by the delay circuit 257, DCT processing is performed by a DCT circuit 258 to obtain a DCT coefficient $y_p$, which is supplied via the a-side of the transfer switch 259 to the subtraction portion 274. Further, on the pixel data, which corresponds to the target position in the teacher signal ST, among the student signal SS output from the MPEG2 decoder 253, DCT processing is performed by the DCT circuit 254 to obtain a DCT coefficient $x_p$, which is supplied via the a-side of the transfer switch 255 to the subtraction portion 274. The subtraction portion 274 subtracts the DCT coefficient $x_p$ from the DCT coefficient $y_p$ to generate difference data.

In the class classification portion 260, a class code CLA indicating a class to which pixel data of the target position in the teacher signal ST belongs is generated based on the student signal SS. This class code CLA is resulted from the block-unit class classification. This class code CLA is supplied to the accumulation table 256 as read address information. From the accumulation table 256, based on this class code CLA, difference data DF that corresponds to the target position in the teacher signal ST is read.

In the tap selection circuit 275, based on the difference data DF read out of the accumulation table 256, difference data that corresponds to multiple items of pixel data positioned in a periphery of the target position in the teacher signal ST is selectively taken out as item(s) of data xi (i=1, . . . , n) of a predictive tap.

In the class classification portion 264, a class code CLB indicating a class to which pixel data of the target position in the teacher signal ST belongs is generated based on the student signal SS, the pixel position mode information pi, and the class code CLA.

In the normal equation generation portion 276, a normal equation (see Equation (8)) for obtaining item(s) of coefficient data Wi (i=1, . . . , n) is generated for each class by using subtraction data y, which is output from the subtraction portion 274, corresponding to each target position in the teacher signal ST, item(s) of data xi of a predictive tap selectively taken out by the tap selection circuit 275 corresponding to this subtraction data y of each target position, and a class code CLB generated by the class classification portion 264 corresponding to the pixel data (subtraction data) y of each target position.

Then, this normal equation is solved by the coefficient data determination portion 266 to obtain coefficient data Wi of each class, which coefficient data Wi is stored in the coefficient memory 267.

In such a manner, in the unit 250C for generating coefficient data shown in FIG. 26, it is possible to generate the coefficient data Wi of each class to be stored in the coefficient memory 138 in the image-signal-processing portion 110C of FIG. 25.

This coefficient data Wi has been generated by using the subtraction data obtained by subtracting the data (pixel data or DCT coefficient) related to the student signal SS from the data (pixel data or DCT coefficient) related to the teacher signal and the item(s) of data xi as a predictive tap selected on the basis of difference data (correction data). Therefore, in the image-signal-processing portion 110C shown in FIG. 25, the image signal Vb obtained from the image signal Va through an estimate equation by use of this coefficient data Wi has a well reduced encoding noise.

It is to be noted that the processing in the image-signal-processing portion 110C shown in FIG. 25 can also be realized in software by, for example, the apparatus 300 for processing image signal shown in FIG. 8.

Figure 27:
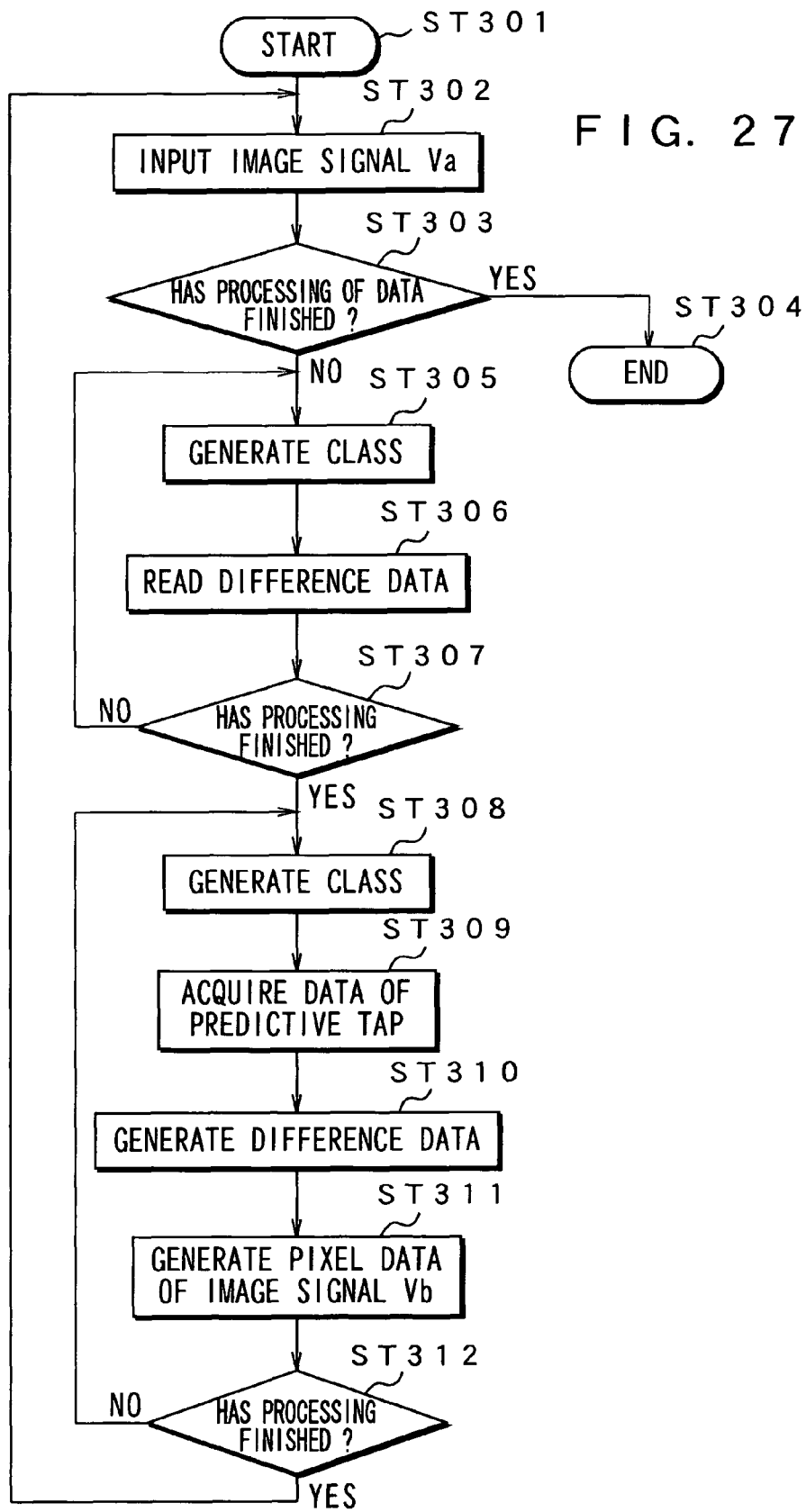
FIG. 27 is a flowchart for showing image signal processing.

The following will describe a processing procedure for obtaining the image signal Vb from the image signal Va with reference to a flowchart of FIG. 27.

First, at step ST301, the process starts processing, and at step ST302, it inputs from, for example, the input terminal 314 one frame or one field of the image signal Va into the apparatus. In such a manner, pixel data that constitutes the image signal Va input from the input terminal 314 is stored in the RAM303 temporarily. It is to be noted that if this image signal Va is recorded in the hard disk drive 305 in the apparatus beforehand, this image signal Va is read out of this drive 305 so that the pixel data that constitutes this image signal Va in the RAM303 is temporarily stored.

At step ST303, it decides whether processing of all the frames or fields of the image signal Va has finished. If the processing has finished, the process ends the processing at step ST304. Otherwise, it goes to step ST305.

At this step ST305, the process performs block-unit class classification to generate a class code CIA indicating a class to which pixel data of a target position in the image signal Vb belongs. At step ST306, based on the class code CLA generated at step ST305, the process reads difference data DF that corresponds to that class code CLA from the ROM302 etc. and stores it in the RAM303 temporarily.

Next, at step ST307, it decides whether the processing to read difference data has finished in all regions of the pixel data of the image signal Va input at step ST302. If the processing has finished, the process goes to step ST308. Otherwise, it returns to step ST305 to shift to processing of the next target position.

At step ST308, the process performs pixel-data-unit class classification based on the image signal Va input at step ST302, pixel position mode information pi input with it being paired with pixel data of this image signal Va, and the class code CLA generated at the above-mentioned step ST305, to generate a class code CLB indicating a class to which pixel data of the target position in the image signal Vb belongs.

At step ST309, the process acquires multiple items of difference data that corresponds to multiple items of pixel data positioned in a periphery of the target position in the image signal Vb as item(s) of data xi (i=1, ..., n) based on the difference data DF read at step ST306.

Next, at step ST310, the process reads out of the ROM302 etc. coefficient data Wi that corresponds to the class code CLB generated at step ST308 based on the class code CLB and uses this coefficient data Wi and the item(s) of pixel data xi of the predictive tap to generate pixel data y (DF') that corresponds to the pixel data of the target position in the image signal Vb through an estimate equation (see Equation (1)).

At step ST311, the process adds the difference data DF' generated at step ST310 to pixel data $x_p$, which corresponds to the target position in the image signal Vb, among the multiple items of pixel data that constitute the image signal Va and corrects it, to generate pixel data $y_p$ of the target position in the image signal Vb.

Next, at step ST312, the process decides whether the processing to obtain pixel data of the image signal Vb has finished in all regions of the pixel data of the image signal Va input at step ST302. If the processing has not yet finished, the process returns to step ST308 to shift to processing of the next target position. If finished, on the other hand, the process returns to step ST302 to shift to processing of inputting the next one frame or one field of the image signal Va.

In this case, if the difference data DF stored in the ROM302 etc. is that of a DCT coefficient which is obtained by DCT processing, the process performs DCT processing on the image signal Va input at step ST302, to provide a DCT coefficient. Further, in this case, since data $y_p$ obtained at step ST311 is a DCT coefficient, the process further performs inverse DCT processing to generate pixel data of the target position in the image signal Vb.

In such a manner, by performing the processing along the flowchart shown in FIG. 27, it is possible to process pixel data of the input image signal Va, thereby obtaining pixel data of the image signal Vb. As described above, the image signal Vb thus processed and obtained is provided to the output terminal 315 or supplied to the display portion 311 so that an image due to the signal may be displayed or, further, supplied to the hard disk drive 305 where it is recorded on a hard disk.

Further, although a processing device is not shown, processing in the unit 250C for generating coefficient data of FIG. 26 can also be realized in software.

Figure 28:
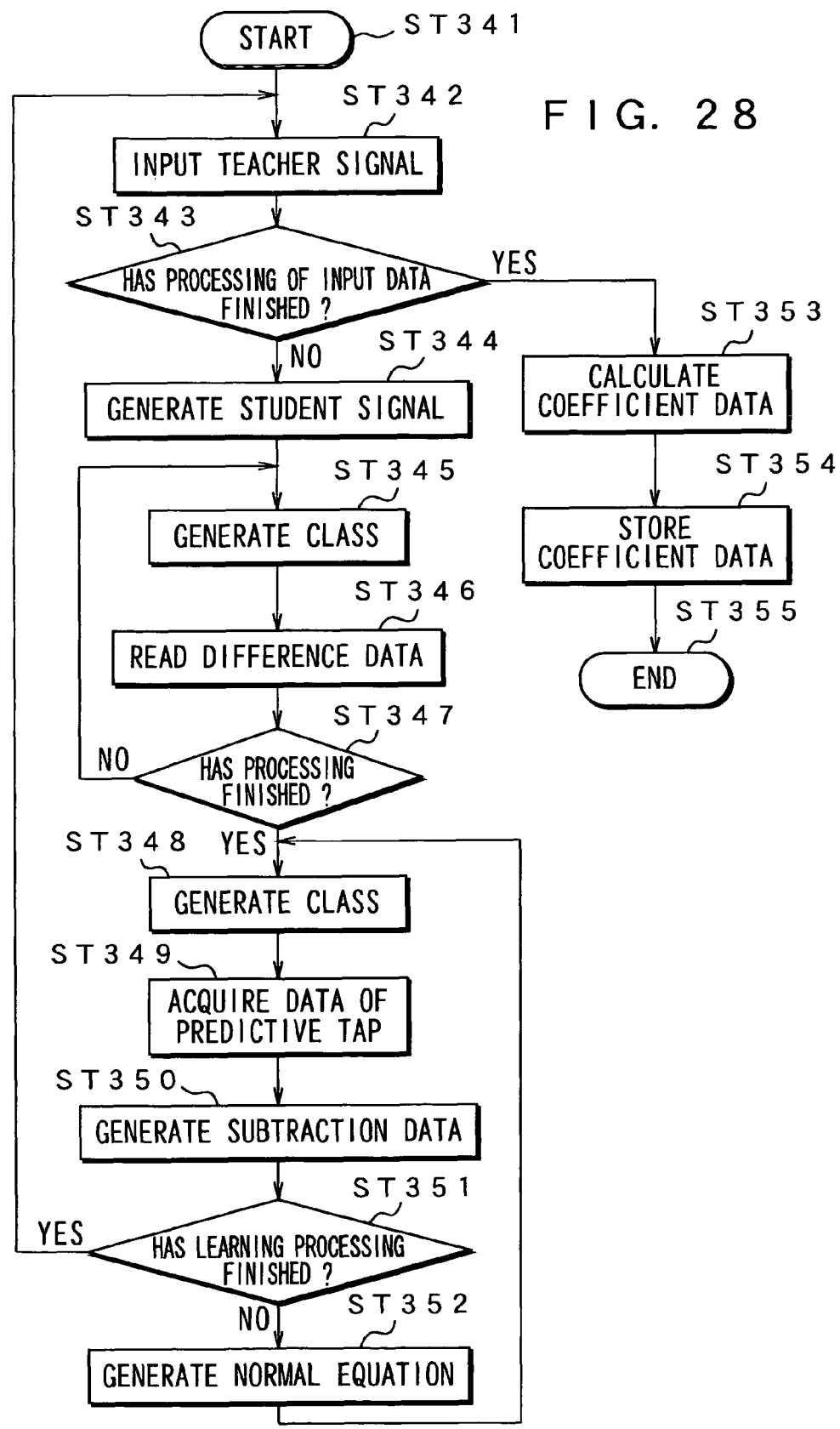
FIG. 28 is a flowchart for showing coefficient data generation processing.

The following will describe a processing procedure for generating coefficient data with reference to a flowchart of FIG. 28.

First, at step ST341, the process starts processing, and at step ST342, it inputs only one frame or one field of a teacher signal. At step ST343, it decides whether processing of all the frames or fields of the teacher signal has finished. If the processing has not yet finished, the process goes to step ST344 to generate a student signal from the teacher signal input at step ST342.

At step ST345, the process performs block-unit class classification based on the student signal SS generated at step ST344, to generate a class code CLA indicating a class to which pixel data of a target position in the teacher signal ST belongs.

Next, at step ST346, based on the class code CLA generated at step ST345, the process reads difference data DF corresponding to that class code CLA out of the ROM etc. and stores it in a RAM temporarily.

At step ST347, it decides whether the processing to read the difference data has finished in all regions of the pixel data of the student signal SS generated at step ST344. If the processing has finished, the process goes to step ST348. Otherwise, it returns to step ST345 to shift to processing of the next target position.

At step ST348, the process performs pixel-data-unit class classification based on the student signal SS generated at step ST344, pixel position mode information pi obtained so as to correspond to pixel data of the student signal SS that corresponds to pixel data of the target position in the teacher signal ST, which has not described above, and the class code CLA generated at the above-mentioned step ST345, to generate a class code CLB indicating a class to which the pixel data of the target position in the teacher signal ST belongs.

Next, at step ST349, the process acquires multiple items of different data corresponding to multiple items of pixel data positioned in a periphery of the target position in the teacher signal ST as item(s) of data xi (i=1, ..., n) of a predictive tap based on the difference data DF read at step ST346.

At step ST350, the process subtracts the pixel data $x_p$, which corresponds to the pixel data of the target position in the teacher signal ST, among multiple items of pixel data that constitute the student signal SS from the pixel data $y_p$ of the target position in the teacher signal ST among multiple items of pixel data that constitute the teacher signal ST, to generate subtraction data.

Next, at step ST351, the process decides whether learning processing has finished in all regions of the one frame or field of the pixel data of the teacher signal input at step ST342. If the learning processing has finished, the process returns to step ST342 to input the next one frame or field of the teacher signal, thus repeating the same processing as described above. Otherwise, the process goes to step ST352.

At this step ST352, the process generates a normal equation (see Equation (8)) for obtaining coefficient data Wi for each class by using the class code CLB generated at step ST348, the item(s) of data xi of the predictive tap acquired at step ST349, and the subtraction data y that corresponds to the pixel data of the target position in the teacher signal ST generated at step ST350 and then returns to step ST348 to shift to the processing of the next target position.

If the processing has finished at the above-mentioned step ST343, the process, at step ST353, solves the normal equation generated at step ST352 by a sweeping-out method etc., to calculate coefficient data of each class. At step ST354, the process saves the coefficient data of each class in the memory and ends the processing at step ST355.

In such a manner, by performing the processing along the flowchart shown in FIG. 28, it is possible to obtain the coefficient data Wi of each class by using the same method as that for the unit 250C for generating coefficient data shown in FIG. 26.

If, in this case, the difference data DF stored in the ROM etc. is that of a DCT coefficient which is obtained through DCT processing, the process performs DCT processing on the student signal SS generated at step ST344, to provide a DCT coefficient. Further, the process performs DCT processing on the teacher signal ST input at step ST342 to obtain a DCT coefficient. At step ST350, the process performs subtraction in a condition of the DCT coefficient.

The following will describe a fifth embodiment of the present invention.

Figure 29:
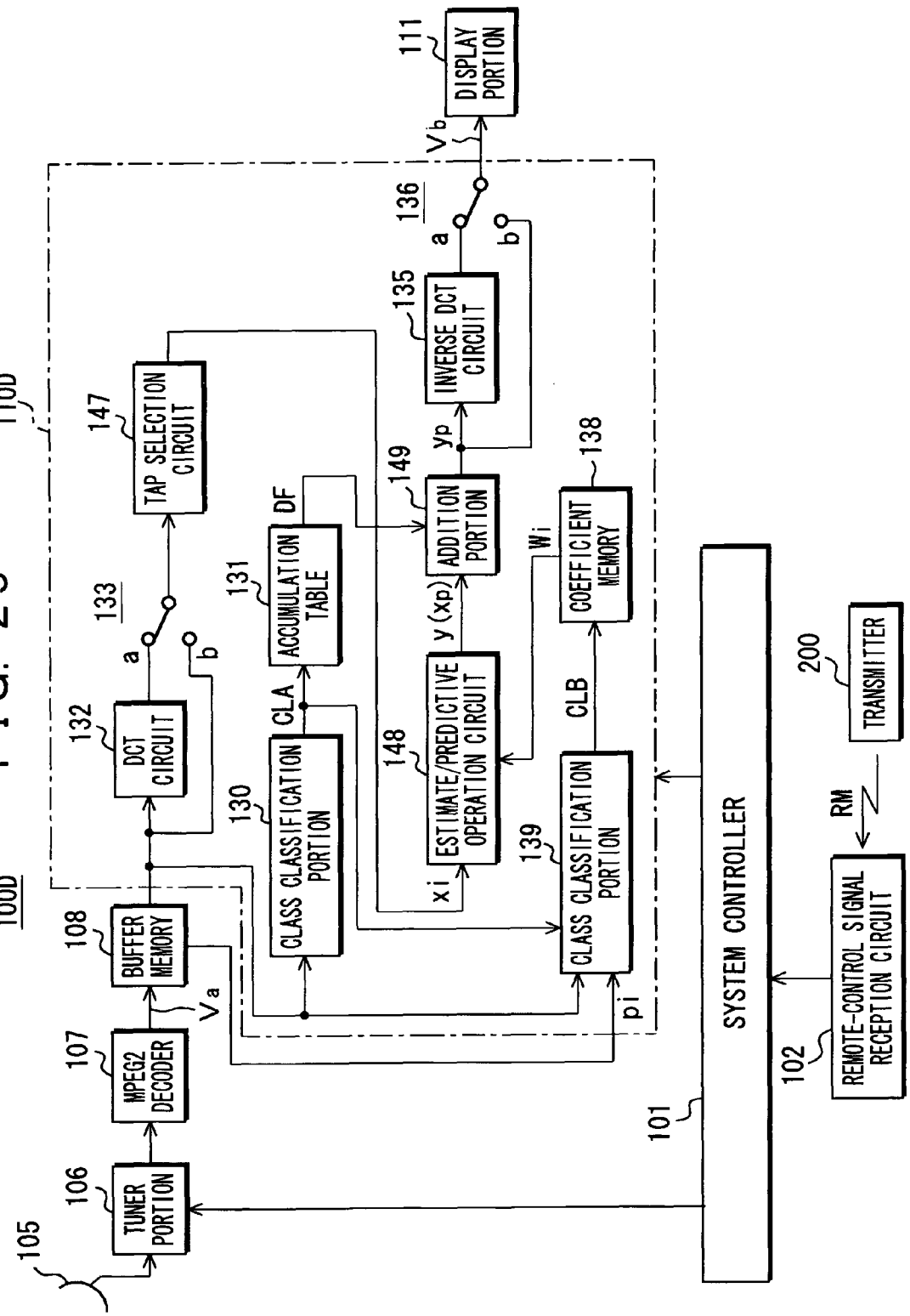
FIG. 29 is a block diagram for showing a configuration of a digital broadcast receiver according to a fifth embodiment.

FIG. 29 shows a configuration of a digital broadcast receiver 100D according to the fifth embodiment. In this FIG. 29, components corresponding to those of FIG. 16 are indicated by the same symbols.

The digital broadcast receiver 100D has an image-signal-processing portion 110D by which the image-signal-processing portion 110A of the digital broadcast receiver 100A shown in FIG. 16 is replaced and operates in the same way as the digital broadcast receiver 100A.

The following will describe details of the image-signal-processing portion 110D. In this image-signal-processing portion 110D, components corresponding to those of the image-signal-processing portion 110A shown in FIG. 16 are indicated by the same symbols and their detailed description will be omitted.

This image signal processing portion 110D has a tap selection circuit 147 serving as data selection means for taking out selectively and outputting, as item(s) of data xi (i=1, ..., n) of a predictive tap, multiple items of data related to a target position in an image signal Vb based on data (pixel data or DCT coefficient), which is output from a movable terminal of a transfer switch 133, corresponding to the target position in the image signal Vb.

The tap selection circuit 147 selectively takes out multiple items of pixel data positioned in a periphery of the target position in the image signal Vb if difference data of pixel data is stored in the accumulation table 131 and the transfer switch 133 is connected to its b-side and used.

If difference data of a DCT coefficient is stored in the accumulation table 131 and the transfer switch 133 is connected to its a-side and used, on the other hand, the tap selection circuit 147 selectively takes out plural DCT coefficients that correspond to the periphery of the target position in the image signal Vb. For example, as the plural DCT coefficients, DC coefficients are selected which are present in a DCT coefficient block that corresponds to block data containing pixel data of the target position in the image signal Vb and four DCT coefficient blocks adjacent to this DCT coefficient block.

Further, the image-signal-processing portion 110D has an estimate/predictive operation circuit 148 for calculating data (pixel data or DCT coefficient) y corresponding to the target position in the image signal Vb to be generated by using the estimate equation of Equation (1) from the item(s) of data xi of a predictive tap taken out selectively by the tap selection circuits 147 and coefficient data Wi read out of the coefficient memory 138 corresponding to a class code CLB output from a class classification portion 139.

Further, the image-signal-processing portion 110D has an addition portion 149 serving as correction means for adding difference data DF read out of the accumulation table 131 to data (pixel data or DCT coefficient) $x_p$, which is output from the estimate/predictive operation circuit 148, corresponding to the target position in the image signal Vb, thus generating data (pixel data or DCT coefficient) $y_p$ of the target position in the image signal Vb.

The other components of the image-signal-processing portion 110D have the same configurations as those of the image-signal-processing portion 110A shown in FIG. 16.

The following will describe operations of this image-signal-processing portion 110D.

First, a case such that difference data DF stored in the accumulation table 131 is that of pixel data will be described. In this case, the transfer switches 133 and 136 are each connected to the b-side thereof.

In the tap selection circuit 147, multiple items of pixel data positioned in the periphery of the target position in the image signal Vb are selectively taken out as item(s) of data xi (i=1, ..., n) of a predictive tap, based on an image signal Va stored in a buffer memory 108.

In the class classification portion 139, a class code CLB indicating a class to which pixel data of the target position in the image signal Vb belongs is generated based on the image signal Va, pixel position mode information pi, and the class code CLA. This class code CLB is resulted from the pixel-data-unit class classification. This class code CLB is supplied to the coefficient memory 138 as read address information. From the coefficient memory 138, the coefficient data Wi that corresponds to the class code CLB is read and supplied to the estimate/predictive operation circuit 148.

In the estimate/predictive operation circuit 148, pixel data y that corresponds to the pixel data of the target position in the image signal Vb to be generated is obtained based on the estimate equation of the above-mentioned Equation (1) by using the item(s) of data xi of a predictive taps selectively taken out by the tap selection circuit 147 and the coefficient data Wi read out of the coefficient memory 138.

In a class classification portion 130, a class code CLA indicating a class to which pixel data of the target position in the image signal Vb belongs is generated based on the image signal Va. This class code CLA is resulted from the block-unit class classification. This class code CLA is supplied to the accumulation table 131 as read address information. From the accumulation table 131, based on this class code CLA, the difference data DF that corresponds to the target position in the image signal Vb is read.

The addition portion 149 is supplied with the pixel data y ($x_p$), which is generated by the estimate/predictive operation circuit 148, corresponding to pixel data of the target position in the image signal Vb. Further, this addition portion 149 is supplied with the difference data DF, which is read out of the accumulation table 13, corresponding to the target position in the image signal Vb.

In the addition portion 149, the difference data DF is added to the pixel data $x_p$ so that they are corrected, thereby generating pixel data $y_p$ of the target position in the image signal Vb. This pixel data $y_p$ is supplied via the b-side of the transfer switch 136 as an output signal of the image-signal-processing portion 110D. That is, this image data $y_p$ constitutes the image signal Vb.

Next, a case such that difference data DF stored in the accumulation table 131 is that of a DCT coefficient obtained through DCT processing will be described. In this case, the transfer switches 133 and 136 are each connected to the a-sides thereof.

In the tap selection circuit 147, plural DCT coefficients that correspond to a periphery of a target position in the image signal Vb are selectively taken out as item(s) of data xi (i=1, ..., n) of a predictive tap based on a DCT coefficient, which is obtained by the DCT circuit 132 and corresponds to the pixel data of the target position in the image signal Vb, generated by performing DCT processing on multiple items of pixel data of the image signal Va.

In the class classification portion 139, a class code CLB indicating a class to which pixel data of the target position in the image signal Vb belongs is generated based on the image signal Va, the pixel position mode information pi, and the class code CLA. This class code CLB is resulted from the pixel-data-unit (DCT coefficient-unit) class classification. This class code CLB is supplied to the coefficient memory 138 as read address information. From the coefficient memory 138, coefficient data Wi that corresponds to the class code CLB is read and supplied to the estimate/predictive operation circuit 148.

In the estimate/predictive operation circuit 148, a DCT coefficient y that corresponds to the pixel data of the target position in the image signal Vb to be generated is obtained based on the estimate equation of the above-mentioned Equation (1) by using the item(s) of data xi of a predictive taps selectively taken out by the tap selection circuit 147 and the coefficient data Wi read out of the coefficient memory 138.

In the class classification portion 130, based on the image signal Va, a class code CLA indicating a class to which pixel data of the target position in the image signal Vb belongs is generated. This class code CLA is resulted from the block-unit class classification. This class code CLA is supplied to the accumulation table 131 as read address information. From the accumulation table 131, based on this class code CLA, difference data DF that corresponds to the target position in the image signal Vb is read.

The addition portion 149 is supplied with the DCT coefficient y ($x_p$), which is generated by the estimate/predictive operation circuit 148, corresponding to pixel data of the target position in the image signal Vb. Further, this addition portion 149 is supplied with the difference data DF, which is read out of the accumulation table 131, corresponding to the target position in the image signal Vb.

In the addition portion 149, the difference data DF is added to the DCT coefficient $x_p$ so that they are corrected, thereby generating a DCT coefficient $y_p$ that corresponds to the pixel data of the target position in the image signal Vb. This DCT coefficient $y_p$ is supplied to an inverse DCT coefficient circuit 135. In this inverse DCT circuit 135, inverse DCT processing is performed on the DCT coefficient $y_p$ to obtain pixel data. In such a manner, the pixel data output from the inverse DCT circuit 135 is output via the a-side of the transfer switch 136 as an output signal of the image-signal-processing portion 110D. That is, this pixel data constitutes the image signal Vb.

In such a manner, in the image-signal-processing portion 110D, when the image signal Va is converted to obtain the image signal Vb, item(s) of data xi of a predictive tap is (are) selected on the basis of the image signal Va, and using the data xi of the predictive tap and the coefficient data Wi that corresponds to a second class to which the pixel data of the target position in the image signal Vb belongs, based on an estimate equation, data (pixel data or DCT coefficient) y ($x_p$) that corresponds to the pixel data of the target position in the image signal Va is obtained and then this data y ($x_p$) is corrected by using difference data (correction data) DF that corresponds to a first class to which the pixel data of the target position in the image signal Vb belongs, thus obtaining data (pixel data or DCT coefficient) $y_p$ of the target position in the image signal Vb.

This operation is basically equivalent to that for, as in the image-signal-processing portion 110A shown in FIG. 16, correcting data (pixel data or DCT coefficient) $x_p$ related to the image signal Va to obtain the data (pixel data or DCT coefficient) $y_p$ related to the image signal Vb and using data xi of a predictive tap selected on the basis of this corrected data (pixel data or DCT coefficient) and the coefficient data Wi, the data (pixel data or DCT coefficient) y of the target position in the image signal Vb is obtained based on an estimate equation, thus enabling a signal having a well reduced encoding noise as the image signal Vb to be obtained.

Figure 30:
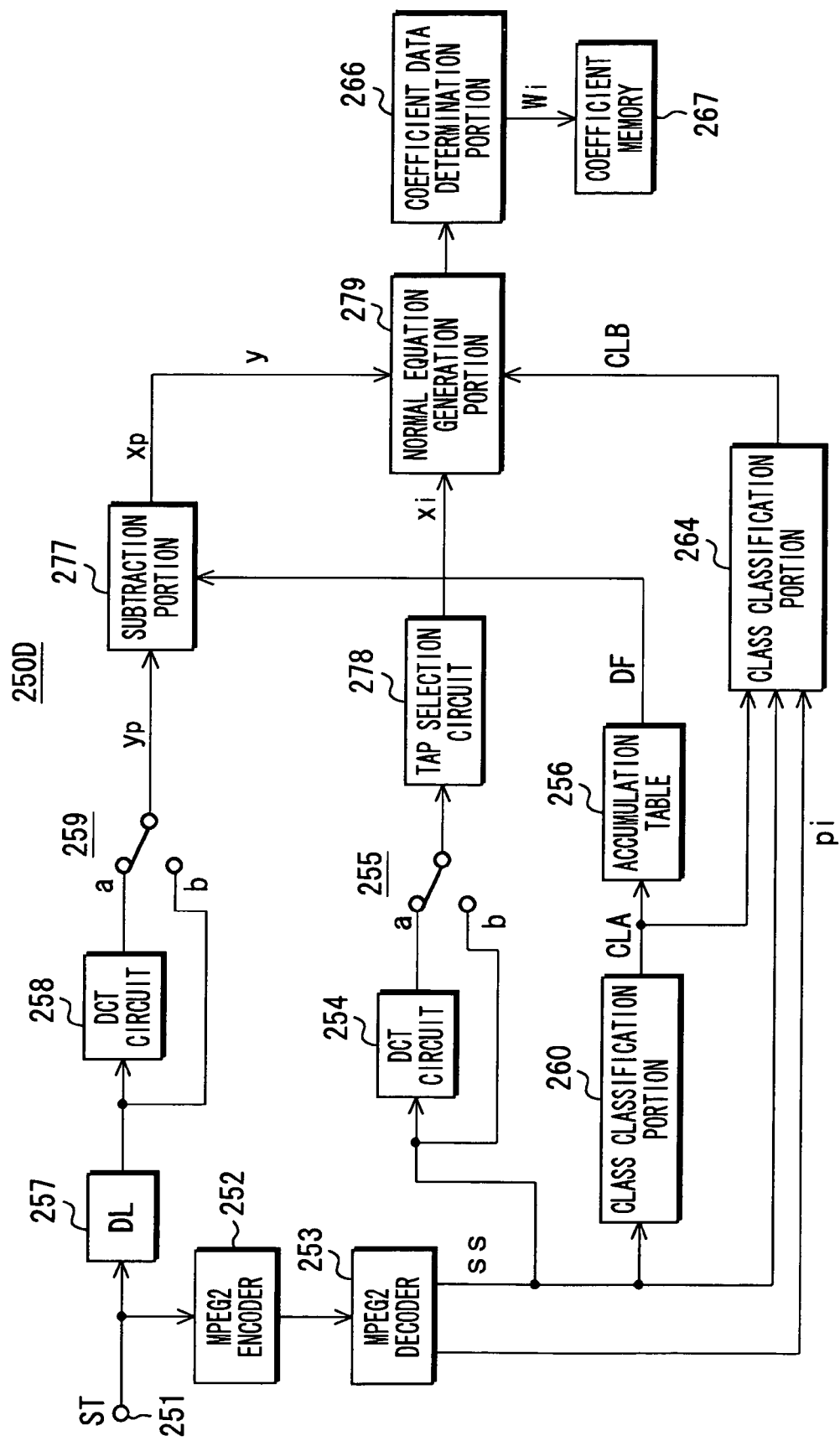
FIG. 30 is a block diagram for showing a configuration of a still further unit for generating coefficient data.

The following will describe a unit for generating coefficient data Wi to be stored in the coefficient memory 138 of the image-signal-processing portion 110D shown in FIG. 29. FIG. 30 shows a configuration of the unit 250D for generating coefficient data. In this FIG. 30, components corresponding to those of FIG. 18 are indicated by the same symbols.

The unit 250D for generating coefficient data has a subtraction portion 277 for subtracting difference data DF read out of an accumulation table 256 corresponding to a class code CLA output from a class classification portion 260 from data (pixel data or DCT coefficient) $y_p$, which is output from a movable terminal of a transfer switch 259, of a target position in a teacher signal ST, thereby obtaining data (pixel data or DCT coefficient) $x_p$ that corresponds to the target position in the teacher signal ST.

Further, the unit 250D for generating coefficient data has a tap selection circuit 278 serving as data selection means for taking out selectively and outputting, as items of data xi (i=1, ..., n) of a predictive tap multiple items of data related to the target position in the teacher signal ST based on data (pixel data or DCT coefficient), which is output from the movable terminal of the transfer switch 255, corresponding to the target position in the teacher signal ST.

This tap selection circuit 278 has the same configuration as that of the tap selection circuit 147 in the image-signal-processing portion 110D of FIG. 29. The tap selection circuit 278 selectively takes out multiple items of pixel data positioned in a periphery of the target position in the teacher signal ST if difference data of pixel data is stored in the accumulation table 256 and transfer switches 255 and 259 are each connected to the b-sides thereof and used.

If difference data of a DCT coefficient is stored in the accumulation table 256 and the transfer switches 255 and 259 are each connected to the a-sides thereof and used, on the other hand, the tap selection circuit 278 selectively takes out plural DCT coefficients that correspond to the periphery of the target position in the teacher signal ST. For example, as the plural DCT coefficients, DC coefficients are selected which are present in a DCT coefficient block that corresponds to block data containing pixel data of the target position in the teacher signal ST and four DCT coefficient blocks adjacent to this DCT coefficient block.

Further, the unit 250D for generating coefficient data has a normal equation generation portion 279 for generating a normal equation (see the above-mentioned Equation (8)) for obtaining item(s) of coefficient data Wi (i=1, ..., n) for each class by using subtraction data y ($x_p$), which is output from the subtraction portion 277, corresponding to each target position in the teacher signal ST, the item(s) of data xi of a predictive tap selectively taken out by the tap selection circuit 278, and a class code CLB output from a class classification portion 264.

In this case, although one item of data y and the n number of item(s) of data xi of a predictive tap corresponding thereto are combined to generate one item of learning data, many items of learning data are generated for each class. Accordingly, a normal equation for obtaining coefficient data Wi is generated for each class in the normal equation generation portion 279.

The following will describe operations of the unit 250D for generating coefficient data shown in FIG. 30

First, a case such that difference data DF stored in the accumulation table 256 is that of pixel data will be described. In this case, the transfer switches 255 and 259 are each connected to the b-sides thereof.

A teacher signal ST corresponding to the image signal Vb is supplied to an input terminal 251 and encoded by an MPEG2 encoder 252 to generate an MPEG2 stream. This MPEG2 stream is supplied to the MPEG2 decoder 253. The MPEG2 decoder 253 decodes this MPEG2 stream to generate a student signal SS that corresponds to the image signal Va.

In the class classification portion 260, based on the student signal SS, a class code CLA indicating a class to which pixel data of the target position in the teacher signal ST belongs is generated. This class code CLA is resulted from the block-unit class classification. This class code CLA is supplied to the accumulation table 256 as read address information. From the accumulation table 256, based on this class code CLA, difference data DF that corresponds to the target position in the teacher signal ST is read.

Of the teacher signal ST time-adjusted by a delay circuit 257, pixel data $y_p$ of its target position is supplied via the b-side of the transfer switch 259 to the subtraction portion 277. This subtraction portion 277 is supplied with the difference data DF read from the accumulation table 256. Then, in the subtraction portion 277, the difference data DF is subtracted from the pixel data $y_p$ so that pixel data $x_p$ that corresponds to the target position in the teacher signal ST is generated.

In the tap selection circuit 278, based on the student signal SS output from the MPEG2 decoder 253, multiple items of pixel data positioned in a periphery of the target position in the teacher signal ST are selectively taken out as item(s) of data xi (i=1, . . . , n) of a predictive tap.

In the class classification portion 264, a class code CLB indicating a class to which pixel data of the target position in the teacher signal ST belongs is generated based on the student signal SS, pixel position mode information pi, and the class code CLA.

In the normal equation generation portion 279, a normal equation (see Equation (8)) for obtaining items of coefficient data Wi (i=1, . . . , n) is generated for each class by using pixel data y ($x_p$), which is output from the subtraction portion 277, corresponding to each target position in the teacher signal ST, the item(s) of data xi of a predictive tap selectively taken out by the tap selection circuit 278 corresponding to the pixel data y that corresponds to each target position, and the class code CLB generated by the class classification portion 264 corresponding to the pixel data (pixel data y) of each target position.

Then, this normal equation is solved in a coefficient data determination portion 266 so that coefficient data Wi of each class is obtained, and the coefficient data Wi is stored in the coefficient memory 267.

Next, a case such that difference data DF stored in the accumulation table 256 is that of a DCT coefficient will be described. In this case, the transfer switches 255 and 259 are each connected to the a-sides thereof.

A teacher signal ST that corresponds to the image signal Vb is supplied to the input terminal 251 and encoded by the MPEG2 encoder 252 to generate an MPEG2 stream. This MPEG2 stream is supplied to the MPEG2 decoder 253. The MPEG2 decoder 253 decodes this MPEG2 stream to generate a student signal SS that corresponds to the image signal Va.

In the class classification portion 260, a class code CLA indicating a class to which pixel data of a target position in the teacher signal ST belongs is generated based on the student signal SS. This class code CLA is resulted from the block-unit class classification. This class code CLA is supplied to the accumulation table 256 as read address information. From the accumulation table 256, based on this class code CLA, difference data DF that corresponds to the target position in the teacher signal ST is read.

Of the teacher signal ST time-adjusted by a delay circuit 257, pixel data of its target position undergoes DCT processing in the DCT circuit 258 and a DCT coefficient $y_p$ thus obtained is supplied via the a-side of the transfer switch 259 to the subtraction portion 277. Further, as described above, the difference data DF read out of the accumulation table 256 is supplied to the subtraction portion 277. In the subtraction portion 277, the difference data DF is subtracted from the DCT coefficient $y_p$ so that a DCT coefficient $x_p$ is generated.

In the tap selection circuit 278, plural DCT coefficients that corresponds to the periphery of target position in the teacher signal ST are selectively taken out as item(s) of data xi (i=1, . . . , n) of a predictive tap based on a DCT coefficient, which is obtained by the DCT circuit 254 and corresponds to pixel data of the target position in the teacher signal ST, generated by performing DCT processing on multiple items of pixel data of the student signal SS.

In the class classification portion 264, a class code CLB indicating a class to which pixel data of the target position in the teacher signal ST belongs is generated based on the student signal SS, the pixel position mode information pi, and the class code CLA.

In the normal equation generation portion 279, a normal equation (see Equation (8)) for obtaining items of coefficient data Wi (i=1, . . . , n) is generated for each class by using a DCT coefficient y ($x_p$), which is output from the subtraction portion 277, corresponding to each target position in the teacher signal ST, item(s) of data xi of a predictive tap selectively taken out by the tap selection circuit 278 corresponding to this DCT coefficient y of each target position, and a class code CLB generated by the class classification portion 264 corresponding to the pixel data (DCT coefficient y) of each target position.

Then, this normal equation is solved in the coefficient data determination portion 266 so that coefficient data Wi of each class is obtained, and the coefficient data Wi is stored in the coefficient memory 267.

In such a manner, in the unit 250D for generating coefficient data shown in FIG. 30, it is possible to generate the coefficient data Wi of each class to be stored in the coefficient memory 138 in the image-signal-processing portion 110D of FIG. 29.

This coefficient data Wi has been generated by using subtraction data obtained by subtracting difference data (correction data) from data (pixel data or DCT coefficient) related to the teacher signal and item(s) of data xi as a predictive tap selected on the basis of the student signal SS. Therefore, in the image-signal-processing portion 110D shown in FIG. 29, the image signal Vb obtained from the image signal Va through an estimate equation by use of this coefficient data Wi has a well reduced encoding noise.

It is to be noted that the processing in the image-signal-processing portion 110D shown in FIG. 29 can also be realized in software by, for example, the apparatus 300 for processing image signal shown in FIG. 8.

Figure 31:
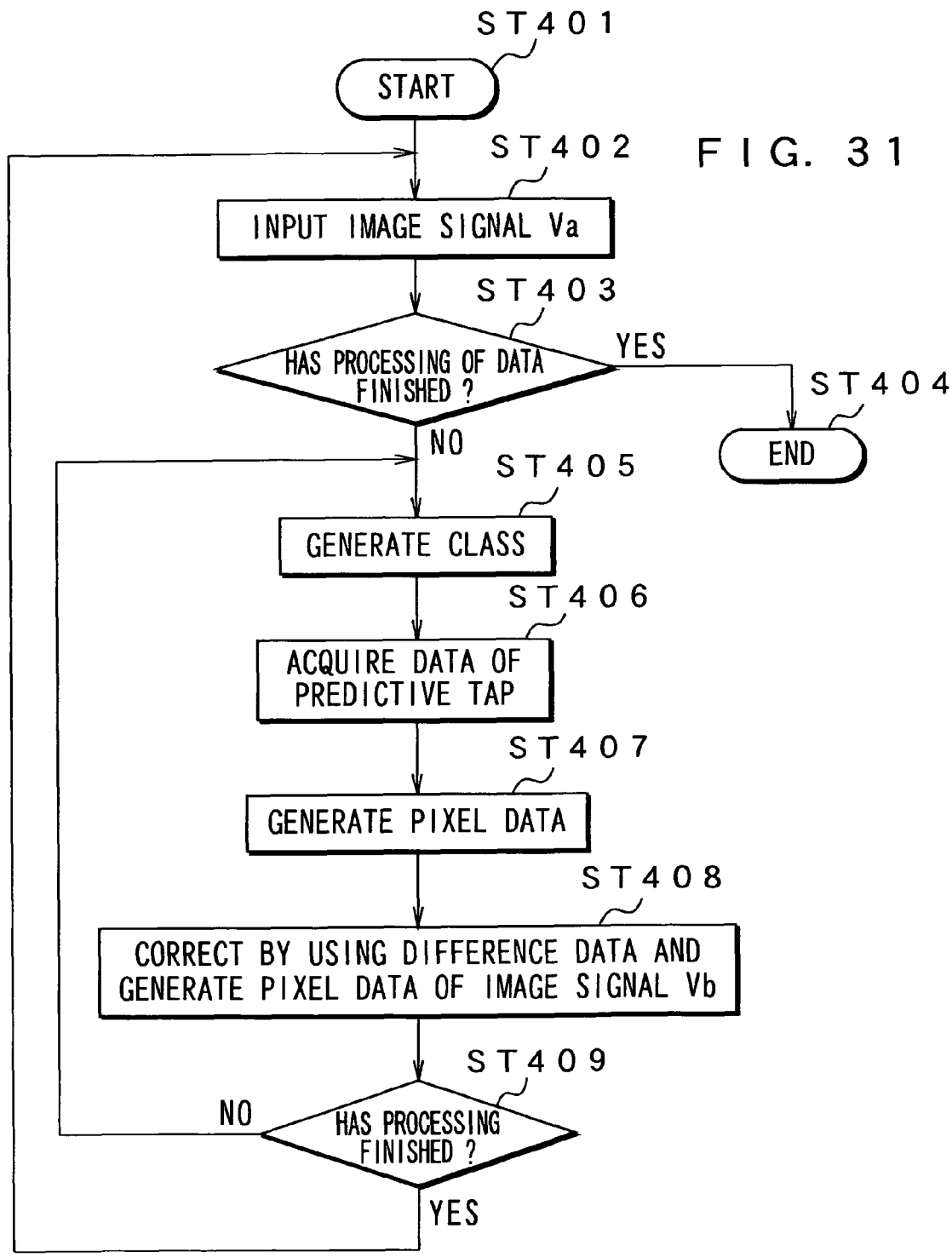
FIG. 31 is a flowchart for showing image signal processing.

The following will describe a processing procedure for obtaining the image signal Vb from the image signal Va with reference to a flowchart of FIG. 31.

First, at step ST401, the process starts processing, and at step ST402, it inputs from, for example, the input terminal 314 one frame or one field of the image signal Va into the apparatus. In such a manner, pixel data that constitutes the image signal Va input from the input terminal 314 is stored in the RAM303 temporarily. It is to be noted that if this image signal Va is recorded in the hard disk drive 305 in the apparatus beforehand, this image signal Va is read out of this drive 305 so that the pixel data that constitutes this image signal Va is temporarily stored in the RAM303.

At step ST403, it decides whether processing of all the frames or fields of the image signal Va has finished. If the processing has finished, the process ends the processing at step ST404. Otherwise, it goes to step ST405.

At step ST405, the process performs block-unit class classification based on the image signal Va input at step ST402, to generate a class code CLA indicating a class to which pixel data of a target position in the image signal Vb belongs.

Further, at this step ST405, the process performs pixel-data-unit class classification based on the image signal Va input at step ST402, pixel position mode information pi input with it being paired with pixel data of this image signal Va, and the above-mentioned class code CLA, to generate a class code CLB indicating a class to which pixel data of the target position in the image signal Vb belongs.

Next, at step ST406, based on the image signal Va input at step ST402, the process acquires multiple items of pixel data positioned in a periphery of the target position in the image signal Vb as item(s) of data xi (i=1, ..., n) of a predictive tap.

At step ST407, the process reads out of the ROM302 etc. coefficient data Wi that corresponds to the class code CLB generated at step ST405 based on the class code CLB and uses this coefficient data Wi and the item(s) of pixel data xi of the predictive tap to generate pixel data y ($x_p$) that corresponds to the pixel data of the target position in the image signal Vb through an estimate equation (see Equation (1)).

Next, at step ST408, based on the class code CLA generated at step ST405, the process reads difference data DF that corresponds to that class code CLA out of the ROM302 etc., adds the difference data DF to the pixel data y ($x_p$) generated at step ST407 and corrects them, thereby generating pixel data $y_p$ of the target position in the image signal Vb.

Next, at step ST409, it decides whether the processing to obtain pixel data of the image signal Vb has finished in all regions of the pixel data of the image signal Va input at step ST402. If the processing has not yet finished, the process returns to step ST405 to shift to the processing of the next target position. If finished, on the other hand, the process returns to step ST402 to shift to processing of inputting the next one frame or one field of the image signal Va.

In this case, if the difference data DF stored in the ROM302 etc. is that of a DCT coefficient obtained by DCT processing, the process performs DCT processing on the image signal Va input at step ST402, to provide a DCT coefficient. At step ST406, the process acquires plural DCT coefficients corresponding to the periphery of the target position in the image signal Vb. For example, as the plural DCT coefficients, DC coefficients are acquired which are present in a DCT coefficient block that corresponds to block data containing pixel data of the target position in the image signal Vb and four DCT coefficient blocks adjacent to this DCT coefficient block.

In this case, further, since the data y ($x_p$) generated at step ST407 provides a DCT coefficient and the data $y_p$ obtained at step ST408 also provides a DCT coefficient, the process further performs inverse DCT coefficient processing on this data $y_p$ to generate pixel data of the target position in the image signal Vb.

In such a manner, by performing the processing along the flowchart shown in FIG. 31, it is possible to process the pixel data of the input image signal Va, thereby obtaining the pixel data of the image signal Vb. As described above, the image signal Vb thus processed and obtained is output to the output terminal 315 or supplied to the display portion 311 so that an image due to the signal may be displayed or, further, supplied to the hard disk drive 305 where it is recorded on a hard disk.

Further, although a processing device is not shown, processing in the unit 250D for generating coefficient data of FIG. 30 can also be realized in software.

Figure 32:
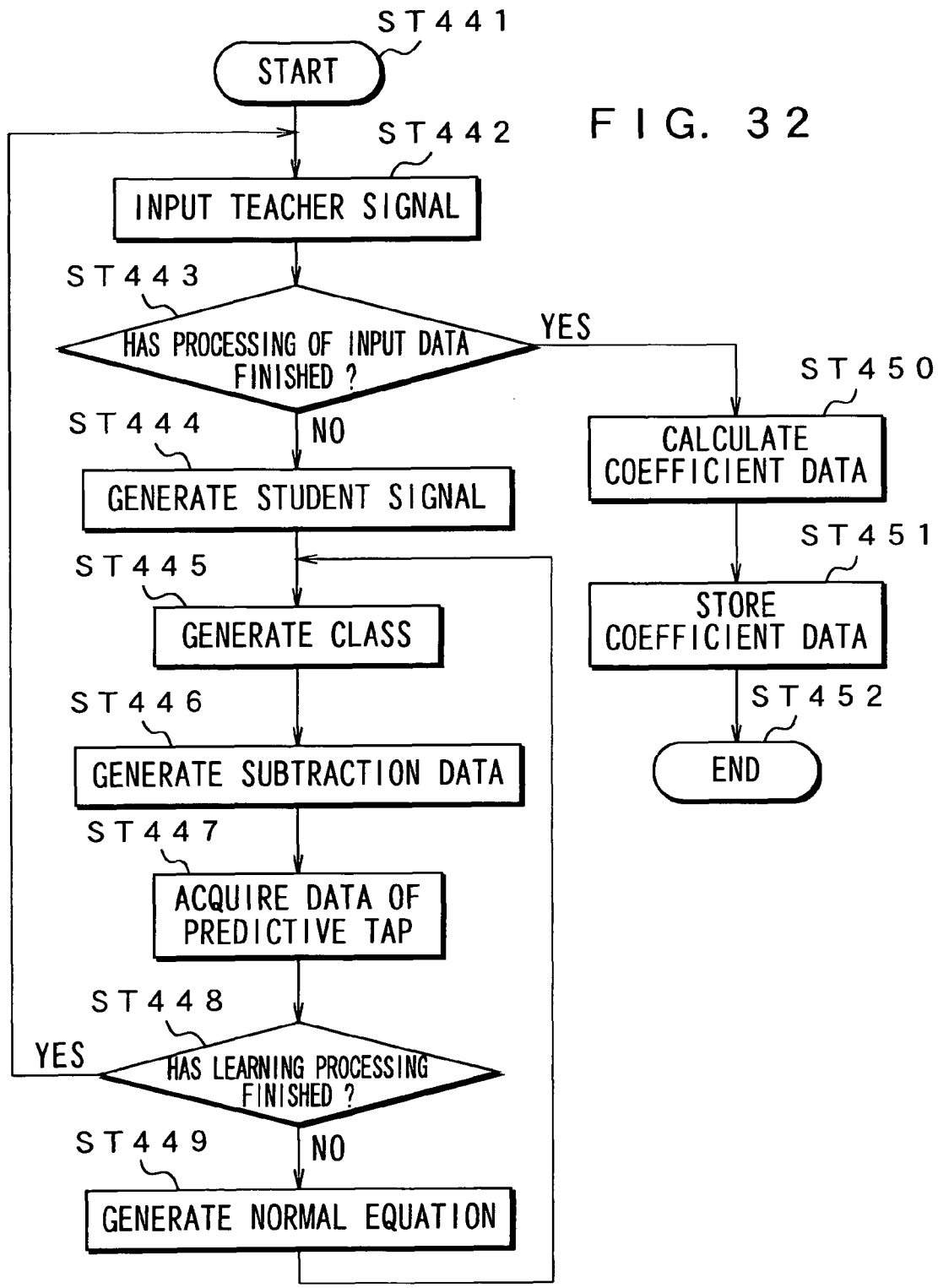
FIG. 32 is a flowchart for showing coefficient data generation processing.

The following will describe a processing procedure for generating coefficient data with reference to a flowchart of FIG. 32.

First, at step ST441, the process starts processing, and at step ST442, it inputs only one frame or one field of a teacher signal. At step ST443, it decides whether processing of all the frames or fields of the teacher signal has finished. If the processing has not yet finished, the process goes to step ST444 to generate a student signal from the teacher signal input at step ST442.

At step ST445, the process performs block-unit class classification based on the student signal SS generated at step ST444, to generate a class code CLA indicating a class to which pixel data of a target position in the teacher signal ST belongs.

Further, at this step ST445, the process performs pixel-data-unit class classification based on the image signal Va generated at step ST444, pixel position mode information pi obtained with it being paired with pixel data of this image signal Va, and the above-mentioned class code CLA, to generate a class code CLB indicating a class to which pixel data of the target position in the teacher signal ST belongs.

Next, at step ST446, the process subtracts the difference data DF read out of the ROM etc. corresponding to the class code CLA generated at step ST445 from pixel data $y_p$ of the target position in the teacher signal ST among multiple items of pixel data that constitute the teacher signal ST, to generate subtraction data $x_p$.

Next, at step ST447, based on the student signal SS generated at step ST444, the process acquires multiple items of pixel data positioned in a periphery of the target position in the teacher signal ST as item(s) of data xi (i=1, ..., n) of a predictive tap.

Next, at step ST448, the process decides whether learning processing has finished in all regions of the one frame or field of the pixel data of the teacher signal input at step ST442. If the learning processing has finished, the process returns to step ST442 to input the next one frame or field of the teacher signal, thus repeating the same processing as described above. Otherwise, the process goes to step ST449.

At this step ST449, the process generates a normal equation (see Equation (8)) for obtaining coefficient data Wi for each class by using the class code CLB generated at step ST445, the data xi of the predictive tap acquired at step ST447, and the subtraction data y ($x_p$) that corresponds to the pixel data of the target position in the teacher signal ST generated at step ST446 and then returns to step ST445 to shift to the processing of the next target position.

If the processing is finished at the above-mentioned step ST443, the process, at step ST450, solves the normal equation generated at step ST449 by a sweeping-out method etc., to calculate coefficient data of each class. At step ST451, the process saves the coefficient data of each class in the memory and ends the processing at step ST452.

In such a manner, by performing the processing along the flowchart shown in FIG. 32, it is possible to obtain the coefficient data Wi of each class by using the same method as that for the unit 250D for generating coefficient data shown in FIG. 30.

If, in this case, the difference data DF stored in the ROM etc. is that of a DCT coefficient which is obtained through DCT processing, the process performs DCT processing on the student signal SS generated at step ST444, to provide a DCT coefficient. Further, the process performs DCT processing on the teacher signal ST input at step ST442 to obtain a DCT coefficient. At step ST446, the process performs subtraction in a condition of the DCT coefficient.

Although in the above second through fifth embodiments, difference data DF has been stored in each of the accumulation tables 131 of the image-signal-processing portions 110A-110D and each of the accumulation tables 256 of the units 250A-250D for generating coefficient data, instead of storing the difference data DF, pixel data or a DCT coefficient itself may be stored in the accumulation tables 131 of the image-signal-processing portions 110B and 110C and the accumulation tables 256 of the units 250B and 250C for generating coefficient data. In this case, the pixel data or the DCT coefficient stored in the accumulation tables 131 and 256 can be obtained by using data y itself in place of difference data df obtained by subtracting data x from data y in, for example, the unit 210 for generating difference data shown in FIG. 6.

Although the above second through fifth embodiments have handled an MPEG2 stream subject to DCT processing, the present invention can be applied similarly to an embodiment in which any other encoded informational digital signal is handled. Further, the DCT processing may be replaced by encoding involving any other orthogonal transformation such as wavelet transformation or discrete sine transformation.

Although the above second through fifth embodiments have been described with reference to a case where the informational signal is an image signal, the present invention is not limited to it. For example, the present invention can be applied similarly also to a case where the informational signal is an audio signal, for example.

According to the present invention, a class to which pixel data of a target position in an output informational signal belongs is detected on the basis of an input informational signal, so that informational data corresponding to the target position in the output informational signal among items of informational data that constitute the input informational signal is corrected using correction data that corresponds to the detected class, in order to obtain informational data of the target position in this output informational signal, thereby enabling an encoding noise (encoding distortion) of an informational signal obtained by decoding an encoded informational digital signal to be well reduced.

Further, according to the present invention, informational data corresponding to a target position in an output informational signal among items of informational data that constitute an input informational signal is corrected using correction data that corresponds to a first class to which the target position in this output informational signal belongs, while by using multiple items of informational data positioned in a periphery of the target position in the output informational signal selected on the basis of the corrected informational data and coefficient data that corresponds to a second class to which the target position in this output informational signal belongs, informational data of the target position in this output informational signal is generated based on an estimate equation, thereby enabling an encoding noise (encoding distortion) of an informational signal obtained by decoding an encoded informational digital signal to be well reduced.

PROBABILITY OF UTILIZED INDUSTRIALIZATION

As described above, the present invention is capable of well reducing an encoding noise (encoding distortion) of an informational signal obtained by decoding an encoded informational digital signal and so could well be applied to a digital broadcast receiver etc.

The invention claimed is:

1. An apparatus for processing informational signal in which a first informational signal comprised of multiple items of informational data, said first informational signal being obtained by decoding an encoded informational digital signal, is converted into a second informational signal comprised of multiple items of informational data, the apparatus comprising:
    data selection means for selecting multiple items of first informational data positioned in a periphery of a target position in the second informational signal, based on the first informational signal;
    class detection means for detecting a class to which informational data of the target position belongs, based on the multiple items of first informational data selected by the data selection means;
    correction data generation means for generating correction data for correcting an encoding noise, said correction data corresponding to the class detected by the class detection means; and
    correction means for performing correction processing by use of the correction data generated by the correction data generation means on second informational data among the multiple items of informational data that constitute the first informational signal, said second informational data corresponding to the target position in the second informational signal, to obtain informational data of the target position in the second informational signal.

2. The apparatus for processing informational signal according to claim 1, wherein the correction data generation means includes:
    storage means for storing the correction data for each class; and
    data-reading means for reading the correction data out of the storage means, said correction data corresponding to the class detected by the class detection means.

3. The apparatus for processing informational signal according to claim 2, wherein the correction data stored in the storage means is generated beforehand by using a student signal corresponding to the first informational signal and a teacher signal corresponding to the second informational signal.

4. The apparatus for processing informational signal according to claim 3, wherein the student signal is obtained by decoding informational digital signal obtained by encoding the teacher signal.

5. The apparatus for processing informational signal according to claim 1, wherein the number of items of the informational data of the target position in the second informational signal is N times (N is an integer of at least 2) the number of item of the second informational data corresponding to the target position.

6. The apparatus for processing informational signal according to claim 5, wherein the correction data includes difference data of the number corresponding to the number of item of the informational data of the target position in the second informational signal; and
    wherein the correction means adds the corresponding second informational data to each of the multiple items of correction data contained in each divided region obtained by dividing the correction data by N to obtain output informational data.

7. A method for processing informational signal in which a first informational signal comprised of multiple items of informational data, said first informational signal being obtained by decoding an encoded informational digital signal, is converted into a second informational signal comprised of multiple items of informational data, the method being performed by a programmed processor and comprising:

a first step of selecting multiple items of first informational data positioned in a periphery of a target position in the second informational signal, based on the first informational signal;

a second step of detecting a class to which informational data of the target position belongs, based on the multiple items of first informational data selected by the first step;

a third step of generating correction data for correcting an encoding noise, said correction data corresponding to the class detected by the second step; and a fourth step of performing correction processing by use of the correction data generated by the third step on second informational data among the multiple items of informational data that constitute the first informational signal, said second informational data corresponding to the target position in the second informational signal, to obtain informational data of the target position in the second informational signal.

8. A computer-readable medium encoded with a computer program to control a computer to execute a method for processing informational signal, in order to convert a first informational signal comprised of multiple items of informational data, said first informational signal being obtained by decoding an encoded informational digital signal, into a second informational signal comprised of multiple items of informational data, the method comprising:

a first step of selecting multiple items of first informational data positioned in a periphery of a target position in the second informational signal, based on the first informational signal;

a second step of detecting a class to which informational data of the target position belongs, based on the multiple items of first informational data selected by the first step;

a third step of generating correction data for correcting an encoding noise, said correction data corresponding to the class detected by the second step; and a fourth step of performing correction processing by use of the correction data generated by the third step on second informational data among the multiple items of informational data that constitute the first informational signal, said second informational data corresponding to the target position in the second informational signal, to obtain informational data of the target position in the second informational signal.

9. A unit for generating correction data for correcting an encoding noise, said correction data being used when converting a first informational signal comprised of multiple items of informational data, said first informational signal being obtained by decoding an encoded informational digital signal, into a second informational signal comprised of multiple items of informational data, the unit comprising:

decoding means for decoding informational digital signal obtained by encoding a teacher signal corresponding to the second informational signal, to obtain a student signal that corresponds to the first informational signal;

class detection means for detecting a class to which informational data of a target position in the teacher signal belongs, based on at least the student signal output from the decoding means;

subtraction means for performing subtraction processing by use of informational data among the multiple items of informational data that constitute the student signal, said informational data corresponding to the target position, on the informational data of the target position in the teacher signal; and operation means for averaging, for each class, output data of the subtraction means based on the class detected by the class detection means, to obtain correction data for each class.

10. The unit for generating correction data according to claim 9, wherein the class detection means selects multiple items of informational data positioned in a periphery of the target position in the teacher signal based on the student signal output from the decoding means, to detect a class to which informational data of the target position in the teacher signal belongs, based on the selected multiple items of informational data.

11. A method for generating correction data for correcting an encoding noise, said correction data being used when converting a first informational signal comprised of multiple items of informational data, said first informational signal being obtained by decoding an encoded informational digital signal, into a second info national signal comprised of multiple items of informational data, the method being performed by a programmed processor and comprising:

a first step of decoding informational digital signal obtained by encoding a teacher signal corresponding to the second informational signal, to obtain a student signal that corresponds to the first informational signal;

a second step of detecting a class to which informational data of a target position in the teacher signal belongs, based on at least the student signal obtained at the first step;

a third step of performing subtraction processing by use of informational data among the multiple items of informational data that constitute the student signal, said informational data corresponding to the target position, on the informational data of the target position in the teacher signal; and a fourth step of averaging, for each class, data obtained at the third step based on the class detected at the second step, to obtain correction data for each class.

12. A computer-readable medium encoded with a computer program to control a computer to execute a method for generating correction data for correcting an encoding noise, said correction data being used when converting a first informational signal comprised of multiple items of informational data, said first informational signal being obtained by decoding an encoded informational digital signal, into a second informational signal comprised of multiple items of informational data, the method comprising:

a first step of decoding informational digital signal obtained by encoding a teacher signal corresponding to the second informational signal, to obtain a student signal that corresponds to the first informational signal;

a second step of detecting a class to which informational data of a target position in the teacher signal belongs, based on at least the student signal obtained at the first step;

a third step of performing subtraction processing by use of such informational data among the multiple items of informational data that constitute the student signal, said informational data corresponding to the target position, on the informational data of the target position in the teacher signal; and a fourth step of averaging, for each class, data obtained at the third step based on the class detected at the second step, to obtain correction data for each class.

13. A unit for generating correction data for correcting an encoding noise, said correction data being used when converting a first informational signal comprised of multiple items of informational data, said first informational signal being obtained by decoding an encoded informational digital signal, into a second informational signal comprised of multiple items of informational data, the unit comprising:
- decoding means for decoding informational digital signal obtained by encoding a teacher signal corresponding to the second informational signal, to obtain a student signal that corresponds to the first informational signal;
- class detection means for detecting a class to which informational data of a target position in the teacher signal belongs, based on at least the student signal output from the decoding means; and
- operation means for averaging, for each class, informational data of the target position in the teacher signal based on the class detected by the class detection means, to obtain correction data for each class.

14. The unit for generating correction data according to claim 13, wherein the class detection means selects multiple items of informational data positioned in a periphery of the target position in the teacher signal based on the student signal output from the decoding means, to detect a class to which informational data of the target position in the teacher signal belongs, based on the selected multiple items of informational data.

15. A method for generating correction data for correcting an encoding noise, said correction data being used when converting a first informational signal comprised of multiple items of informational data, said first informational signal being obtained by decoding an encoded informational digital signal, into a second informational signal comprised of multiple items of informational data, the method being performed by a programmed processor and comprising:
- a first step of decoding informational digital signal obtained by encoding a teacher signal corresponding to the second informational signal, to obtain a student signal that corresponds to the first informational signal;
- a second step of detecting a class to which informational data of a target position in the teacher signal belongs, based on at least the student signal obtained at the first step; and
- a third step of averaging, for each class, informational data of the target position in the teacher signal based on the class detected at the second step, to obtain correction data for each class.

16. A computer-readable medium encoded with a computer program to control a computer to execute a method for generating correction data for correcting an encoding noise, said correction data being used when converting a first informational signal comprised of multiple items of informational data, said first informational signal being obtained by decoding an encoded informational digital signal, into a second informational signal comprised of multiple items of informational data, the method comprising:
- a first step of decoding informational digital signal obtained by encoding a teacher signal corresponding to the second informational signal, to obtain a student signal that corresponds to the first informational signal;
- a second step of detecting a class to which informational data of a target position in the teacher signal belongs, based on at least the student signal obtained at the first step; and
- a third step of averaging, for each class, informational data of the target position in the teacher signal based on the class detected at the second step, to obtain correction data for each class.

17. An apparatus for processing informational signal in which a first informational signal comprised of multiple items of informational data, said first informational signal being obtained by decoding an encoded informational digital signal, is converted into a second informational signal comprised of multiple items of informational data, the apparatus comprising:
- correction data generation means for generating correction data for correcting an encoding noise, said correction data corresponding to a first class to which informational data of a target position in the second informational signal belongs;
- correction means for performing correction processing by use of the correction data generated by the correction data generation means on informational data among the multiple items of informational data that constitute the first informational signal, said informational data corresponding to the target position in the second informational signal;
- coefficient data generation means for generating coefficient data used in an estimate equation, said coefficient data corresponding to a second class to which the informational data of the target position in the second informational signal belongs;
- data selection means for selecting multiple items of informational data positioned in a periphery of the target position in the second informational signal, based on the informational data corrected by the correction means; and
- informational data generation means for generating the informational data of the target position in the second informational signal based on the estimate equation by using the coefficient data generated by the coefficient data generation means and the multiple items of informational data selected by the data selection means.

18. The apparatus for processing informational signal according to claim 17, wherein the first class and the second class are the same as each other.

19. The apparatus for processing informational signal according to claim 17, wherein class classification relating to the second class is the one obtained by making class classification relating to said first class finer.

20. A method for processing informational signal in which a first informational signal comprised of multiple items of informational data, said first informational signal being obtained by decoding an encoded informational digital signal, is converted into a second informational signal comprised of multiple items of informational data, the method being performed by a programmed processor and comprising:
- a first step of generating correction data for correcting an encoding noise, said correction data corresponding to a first class to which informational data of a target position in the second informational signal belongs;
- a second step of performing correction processing by use of the correction data generated at the first step on informational data among the multiple items of informational data that constitute the first informational signal, said informational data corresponding to the target position in the second informational signal;
- a third step of generating coefficient data used in an estimate equation, said coefficient data corresponding to a second class to which the informational data of the target position in the second informational signal belongs;
- a fourth step of selecting multiple items of informational data positioned in a periphery of the target position in the second informational signal, based on the informational data corrected at the second step; and
- a fifth step of generating the informational data of the target position in the second informational signal based on the estimate equation by using the coefficient data generated at the third step and the multiple items of informational data selected at the fourth step.

21. A computer-readable medium encoded with a computer program to control a computer to execute a method for processing informational signal, in order to convert a first informational signal comprised of multiple items of informational data, said first informational signal being obtained by decoding an encoded informational digital signal, into a second informational signal comprised of multiple items of informational data, the method comprising:
- a first step of generating correction data for correcting an encoding noise, said correction data corresponding to a first class to which informational data of a target position in the second informational signal belongs;
- a second step of performing correction processing by use of the correction data generated at the first step on informational data among the multiple items of informational data that constitute the first informational signal, said informational data corresponding to the target position in the second informational signal;
- a third step of generating coefficient data used in an estimate equation, said coefficient data corresponding to a second class to which the informational data of the target position in the second informational signal belongs;
- a fourth step of selecting multiple items of informational data positioned in a periphery of the target position in the second informational signal, based on the informational data corrected at the second step; and
- a fifth step of generating the informational data of the target position in the second informational signal based on the estimate equation by using the coefficient data generated at the third step and the multiple items of informational data selected at the fourth step.

22. An apparatus for processing informational signal in which a first informational signal comprised of multiple items of informational data, said first informational signal being obtained by decoding an encoded informational digital signal, is converted into a second informational signal comprised of multiple items of informational data, the apparatus comprising:
- correction data generation means for generating correction data for correcting an encoding noise, said correction data corresponding to a first class to which informational data of a target position in the second informational signal belongs;
- first data selection means for selecting multiple items of informational data positioned in a periphery of the target position in the second informational signal, based on the first informational signal;
- second data selection means for selecting multiple items of correction data that corresponds to the multiple items of informational data selected by the first data selection means, based on the correction data generated by the correction data generation means;
- coefficient data generation means for generating coefficient data used in an estimate equation, said coefficient data corresponding to a second class to which informational data of the target position in the second informational signal belongs; and
- informational data generation means for generating the informational data of the target position in the second informational signal based on the estimate equation by using the coefficient data generated by the coefficient data generation means, the multiple items of informational data selected by the first data selection means, and the multiple items of correction data selected by the second data selection means.

23. The apparatus for processing informational signal according to claim 22, wherein the first class and the second class are the same as each other.

24. The apparatus for processing informational signal according to claim 22, wherein class classification relating to the second class is the one obtained by making class classification relating to said first class finer.

25. A method for processing informational signal in which a first informational signal comprised of multiple items of informational data, said first informational signal being obtained by decoding an encoded informational digital signal, is converted into a second informational signal comprised of multiple items of informational data, the method being performed by a programmed processor and comprising:
- a first step of generating correction data for correcting an encoding noise, said correction data corresponding to a first class to which informational data of a target position in the second informational signal belongs;
- a second step of selecting multiple items of informational data positioned in a periphery of a target position in the second informational signal, based on the first informational signal;
- a third step of selecting multiple items of correction data that corresponds to the multiple items of informational data selected at the second step, based on the correction data generated at the first step;
- a fourth step of generating coefficient data used in an estimate equation, said coefficient data corresponding to a second class to which informational data of the target position in the second informational signal belongs; and
- a fifth step of generating the informational data of the target position in the second informational signal based on the estimate equation by using the coefficient data generated at the fourth step, the multiple items of informational data selected at the second step, and the multiple items of correction data selected at the third step.

26. A computer-readable medium encoded with a computer program to control a computer to execute a method for processing informational signal, in order to convert a first informational signal comprised of multiple items of informational data, said first informational signal being obtained by decoding an encoded informational digital signal, into a second informational signal comprised of multiple items of informational data, the method comprising:
- a first step of generating correction data for correcting an encoding noise, said correction data corresponding to a first class to which informational data of a target position in the second informational signal belongs;
- a second step of selecting multiple items of informational data positioned in a periphery of a target position in the second informational signal, based on the first informational signal;
- a third step of selecting multiple items of correction data that corresponds to the multiple items of informational data selected at the second step, based on the correction data generated at the first step;
- a fourth step of generating coefficient data used in an estimate equation, said coefficient data corresponding to a second class to which informational data of the target position in the second informational signal belongs; and
- a fifth step of generating the informational data of the target position in the second informational signal based on the estimate equation by using the coefficient data generated at the fourth step, the multiple items of informational data selected at the second step, and the multiple items of correction data selected at the third step.

27. An apparatus for processing informational signal in which a first informational signal comprised of multiple items of informational data, said first informational signal being obtained by decoding an encoded informational digital signal, is converted into a second informational signal comprised of multiple items of informational data, the apparatus comprising:
- correction data generation means for generating correction data for correcting an encoding noise, said correction data corresponding to a first class to which informational data of a target position in the second informational signal belongs;
- data selection means for selecting multiple items of correction data corresponding to a periphery of the target position in the second informational signal based on the correction data generated by the correction data generation means;
- coefficient data generation means for generating coefficient data used in an estimate equation, said coefficient data corresponding to a second class to which the informational data of the target position in the second informational signal belongs;
- correction data generation means for generating correction data corresponding to the informational data of the target position in the second informational signal based on the estimate equation by using the coefficient data generated by the coefficient data generation means and the multiple items of correction data selected by the data selection means; and
- informational data generation means for performing correction processing by use of the correction data generated by the correction data generation means on the informational data, which corresponds to the target position in the second informational signal, among the multiple items of informational data that constitute the first informational signal to generate the informational data of the target position in the second informational signal.

28. The apparatus for processing informational signal according to claim 27, wherein the first class and the second class are the same as each other.

29. The apparatus for processing informational signal according to claim 27, wherein class classification relating to the second class is the one obtained by making class classification relating to said first class finer.

30. A method for processing informational signal in which a first informational signal comprised of multiple items of informational data, said first informational signal being obtained by decoding an encoded informational digital signal, is converted into a second informational signal comprised of multiple items of informational data, the method being performed by a programmed processor and comprising:
- a first step of generating correction data for correcting an encoding noise, said correction data corresponding to a first class to which informational data of a target position in the second informational signal belongs;
- a second step of selecting multiple items of correction data corresponding to a periphery of the target position in the second informational signal based on the correction data generated at the first step;
- a third step of generating coefficient data used in an estimate equation, said coefficient data corresponding to a second class to which the informational data of the target position in the second informational signal belongs;
- a fourth step of generating correction data corresponding to the informational data of the target position in the second informational signal based on the estimate equation by using the coefficient data generated at the step third step and the multiple items of correction data selected at the second step; and
- a fifth step of performing correction processing by use of the correction data generated at the fourth step on informational data, which corresponds to the target position in the second informational signal, among the multiple items of informational data that constitute the first informational signal to generate informational data of the target position in the second informational signal.

31. A computer-readable medium encoded with a computer program to control a computer to execute a method for processing informational signal, in order to convert a first informational signal comprised of multiple items of informational data, said first informational data being obtained by decoding an encoded informational digital signal, into a second informational signal comprised of multiple items of informational data, the method comprising:
- a first step of generating correction data for correcting an encoding noise, said correction data corresponding to a first class to which informational data of a target position in the second informational signal belongs;
- a second step of selecting multiple items of correction data corresponding to a periphery of the target position in the second informational signal based on the correction data generated at the first step;
- a third step of generating coefficient data used in an estimate equation, said coefficient data corresponding to a second class to which the informational data of the target position in the second informational signal belongs;
- a fourth step of generating correction data corresponding to the informational data of the target position in the second informational signal based on the estimate equation by using the coefficient data generated at the step third step and the multiple items of correction data selected at the second step; and
- a fifth step of performing correction processing by use of the correction data generated at the fourth step on informational data, which corresponds to the target position in the second informational signal, among the multiple items of informational data that constitute the first informational signal to generate informational data of the target position in the second informational signal.

32. An apparatus for processing informational signal in which a first informational signal comprised of multiple items of informational data, said first informational signal being obtained by decoding an encoded informational digital signal, is converted into a second informational signal comprised of multiple items of informational data, the apparatus comprising:
- correction data generation means for generating correction data for correcting an encoding noise, said correction data corresponding to a first class to which informational data of a target position in the second informational signal belongs;
- data selection means for selecting multiple items of informational data positioned in a periphery of the target position in the second informational signal, based on the first informational signal;
- coefficient data generation means for generating coefficient data used in an estimate equation, said coefficient data corresponding to a second class to which informational data of the target position in the second informational signal belongs;
- data generation means for generating data corresponding to the informational data of the target position in the second informational signal based on the estimate equation by using the coefficient data generated by the coefficient data generation means, and the multiple items of informational data selected by the data selection means;

informational data generation means for generating the informational data of the target position in the second informational signal by performing correction processing by use of the correction data generated by the correction data generation means on the data generated by the data generation means.

33. The apparatus for processing informational signal according to claim 32, wherein the first class and the second class are the same as each other.

34. The apparatus for processing informational signal according to claim 32, wherein class classification relating to the second class is the one obtained by making class classification relating to said first class finer.

35. A method for processing informational signal in which a first informational signal comprised of multiple items of informational data, said first informational signal being obtained by decoding an encoded informational digital signal, is converted into a second informational signal comprised of multiple items of informational data, the method being performed by a programmed processor and comprising:

a first step of generating correction data for correcting an encoding noise, said correction data corresponding to a first class to which informational data of a target position in the second informational signal belongs;

a second step of selecting multiple items of informational data positioned in a periphery of the target position in the second informational signal, based on the first informational signal;

a third step of generating coefficient data used in an estimate equation, said coefficient data corresponding to a second class to which informational data of the target position in the second informational signal belongs;

a fourth step of generating data corresponding to the informational data of the target position in the second informational signal based on the estimate equation by using the coefficient data generated at the third step and the multiple items of informational data selected at the second step; and a fifth step of generating the informational data of the target position in the second informational signal by performing correction processing by use of the correction data generated at the first step on the data generated at the fourth step.

36. A computer-readable medium encoded with a computer program to control a computer to execute a method for processing informational signal, in order to convert a first informational signal comprised of multiple items of informational data, said first informational data being obtained by decoding an encoded informational digital signal, into a second informational signal comprised of multiple items of informational data, the method comprising:

a first step of generating correction data for correcting an encoding noise, said correction data corresponding to a first class to which informational data of a target position in the second informational signal belongs;

a second step of selecting multiple items of informational data positioned in a periphery of the target position in the second informational signal, based on the first informational signal;

a third step of generating coefficient data used in an estimate equation, said coefficient data corresponding to a second class to which informational data of the target position in the second informational signal belongs;

a fourth step of generating data corresponding to the informational data of the target position in the second informational signal based on the estimate equation by using the coefficient data generated at the third step and the multiple items of informational data selected at the second step; and a fifth step of generating the informational data of the target position in the second informational signal by performing correction processing by use of the correction data generated at the first step on the data generated at the fourth step.

37. A unit for generating coefficient data for an estimate equation used when converting a first informational signal comprised of multiple items of informational data, said first informational signal being obtained by decoding an encoded informational digital signal, into a second informational signal comprised of multiple items of informational data, the unit comprising:

decoding means for decoding the informational digital signal obtained by encoding a teacher signal corresponding to the second informational signal, to obtain a student signal that corresponds to the first informational signal;

correction data generation means for generating correction data for correcting an encoding noise, said correction data corresponding to a first class to which informational data of a target position in the teacher signal belongs;

correction means for performing correction processing by use of the correction data generated by the correction data generation means on informational data among multiple items of informational data that constitute the student signal output from the decoding means, said informational data corresponding to the target position in the teacher signal;

data selection means for selecting multiple items of informational data positioned in a periphery of the target position in the teacher signal, based on the informational data corrected by the correction means; and coefficient data generation means for generating the coefficient data for each class by using a second class to which the informational data of the target position in the teacher signal belongs, the multiple items of informational data selected by the data selection means, and the informational data of the target position in the teacher signal.

38. A method for generating coefficient data for an estimate equation used when converting a first informational signal comprised of multiple items of informational data, said first informational signal being obtained by decoding an encoded informational digital signal, into a second informational signal comprised of multiple items of informational data, the method be performed by a programmed processor and comprising:

a first step of decoding the informational digital signal obtained by encoding a teacher signal corresponding to the second informational signal, to obtain a student signal that corresponds to the first informational signal;

a second step of generating correction data for correcting an encoding noise, said correction data corresponding to a first class to which informational data of a target position in the teacher signal belongs;

a third step of performing correction processing by use of the correction data generated at the second step on informational data among multiple items of informational data that constitute the student signal obtained at the first step, said informational data corresponding to the target position in the teacher signal;

a fourth step of selecting multiple items of informational data positioned in a periphery of the target position in the teacher signal, based on the informational data corrected at the third step; and a fifth step of generating the coefficient data for each class by using a second class to which the informational data of the target position in the teacher signal belongs, the multiple items of informational data selected at the fourth step, and the informational data of the target position in the teacher signal.

39. A computer-readable medium encoded with a computer program to control a computer to execute a method for generating coefficient data, in order to generate the coefficient data for an estimate equation used when converting a first informational signal comprised of multiple items of informational data, said first informational data being obtained by decoding an encoded informational digital signal, into a second informational signal comprised of multiple items of informational data, the method comprising:

a first step of decoding the informational digital signal obtained by encoding a teacher signal corresponding to the second informational signal, to obtain a student signal that corresponds to the first informational signal;

a second step of generating correction data for correcting an encoding noise, said correction data corresponding to a first class to which informational data of a target position in the teacher signal belongs;

a third step of performing correction processing by use of the correction data generated at the second step on informational data among multiple items of informational data that constitute the student signal obtained at the first step, said informational data corresponding to the target position in the teacher signal;

a fourth step of selecting multiple items of informational data positioned in a periphery of the target position in the teacher signal, based on the informational data corrected at the third step; and a fifth step of generating the coefficient data for each class by using a second class to which the informational data of the target position in the teacher signal belongs, the multiple items of informational data selected at the fourth step, and the informational data of the target position in the teacher signal.

40. A unit for generating coefficient data for an estimate equation used when converting a first informational signal comprised of multiple items of informational data, said first informational signal being obtained by decoding an encoded informational digital signal, into a second informational signal comprised of multiple items of informational data, the unit comprising:

decoding means for decoding the informational digital signal obtained by encoding a teacher signal corresponding to the second informational signal, to obtain a student signal that corresponds to the first informational signal;

correction data generation means for generating correction data for correcting an encoding noise, said correction data corresponding to a first class to which informational data of a target position in the teacher signal belongs;

first data selection means for selecting multiple items of informational data positioned in a periphery of the target position in the teacher signal based on the student signal output from the decoding means;

second data selection means for selecting multiple items of correction data that correspond to the multiple items of informational data selected by the first data selection means based on the correction data generated by the correction data generated means; and coefficient data generation means for generating the coefficient data for each class by using a second class to which the informational data of the target position in the teacher signal belongs, the multiple items of informational data selected by the first data selection means, the multiple items of correction data selected by the second data selection means, and the informational data of the target position in the teacher signal.

41. A method for generating coefficient data for an estimate equation used when converting a first informational signal comprised of multiple items of informational data, said first informational signal being obtained by decoding an encoded informational digital signal, into a second informational signal comprised of multiple items of informational data, the method being performed by a programmed processor and comprising:

a first step of decoding the informational digital signal obtained by encoding a teacher signal corresponding to the second informational signal, to obtain a student signal that corresponds to the first informational signal;

a second step of generating correction data for correcting an encoding noise, said correction data corresponding to a first class to which informational data of a target position in the teacher signal belongs;

a third step of selecting multiple items of informational data positioned in a periphery of the target position in the teacher signal based on the student signal obtained at the first step;

a fourth step of selecting multiple items of correction data that correspond to the multiple items of informational data selected at the third step based on the correction data generated at the second step; and a fifth step of generating the coefficient data for each class by using a second class to which the informational data of the target position in the teacher signal belongs, the multiple items of informational data selected at the third step, the multiple items of correction data selected at the fourth step, and the informational data of the target position in the teacher signal.

42. A computer-readable medium encoded with a computer program to control a computer to execute a method for generating coefficient data, in order to generate the coefficient data for an estimate equation used when converting a first informational signal comprised of multiple items of informational data, said first informational data being obtained by decoding an encoded informational digital signal, into a second informational signal comprised of multiple items of informational data, the method comprising:

a first step of decoding the informational digital signal obtained by encoding a teacher signal corresponding to the second informational signal, to obtain a student signal that corresponds to the first informational signal;

a second step of generating correction data for correcting an encoding noise, said correction data corresponding to a first class to which informational data of a target position in the teacher signal belongs;

a third step of selecting multiple items of informational data positioned in a periphery of the target position in the teacher signal based on the student signal obtained at the first step;

a fourth step of selecting multiple items of correction data that correspond to the multiple items of informational data selected at the third step based on the correction data generated at the second step; and a fifth step of generating the coefficient data for each class by using a second class to which the informational data of the target position in the teacher signal belongs, the multiple items of informational data selected at the third step, the multiple items of correction data selected at the fourth step, and the informational data of the target position in the teacher signal.

43. A unit for generating coefficient data for an estimate equation used when converting a first informational signal comprised of multiple items of informational data, said first informational signal being obtained by decoding an encoded informational digital signal, into a second informational signal comprised of multiple items of informational data, the unit comprising:
  decoding means for decoding the informational digital signal obtained by encoding a teacher signal corresponding to the second informational signal, to obtain a student signal that corresponds to the first informational signal;
  subtraction means for performing subtraction processing by use of informational data among multiple items of informational data that constitute the student signal, said informational data corresponding to a target position, on informational data of the target position in the teacher signal;
  correction data generation means for generating correction data for correcting an encoding noise, said correction data corresponding to a first class to which the informational data of the target position in the teacher signal belongs;
  data selection means for selecting multiple items of correction data corresponding to a periphery of the target position in the teacher signal, based on the correction data generated by the correction data generation means; and
  coefficient data generation means for generating the coefficient data for each class by using a second class to which the informational data of the target position in the teacher signal belongs, the multiple items of correction data selected by the data selection means, and output data of the subtraction means corresponding to the informational data of the target position in the teacher signal.

44. A method for generating coefficient data for an estimate equation used when converting a first informational signal comprised of multiple items of informational data, said first informational signal being obtained by decoding an encoded informational digital signal, into a second informational signal comprised of multiple items of informational data, the method being performed by a programmed processor and comprising:
  a first step of decoding the informational digital signal obtained by encoding a teacher signal corresponding to the second informational signal, to obtain a student signal that corresponds to the first informational signal;
  a second step of performing subtraction processing by use of informational data among multiple items of informational data that constitute the student signal, said informational data corresponding to a target position, on informational data of the target position in the teacher signal;
  a third step of generating correction data for correcting a encoding noise, said correction data corresponding to a first class to which the informational data of the target position in the teacher signal belongs;
  a fourth step of selecting multiple items of correction data corresponding to a periphery of the target position in the teacher signal, based on the correction data generated at the third step; and
  a fifth step of generating the coefficient data for each class by using a second class to which the informational data of the target position in the teacher signal belongs, the multiple items of correction data selected at the fourth step, and data obtained at the second step corresponding to the informational data of the target position in the teacher signal.

45. A computer-readable medium encoded with a computer program to control a computer to execute a method for generating coefficient data, in order to generate the coefficient data for an estimate equation used when converting a first informational signal comprised of multiple items of informational data, said first informational data being obtained by decoding an encoded informational digital signal, into a second informational signal comprised of multiple items of informational data, the method comprising:
  a first step of decoding the informational digital signal obtained by encoding a teacher signal corresponding to the second informational signal, to obtain a student signal that corresponds to the first informational signal;
  a second step of performing subtraction processing by use of informational data among multiple items of informational data that constitute the student signal, said informational data corresponding to a target position, on informational data of the target position in the teacher signal;
  a third step of generating correction data for correcting a encoding noise, said correction data corresponding to a first class to which the informational data of the target position in the teacher signal belongs;
  a fourth step of selecting multiple items of correction data corresponding to a periphery of the target position in the teacher signal, based on the correction data generated at the third step; and
  a fifth step of generating the coefficient data for each class by using a second class to which the informational data of the target position in the teacher signal belongs, the multiple items of correction data selected at the fourth step, and data obtained at the second step corresponding to the informational data of the target position in the teacher signal.

46. A unit for generating coefficient data for an estimate equation used when converting a first informational signal comprised of multiple items of informational data, said first informational signal being obtained by decoding an encoded informational digital signal, into a second informational signal comprised of multiple items of informational data, the unit comprising:
  decoding means for decoding the informational digital signal obtained by encoding a teacher signal corresponding to the second informational signal, to obtain a student signal that corresponds to the first informational signal;
  correction data generation means for generating correction data for correcting an encoding noise, said correction data corresponding to a first class to which informational data of the target position in the teacher signal belongs;
  subtraction means for performing subtraction processing by use of correction data generated by the correction data generation means on informational data of the target position in the teacher signal;
  data selection means for selecting multiple items of informational data positioned in a periphery of the target position in the teacher signal, based on the student signal output from the decoding means; and
  coefficient data generation means for generating the coefficient data for each class by using a second class to which the informational data of the target position in the teacher signal belongs, the multiple items of information data selected by the data selection means, and output data of the subtraction means corresponding to the informational data of the target position in the teacher signal.

47. A method for generating coefficient data for an estimate equation used when converting a first informational signal comprised of multiple items of informational data, said first informational signal being obtained by decoding an encoded informational digital signal, into a second informational signal comprised of multiple items of informational data, the method being performed by a programmed processor and comprising:
- a first step of decoding the informational digital signal obtained by encoding a teacher signal corresponding to the second informational signal, to obtain a student signal that corresponds to the first informational signal;
- a second step of generating correction data for correcting an encoding noise, said correction data corresponding to a first class to which informational data of a target position in the teacher signal belongs;
- a third step of performing subtraction processing by use of the correction data generated at the second step, on the informational data of the target position in the teacher signal;
- a fourth step of selecting multiple items of informational data positioned in a periphery of the target position in the teacher signal, based on the student signal obtained at the first step; and
- a fifth step of generating the coefficient data for each class by using a second class to which the informational data of the target position in the teacher signal belongs, the multiple items of informational data selected at the fourth step, and data obtained at the third step corresponding to the informational data of the target position in the teacher signal.

48. A computer-readable medium encoded with a computer program to control a computer to execute a method for generating coefficient data, in order to generate the coefficient data for an estimate equation used when converting a first informational signal comprised of multiple items of informational data, said first informational data being obtained by decoding an encoded informational digital signal, into a second informational signal comprised of multiple items of informational data, the method comprising:
- a first step of decoding the informational digital signal obtained by encoding a teacher signal corresponding to the second informational signal, to obtain a student signal that corresponds to the first informational signal;
- a second step of generating correction data for correcting an encoding noise, said correction data corresponding to a first class to which informational data of a target position in the teacher signal belongs;
- a third step of performing subtraction processing by use of the correction data generated at the second step, on the informational data of the target position in the teacher signal;
- a fourth step of selecting multiple items of informational data positioned in a periphery of the target position in the teacher signal, based on the student signal obtained at the first step; and
- a fifth step of generating the coefficient data for each class by using a second class to which the informational data of the target position in the teacher signal belongs, the multiple items of informational data selected at the fourth step, and data obtained at the third step corresponding to the informational data of the target position in the teacher signal.

* * * * *